United States Patent [19]

Daggett et al.

[11] Patent Number: 4,962,338

[45] Date of Patent: Oct. 9, 1990

[54] UNIVERSAL ROBOT CONTROL BOARD CONFIGURATION

[75] Inventors: Kenneth E. Daggett, Murrysville, Pa.; Eimei M. Onaga, Brookfield Center, Conn.; Richard J. Casler, Jr., Newtown, Conn.; Booth Barrett L., Brookfield, Conn.; Vincent P. Jalbert, Middlebury, Conn.

[73] Assignee: Staubli International AG., Switzerland

[21] Appl. No.: 371,668

[22] Filed: Jun. 21, 1988

Related U.S. Application Data

[63] Continuation of Ser. No. 932,982, Nov. 20, 1986, abandoned.

[51] Int. Cl.$^5$ ............................................. B25J 13/00
[52] U.S. Cl. ................................. 318/568.11; 901/50
[58] Field of Search ................... 318/568.11; 364/474, 364/513; 901/2, 19, 50

[56] References Cited

U.S. PATENT DOCUMENTS

| | | | |
|---|---|---|---|
| 4,467,436 | 8/1984 | Chance et al. | 364/513 |
| 4,503,507 | 3/1985 | Takeda et al. | 364/513 |
| 4,514,814 | 4/1985 | Evans | 364/474 |
| 4,578,764 | 3/1986 | Hutchins et al. | 901/2 X |
| 4,602,345 | 7/1986 | Yokoyama | 364/513 |
| 4,625,285 | 11/1986 | Mori et al. | 901/2 X |
| 4,626,999 | 12/1986 | Bannister | 364/513 X |
| 4,635,199 | 1/1987 | Muraki | 364/513 X |
| 4,730,258 | 3/1988 | Takeda et al. | 318/568 X |

*Primary Examiner*—Bentsu Ro
*Attorney, Agent, or Firm*—Mason, Kolehmainen, Rathburn & Wyss

[57] ABSTRACT

The partitioning of circuitry and software on electronic boards in a robot control is arranged to enable respective controls for varied types of robots to be readily assembled and packaged with use of a few standard boards.

The basic control system is formed from an arm interface (AIF) board and a torque processor (TP) board and a servo control (SCM) board. The AIF board has a VME bus terminated in multiple pin connectors for interconnection with the TP and SCM boards and any other boards or additional units to be included in a particular robot control. An AIF connector is also provided for TP board connection on a VMX bus.

Robot controls with extended control performance are packaged by including additional boards. For example, the system control board includes a VME bus connector for connection to the AIF board to provide a robot control with higher control capacity.

Input/output devices such as programmable controllers, peripherals such as CRTs, and supervisory computers can also be coupled to the control through AIF interconnectors.

The AIF board contains robot dependent circuitry so that different AIF boards can be used to assemble different controls for different robots. For example, different board circuitry is used for absolute position feedback as opposed to incremental position feedback or for brush type DC motors are opposed to brushless DC motors.

8 Claims, 54 Drawing Sheets

UNIVERSAL ROBOT CONTROL BOARD CONFIGURATION

This application is a continuation, of application Ser. No. 06/932,982 filed Nov. 20, 1986 now abandoned.

CROSS REFERENCE TO RELATED APPLICATIONS

The following concurrently filed patent applications. each filed on Nov. 20, 1986, are related to the disclosure of the present application, assigned to the present assignee and are hereby incorporated by reference.

U.S. Ser. No. 932,975 (W.E. Case 53,224) now Continuation Ser. No. 180,719 filed Apr. 4, 1988 (W.E. Case 53,224C) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercollotti, Richard A. Johnson, Richard J. Casler, Jr. and Eimei Onaga.

U.S. Ser. No. 932,841 (W.E. Case 53,225), now Continuation Ser. No. 231,627, filed Aug. 5, 1988 (W.E. Case 53,225C) entitled DIGITAL ROBOT CONTROL HAVING AN IMPROVED PULSE WIDTH MODULATOR and filed by Kenneth E. Daggett.

U.S. Ser. No. 932,992 (W.E. Case 53,226) now Continuation Ser. No. 180,703 filed Apr. 5, 1988 (W.E. Case 53,226C) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W.E. Case 53,227) entitled DIGITAL ROBOT CONTROL HAVING HIGH PERFORMANCE SERVO CONTROL SYSTEM and filed by Kenneth E. Daggett, Richard J. Casler, Jr. and Eimei Onaga.

U.S. Ser. No. 932,974 (W.E. Case 53,367), now continuation Ser. No. 178,813 filed Apr. 1, 1988 (W.E. Case 53,367C) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler, Jr.

U.S. Ser. No. 932,853 (W.E. Case 53,368) now continuation Ser. No. 178,811 filed Apr. 1, 1988 (W.E. Case 53,368C), entitled IMPROVED POSITION AND VELOCITY FEEDBACK SYSTEM FOR A DIGITAL ROBOT CONTROL and filed by Kenneth E. Daggett, Richard J. Casler, Jr. and Eimei Onaga.

U.S. Ser. No. 932,991 (W.E. Case 53,372) entitled BASIC DIGITAL MULTI-AXIS ROBOT CONTROL HAVING MODULAR PERFORMANCE EXPANSION CAPABILITY and filed by Kenneth E. Daggett, Barrett Booth, Eimei Onaga and Richard J. Casler, Jr.

U.S. Pat. No. 4,786,847 (W.E. Case 53,373) entitled IMPROVED DIGITAL CONTROL FOR MULTIAXIS ROBOTS and filed by Kenneth E. Daggett, Richard J. Casler, Jr. Eimei Onaga, Barett Booth, Rajan Penkar, Leonard C. Vercellotti and Richard A. Johnson.

U.S. Ser. No. 932,983 (W.E. Case 53,374) entitled MODULAR ROBOT CONTROL SYSTEM and filed by Kenneth E. Daggett, Barrett Booth, Vincent P. Jalbert, Eimei Onaga and Richard J. Casler, Jr.

U.S. Ser. No. 932,977, now Continuation Ser. 180,601 filed Apr. 6, 1988 (W.E. Case 53,423C) entitled MULTIPROCESSOR TORQUE SERVO CONTROL FOR MULTIAXIS DIGITAL ROBOT CONTROL SYSTEM and filed by Kenneth E. Daggett, Richard J. Casler, Jr. and Eimei Onaga.

U.S. Ser. No. 932,990 (W.E. Case 53,424), now Continuation Ser. No. 180,723 filed Mar. 4, 1988 (W.E. Case 53,424C) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Jr., Kenneth E. Daggett and Barrett Booth.

U.S. Pat. No. 4,829,219 (W.E. Case 53,489) entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,829,219 (W.E. Case 53,490) entitled MULTIAXIS ROBOT CONTROL HAVING CAPABILITY FOR EXECUTING TIMED MOVES and filed by Rajan Penkar.

U.S. Pat. No. 4,772,831, (W.E. Case 53,491) entitled MULTIAXIS ROBOT CONTROL HAVING IMPROVED CONTINUOUS PATH OPERATION and filed by Rajan Penkar.

U.S. Pat. No. 4,773,025, (W.E. Case 53,492) entitled MULTIAXIS ROBOT CONTROL HAVING FITTED CURVED PATH CONTROL and filed by Rajan Penkar and Timothy P. Skewis.

U.S. Ser. No. 932,973 (W.E. Case 53,493), now Continuation Ser. No. 180,598 filed Apr. 6, 1988 (W.E. Case 53,493C) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 (W.E. 53,494) entitled MULTIAXIS DIGITAL ROBOT CONTROL HAVING A BACKUP VELOCITY MONITOR AND PROTECTION SYSTEM and filed by Eimei Onaga and Richard J. Casler, Jr.

BACKGROUND OF THE INVENTION

The present invention relates to robots and more particularly to electronic board configurations for robot controls.

Industrial robots are manufactured in a variety of designs and sizes to perform a wide variety of industrial production tasks. Hydraulic or pneumatic drive power can be employed to produce robot arm motion, but electric drive power is being employed increasingly.

In electric control systems, variations can occur from robot type to robot type in a number of ways including the number of joints to be driven, the size and type of joint drives (such as hydraulic or electric), the type of electric drive (such as DC brush type or DC brushless), the type of position feedback (incremental or absolute), the type of velocity feedback (tachometer or position change derived), etc.

Moreover, wide variations can occur in the work cell environment and the factory environment in which a particular robot is to be placed. For example, one or more robots may be grouped together to work on a coordinated basis possibly with other machines and controllers and with a variety of input/output devices. At the factory level, production management and coordination may require that supervisory computer control be placed on the individual robot or group of robots.

Finally, different users may have different needs with respect to the level and sophistication of control performance. Robot controls thus should have sufficient configuration flexibility to enable economic accommodation of the control configuration to variable control performance requirements.

To achieve performance and cost effectiveness and economy of manufacture for robot controls, it is thus desirable that robot controls be structured both to produce reliable and effective robot operation and to have sufficient flexibility and control and communication capability to enable ready and economic adaptation of the control for use with the wide variety of commercially available robots, for use in the wide variety of user work cell and factory environments, and for use with a performance control level suitable to the customer application. In short, it is desirable that robot controls be arranged both in software/ circuit architecture and in implementing electronic board configuration to be universal or near universal in application.

The incorporated-by-reference patent applications relate to a completely digital robot control that is provided with software/circuit architecture meeting the needs of universality. Much greater detail on the structure and operation of that digital control can be found in those applications. The present invention relates to a board configuration which implements the digital control and provides for flexible and economic packaging of different robot controls for different robots and/or different customer needs for like robots.

SUMMARY OF THE INVENTION

A variably packagable robot control is adaptable for use with a relatively wide variety of robots.

A first electronic arm interface board is provided with substantially all control circuitry dependent on a first robot type to be controlled including motor drive circuitry and position and velocity feedback processing circuitry.

A second electronic arm interface board is provided with substantially all control circuitry dependent on a second robot type to be controlled including motor drive circuitry and position and velocity feedback circuitry.

The control further includes electronic control board means having control and resource circuitry capable of providing at least complete basic robot control and structured to operate substantially independently of any particular robot type to be controlled out of a group of different controllable robot types.

Interconnector means couple the electronic control board means with one of the arm interface boards to form an assembled control or the robot type associated with the one arm interface board.

BRIEF DESCRIPTION OF THE DRAWINGS

FIGS. 8A to 8K show circuitry on an AIF board in FIG. 5B which especially adapts it for use with DC brush type motors and incremental position feedback and velocity feedback derived from position change.

DESCRIPTION OF THE PREFERRED EMBODIMENT

ROBOTS—GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A drive system is used for each motion axis, and it may be electrical, hydraulic or pneumatic.

PUMA ROBOT

Figure 1:
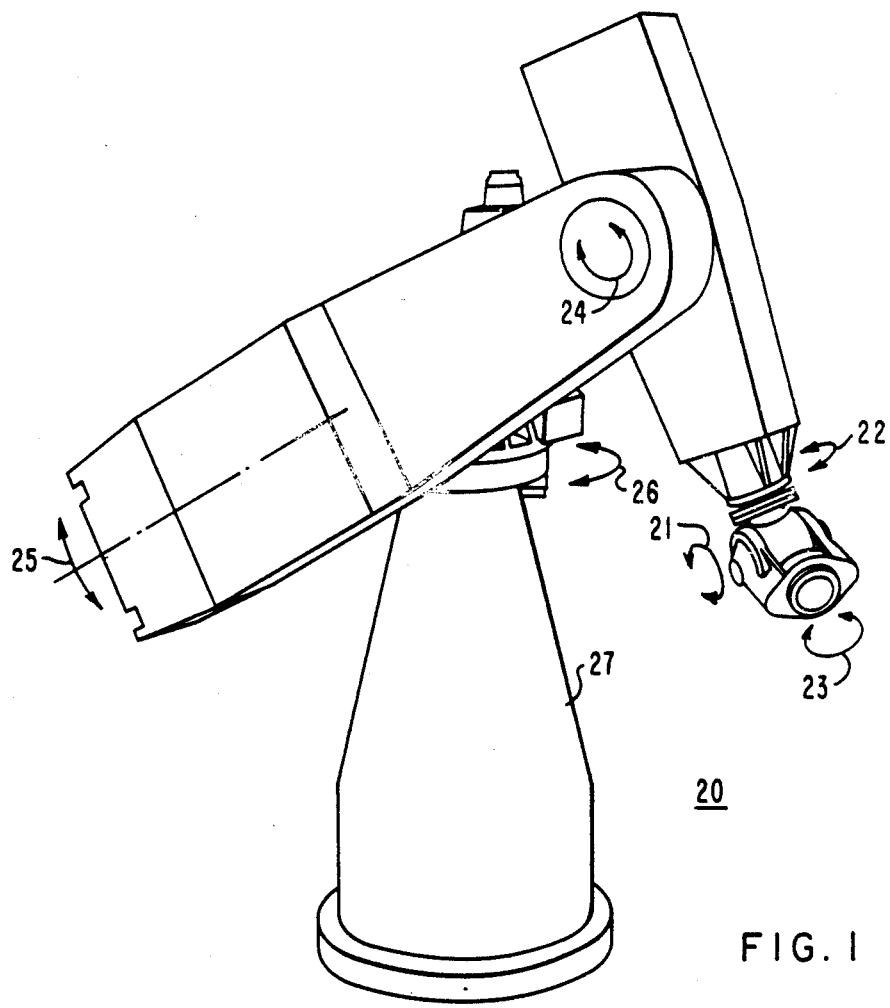
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the hardiest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the robot wrist is provided with three articulations, i.e. an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIG. 2, 3 or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
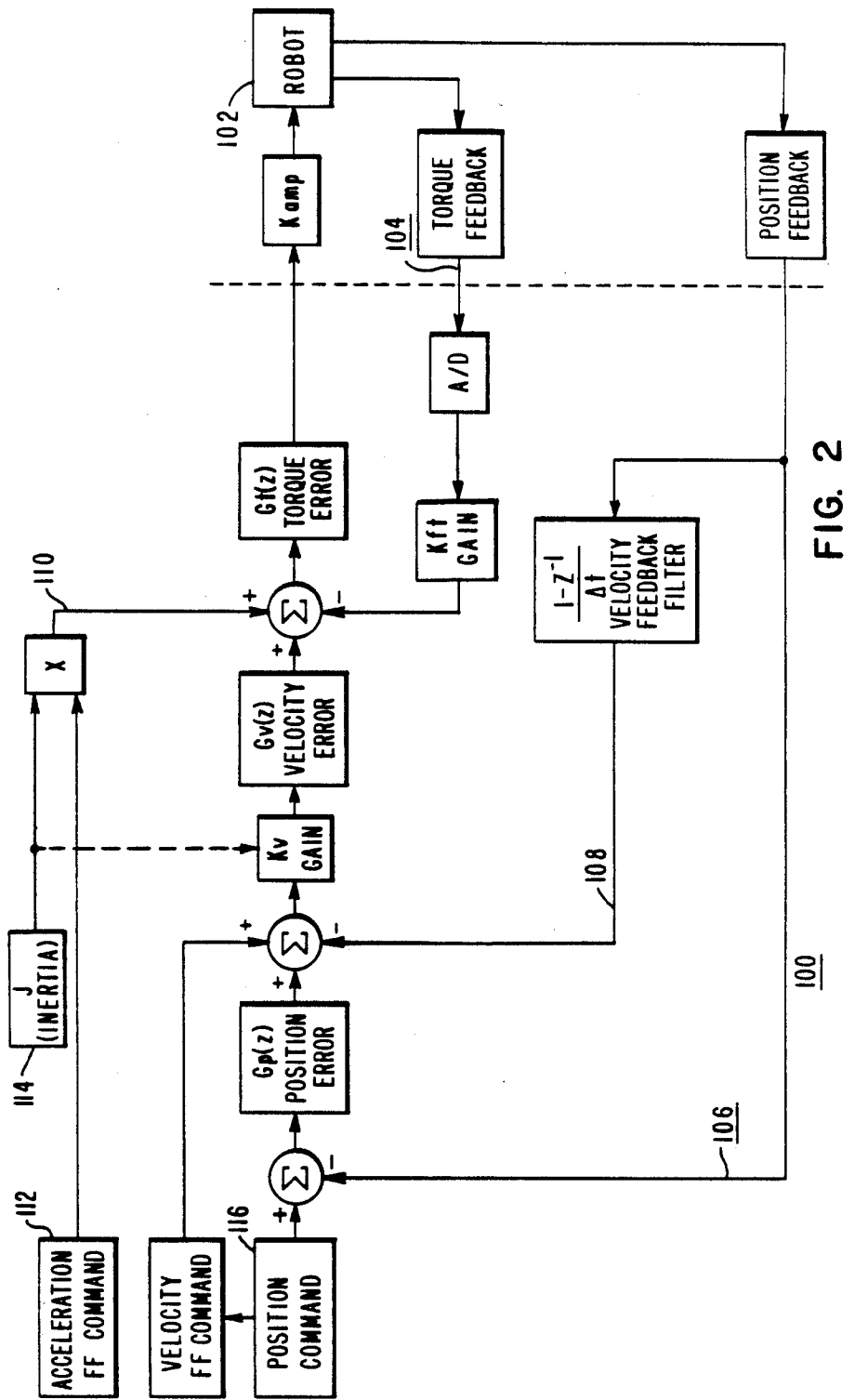
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
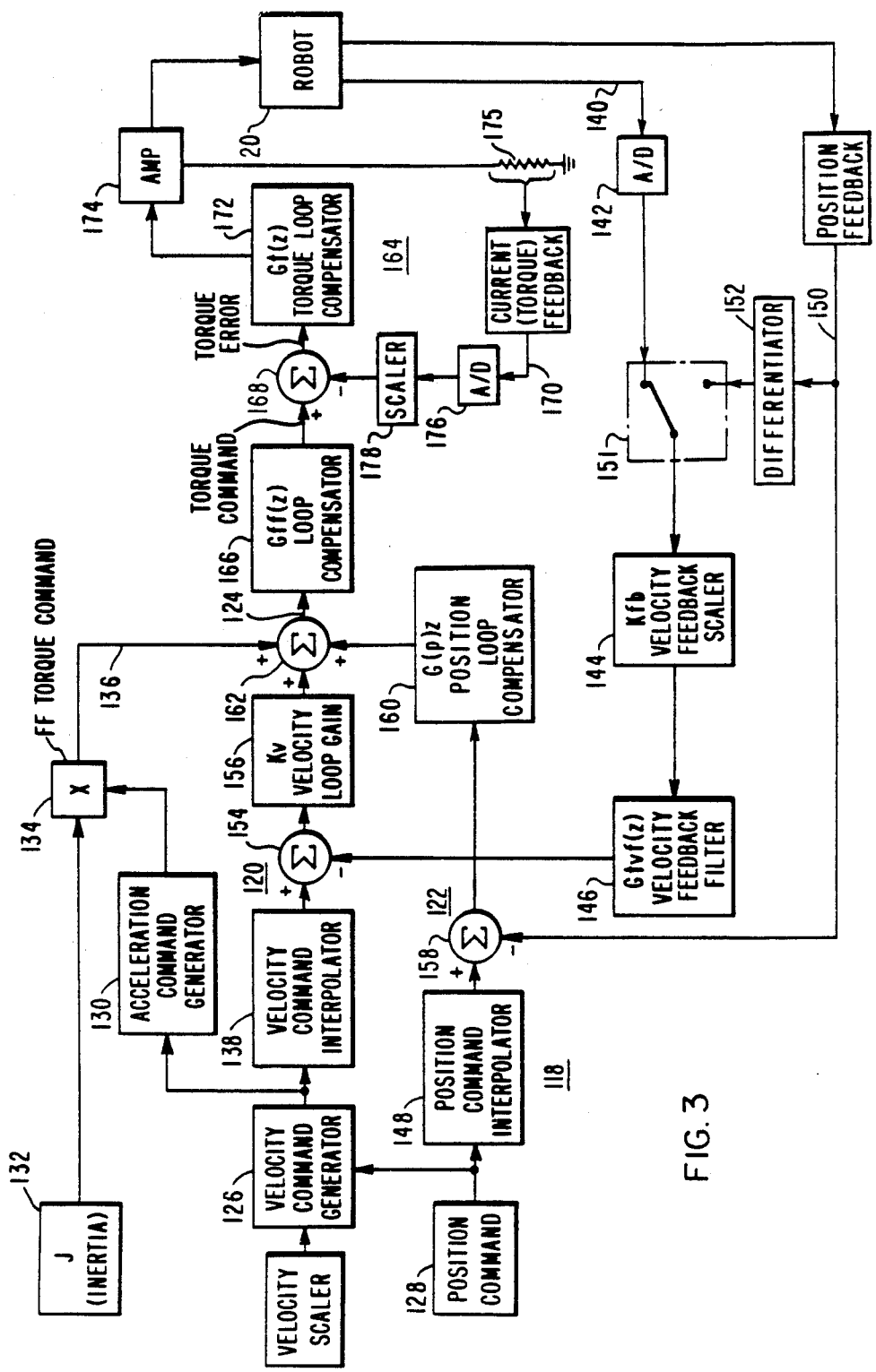
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL TM robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loops 120 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications W.E. 53,225 and W.E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with torque loop gain to the torque error (motor voltage commands) and pulse width modulated (PWM) output signals are applied to a power amplifier 174 which supplies the motor drive current for robot joint operation. Current feedback from resistor 175 is sampled every 250 microseconds (see referenced patent application W.E. 53,324) and converted to digital signals 176 with scaling applied by box 178.

OVERVIEW—ELECTRONIC BOARDS

Figure 4:
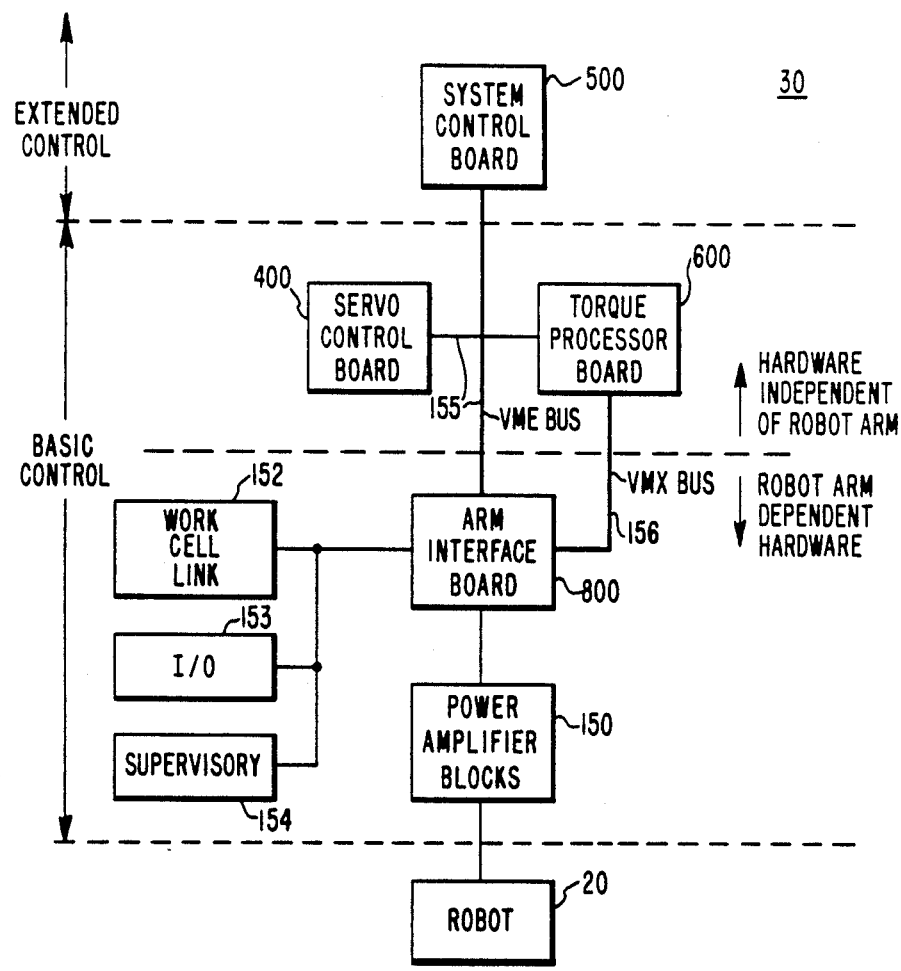
FIG. 4 shows an overview of an arrangement of an arm interface (AIF) board and other electronic boards on which digital or control circuitry is organized in a manner that the boards to be configured to package a robot control in accordance with the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facilitated variability of configuration which enables universality of use, and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated), are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

BASE AIF BOARD—ROBOT ARM DEPENDENT CIRCUITRY

Figure 5A:
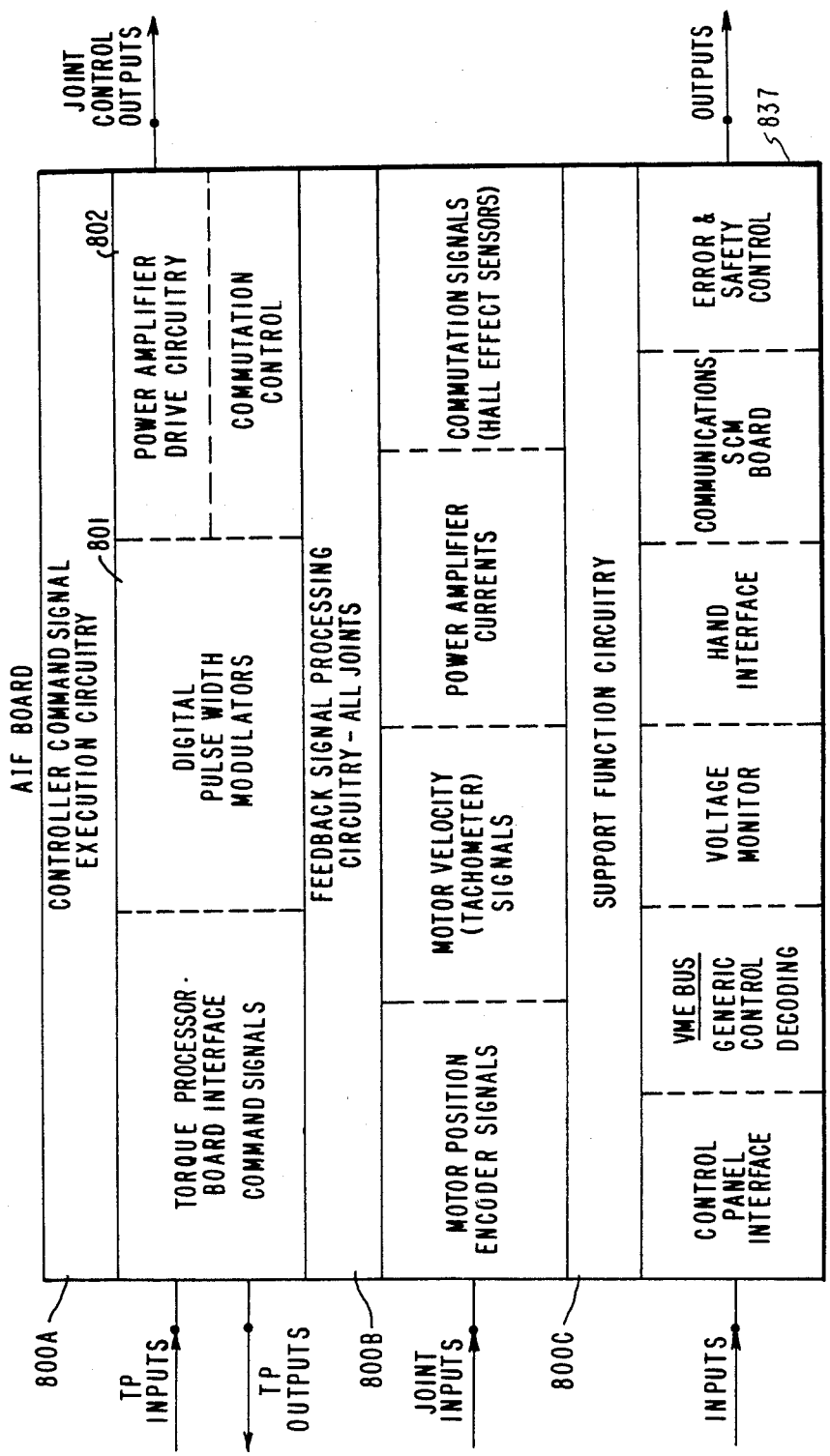
FIG. 5A shows a layout for an AIF board configuration that employs brushless DC motor control circuitry and absolute position feedback circuitry.
Figure 5B:
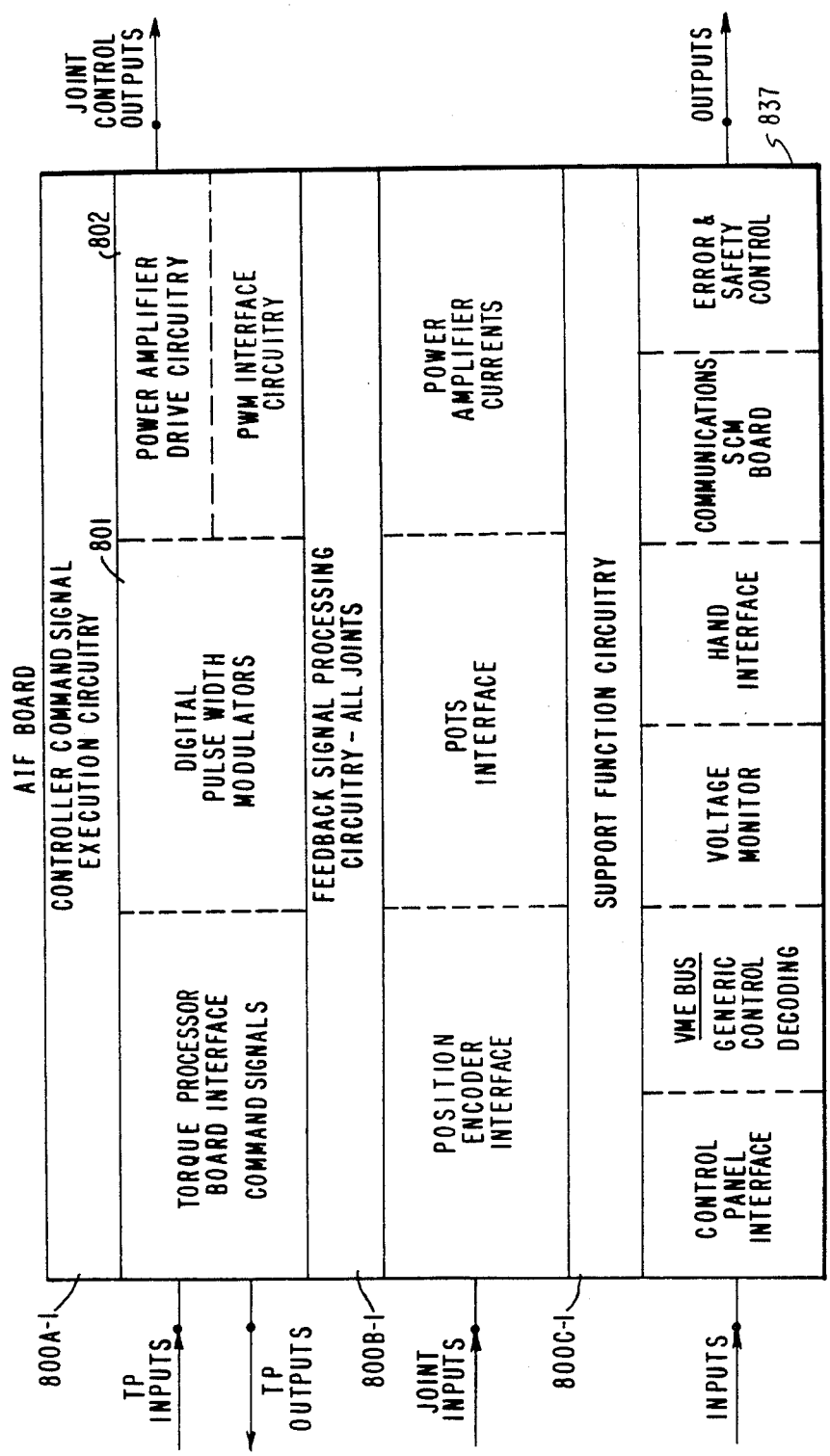
FIG. 5B shows a layout for another AIF board configuration that employs DC brush type motor control circuitry and incremental position change feedback circuitry.

The AIF board 800 in FIGS. 4 and 5A, 6B or 800A in FIG. 5B functions as a base unit in the assembly of electronic boards in a robot control package arranged in accordance with the invention. With the use of similar AIF boards implemented to have some minor differences, a wide variety of robot controls can be produced. With the use of each particular AIF board, different robot controls can be provided with differing levels of control performance by the choice of electronic boards interconnected with the AIF board. In all cases, the robot control has capability for varied communication and coordinated control interfacing with other robots and machines and higher level supervisory computers.

The control system architecture is arranged so that electronic boards at levels in the herarchy above the AIF board, house only (and preferably most or all) control software and circuitry that is substantially independent of the robot arm being controlled. Further, the higher level boards do not contain arm dependent circuitry but may contain arm dependent software.

On the other hand, the AIF board houses substantially all of the robot arm dependent circuitry and appropriate additional circuitry that may be independent of the robot arm being controlled. The particular arm dependent circuitry disposed on the AIF board is determined in accordance with the robot or family of robots to be controlled.

In the present embodiment, two different AIF boards have perhaps 70% common circuitry with the other 30% being different. The AIF board 800 (FIG. 5A) is provided with brushless DC motor control circuitry and absolute position and tachometer feedback circuitry to adapt it for controlling the Unimation 860 robot. Brush type DC motor control circuitry and incremental position feedback circuitry adapt a similar AIF board 800A (FIG. 5B) for controlling the Unimation 700 Series robots.

Figure 7A:
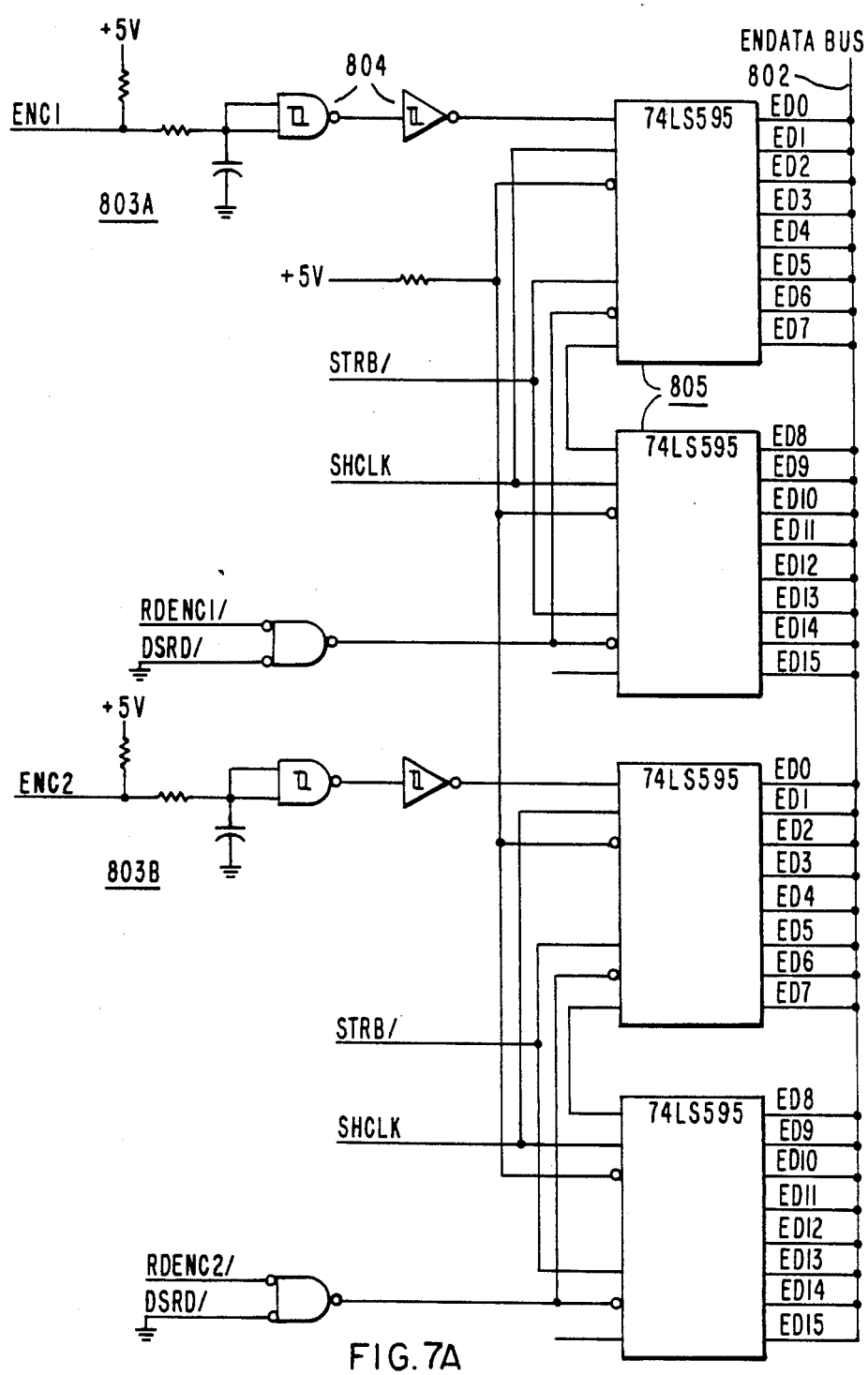
FIGS. 7A to 7T show circuitry on the AIF board in FIG. 5A which especially adapts it for use with DC brushless motors and tachometer and absolute position feedback.
Figure 7B:
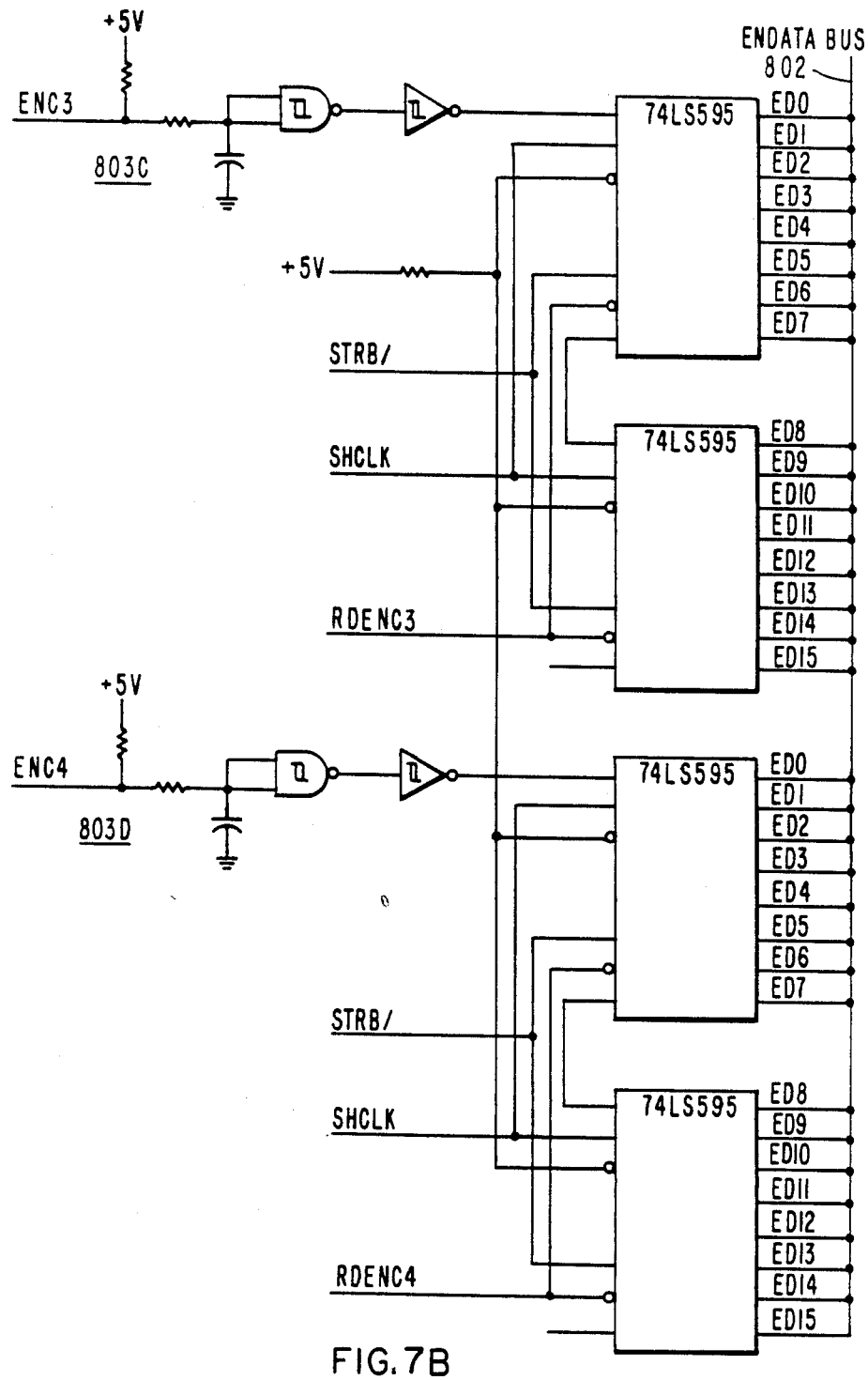
Figure 7C:
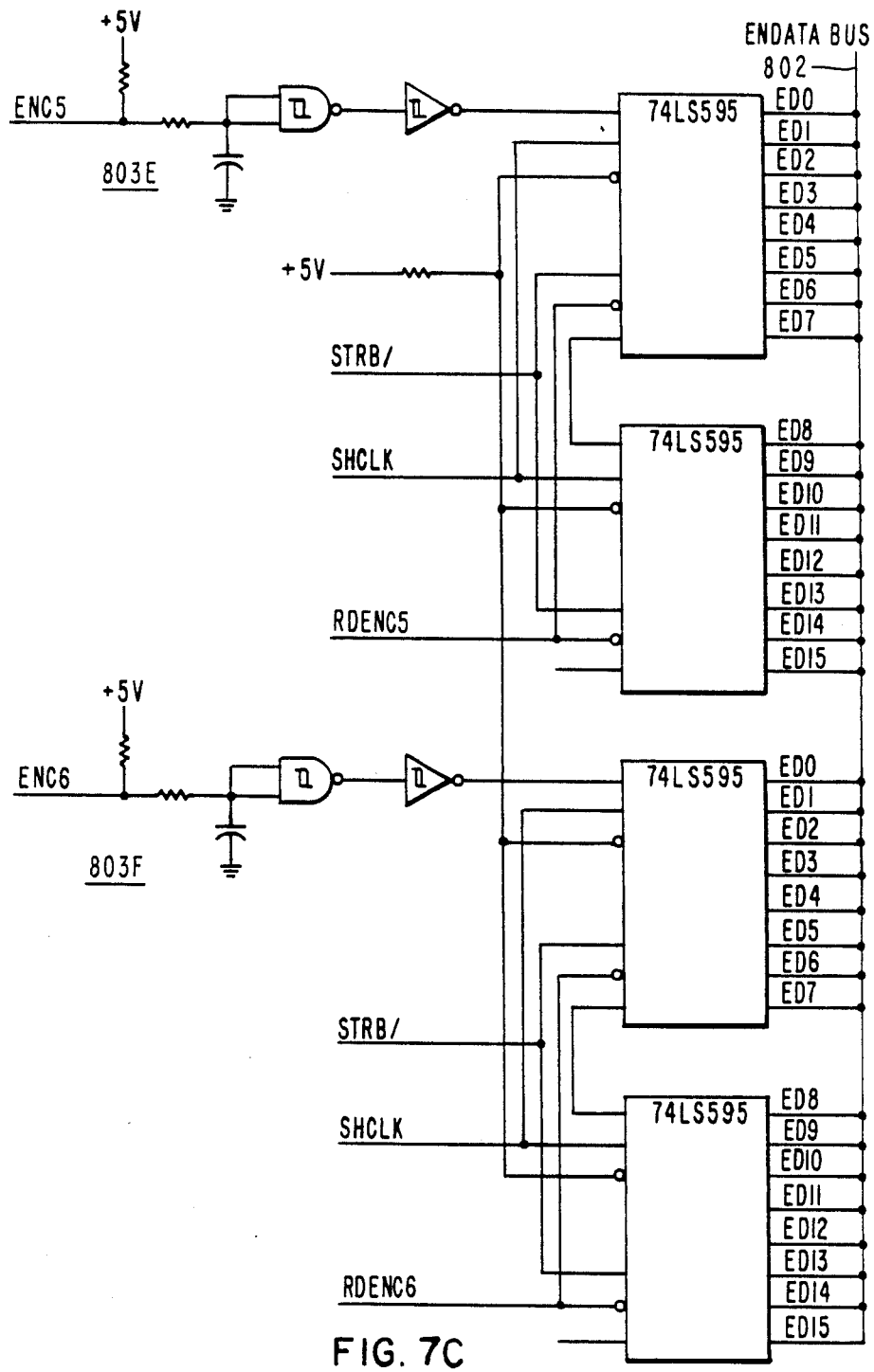
Figure 7D:
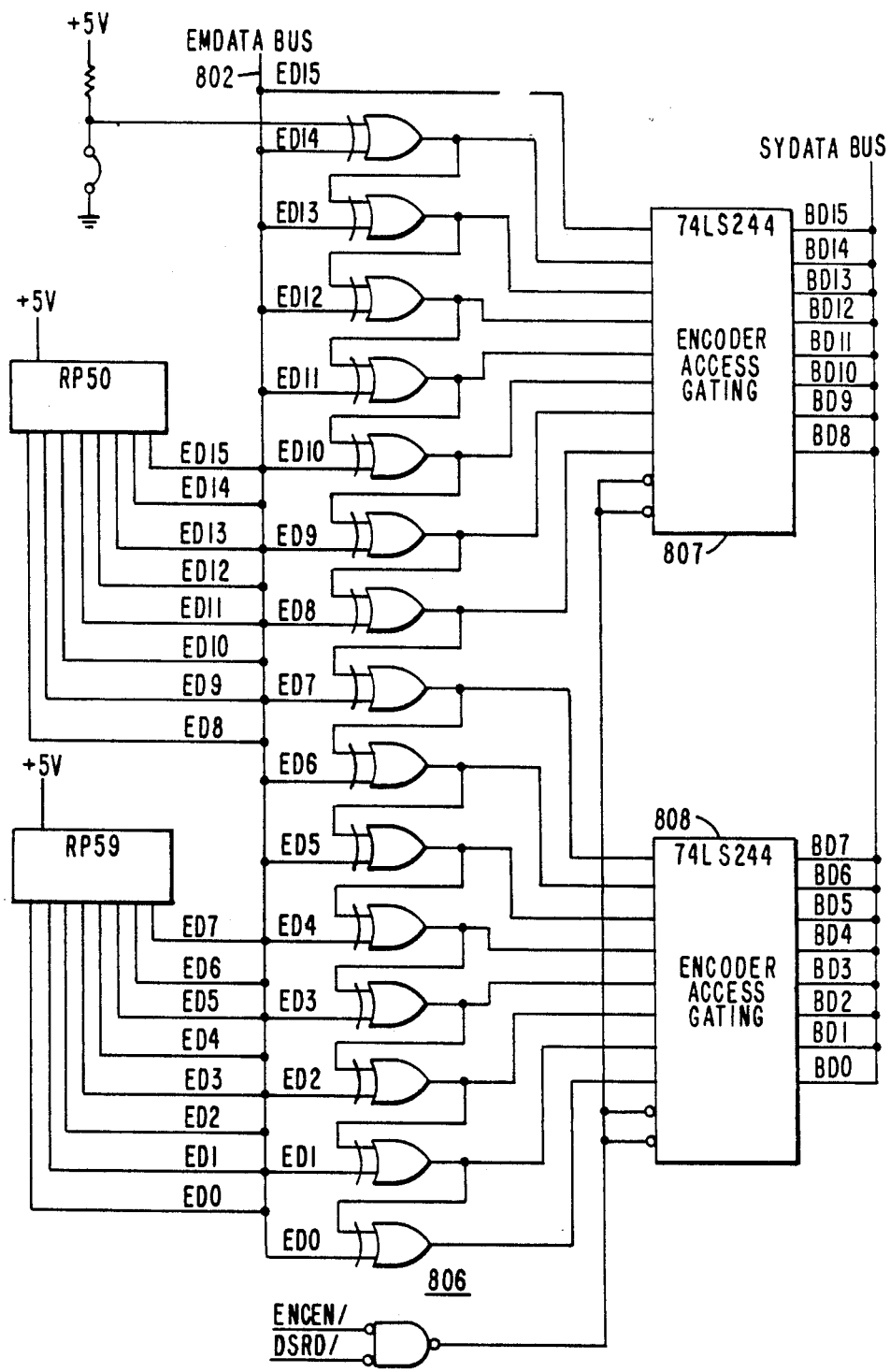
Figure 7F:
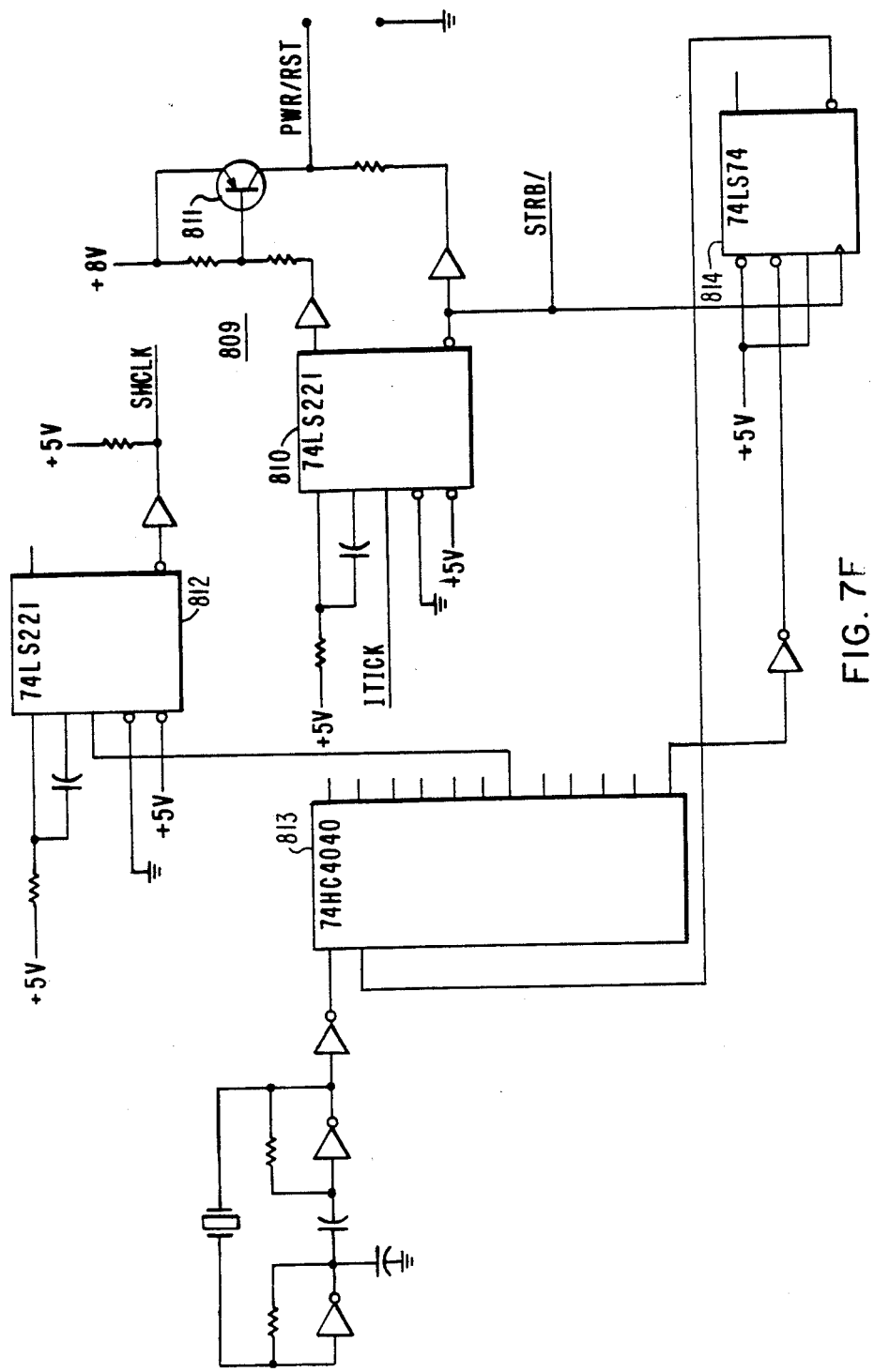
Figure 7F:
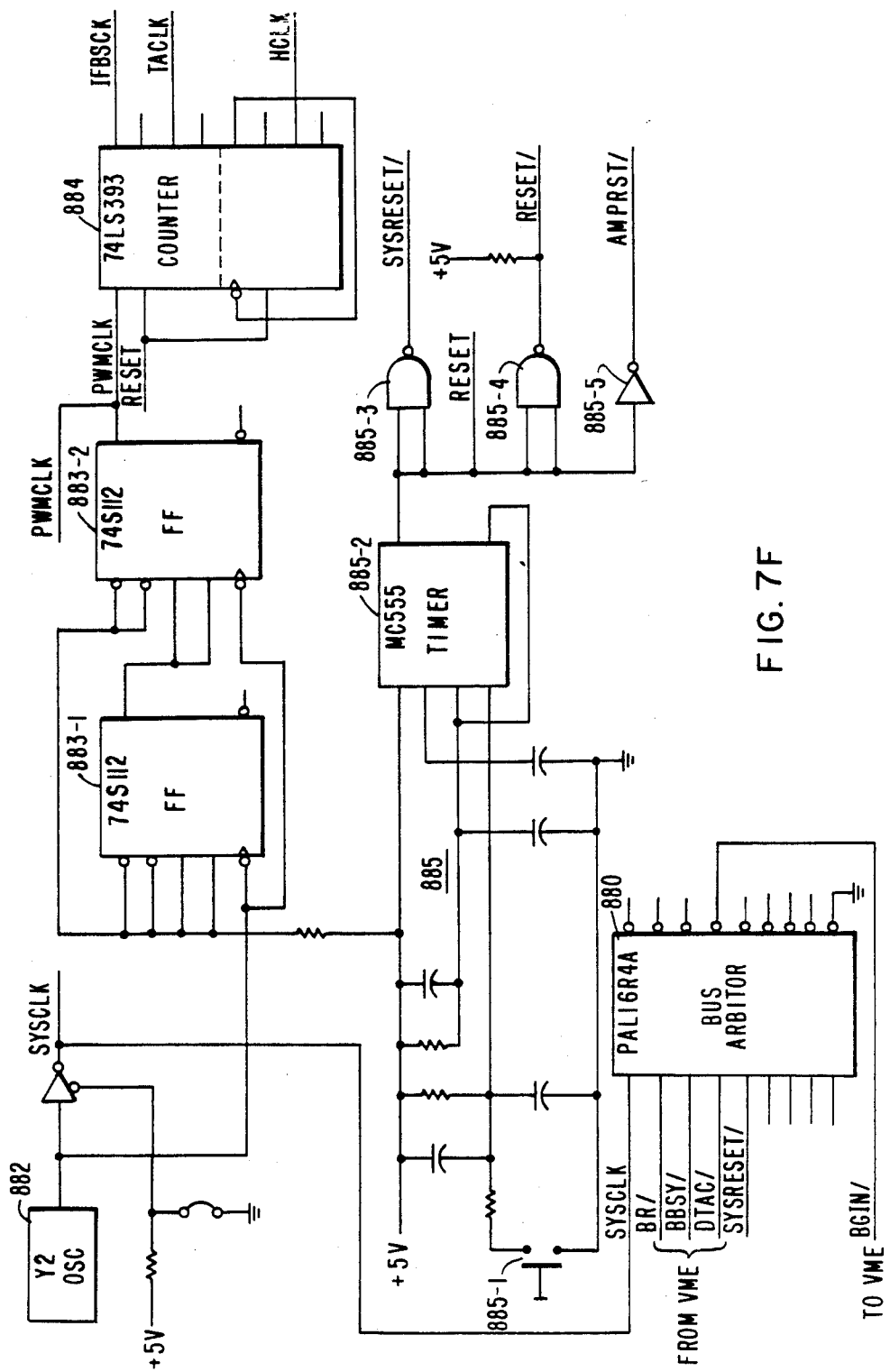
Figure 7G:
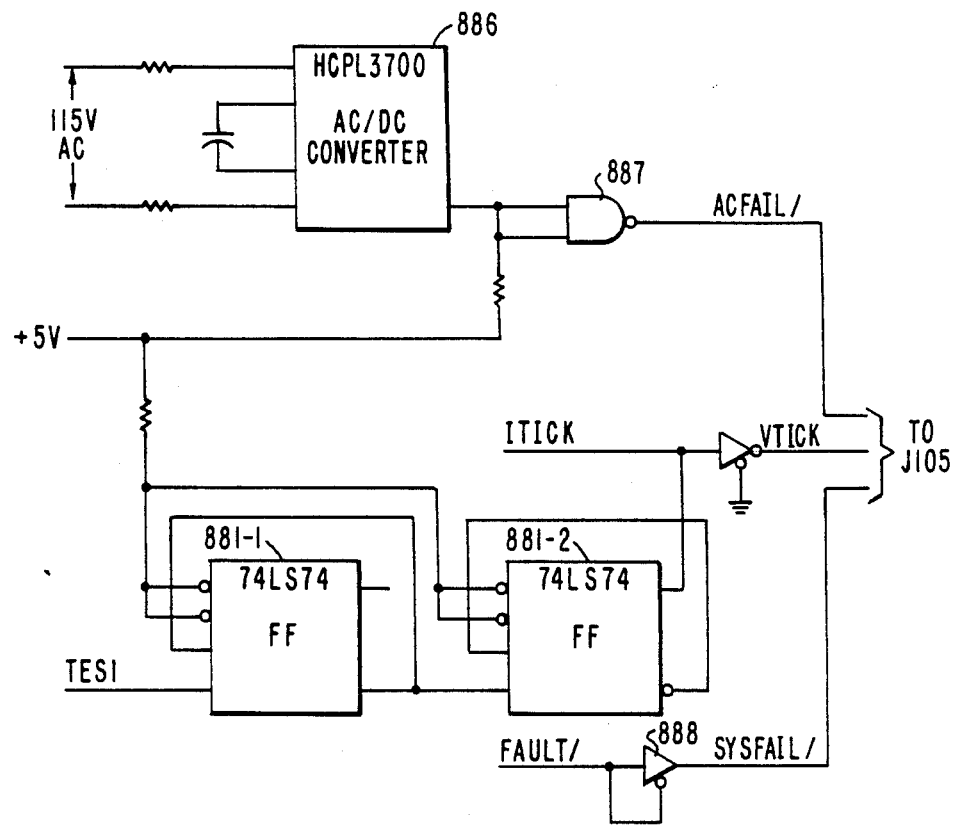
Figure 7H:
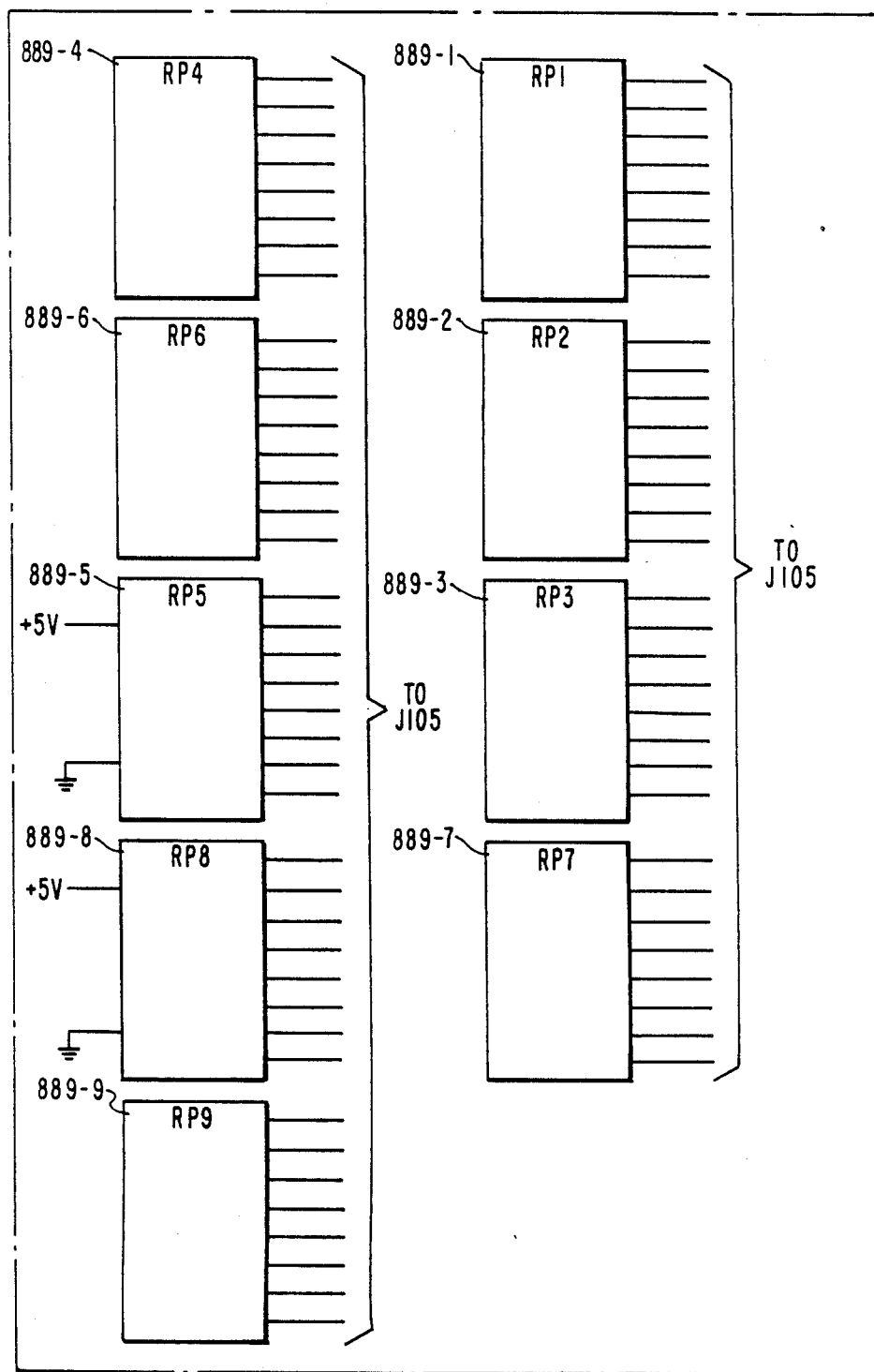
Figure 71:
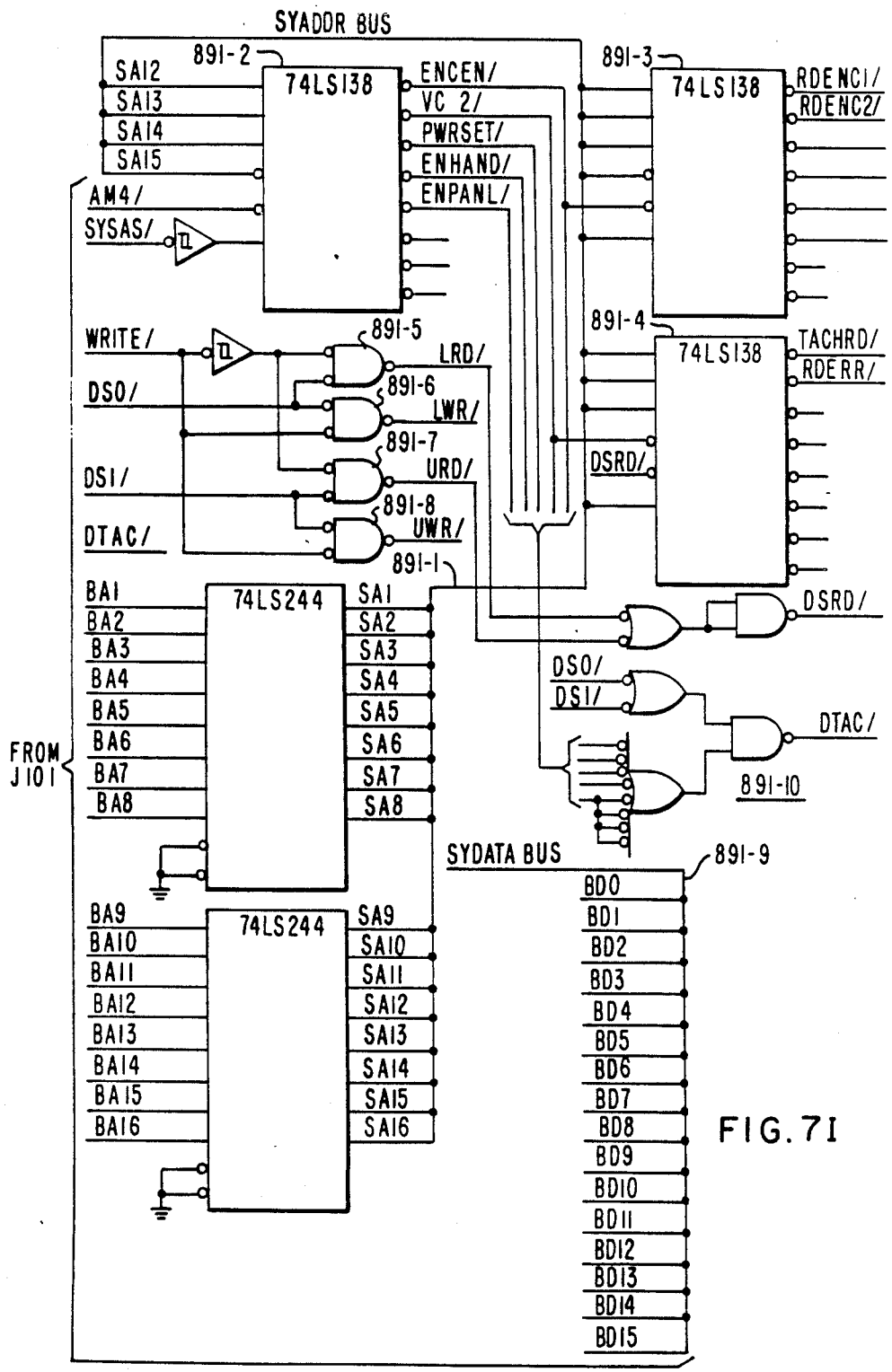
Figures 1, 7J:
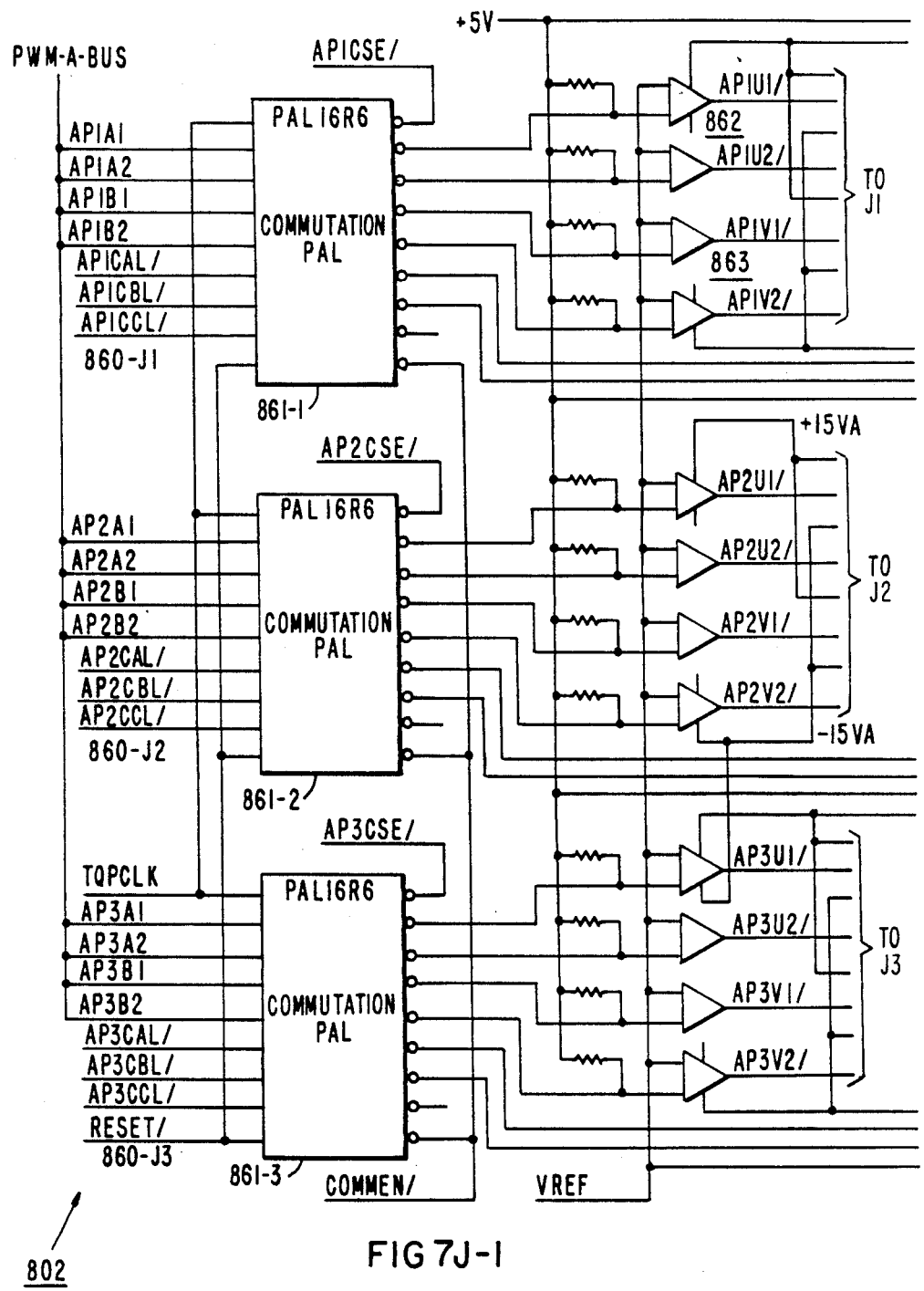
Figures 2, 7J:
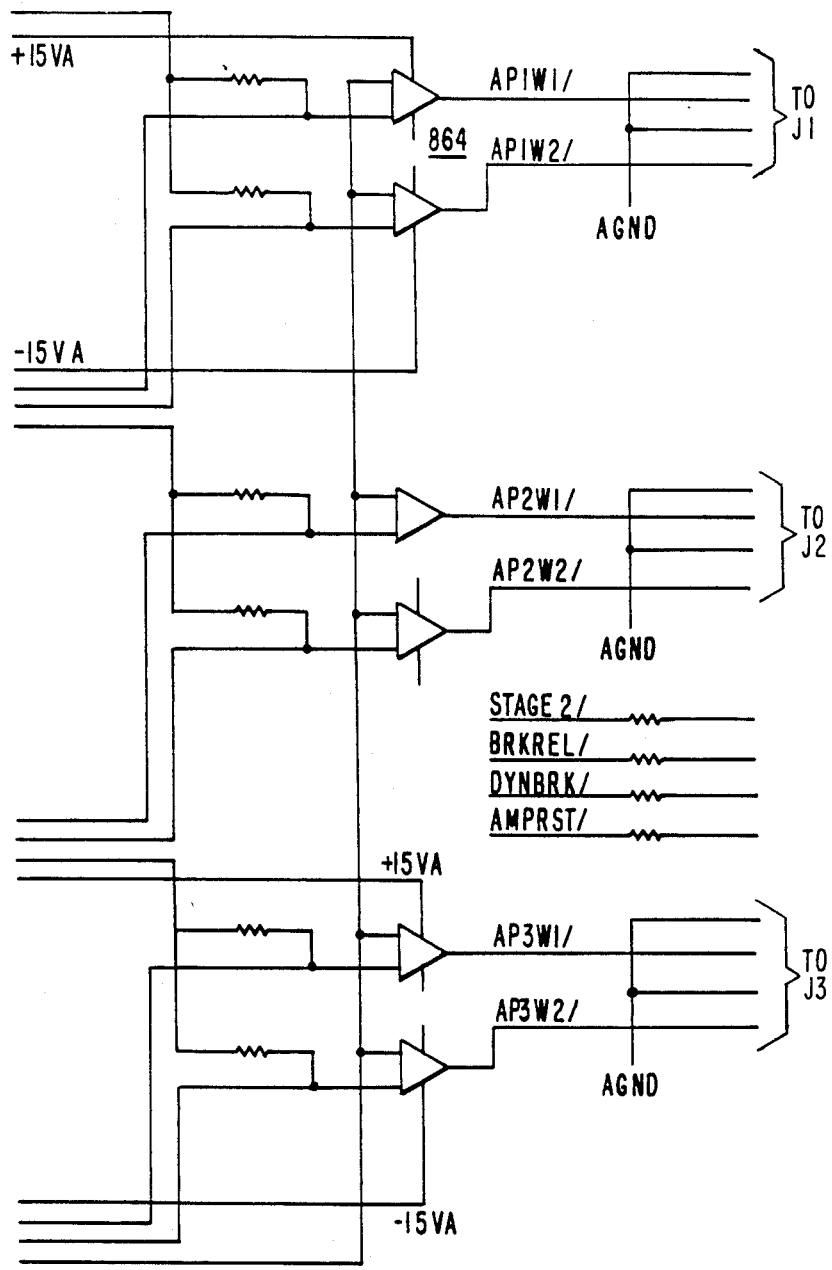
Figures 1, 7K:
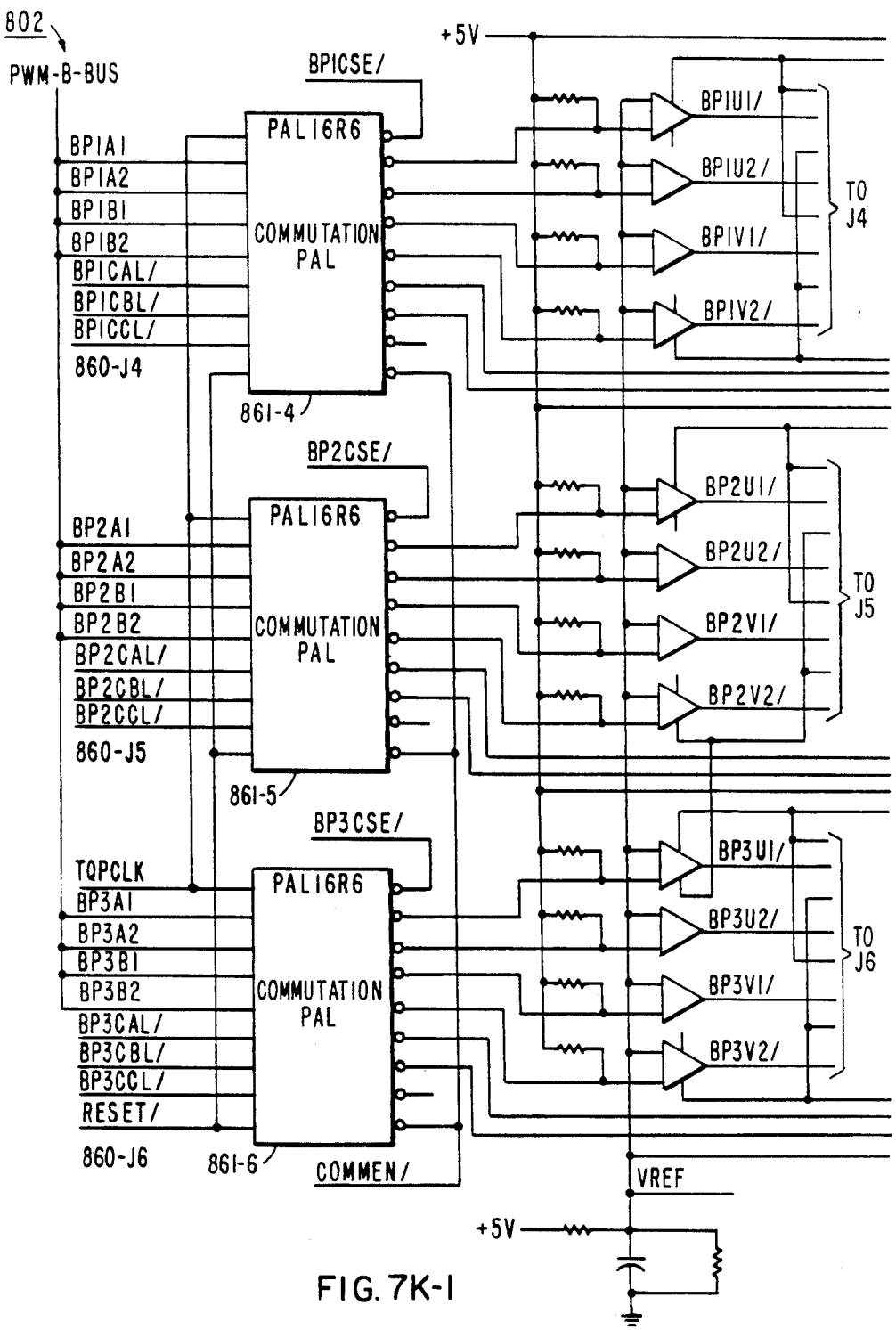
Figures 2, 7K:
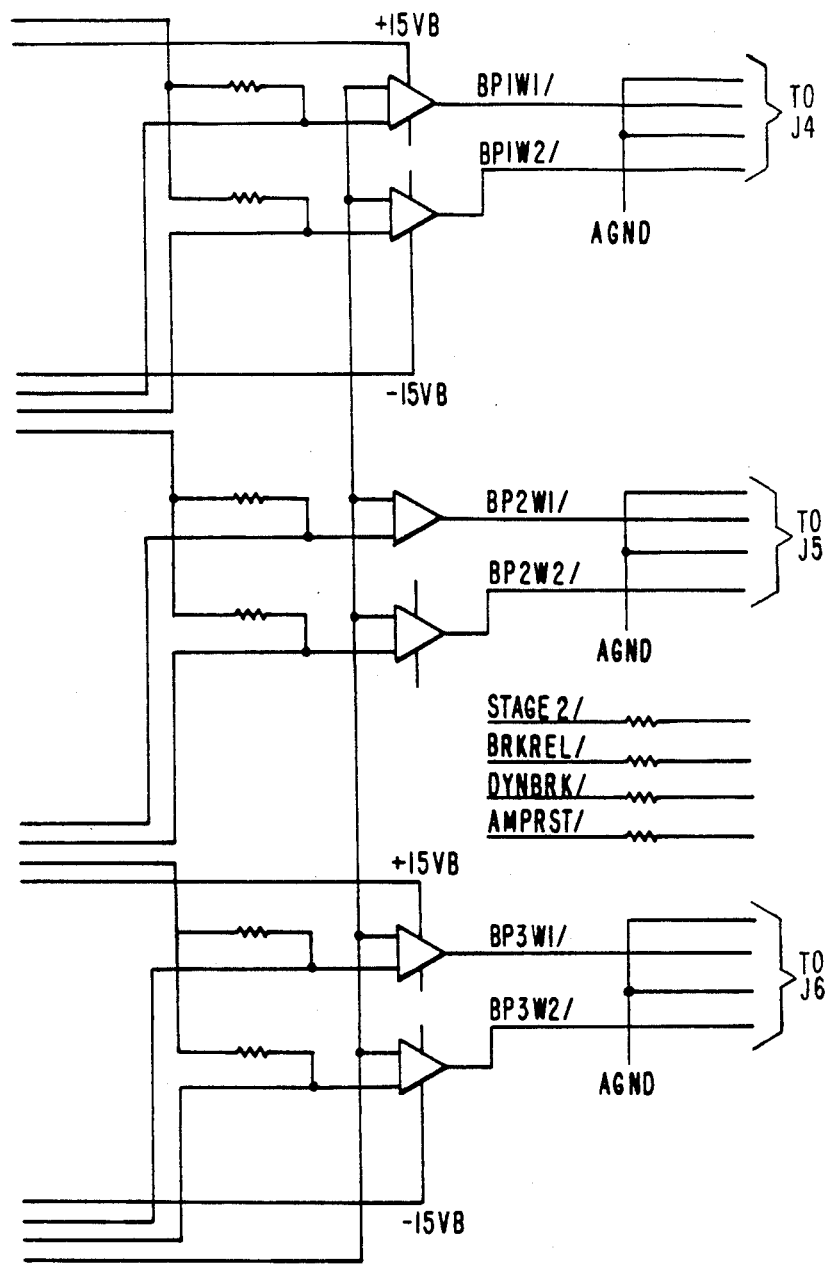
Figures 1, 7L:
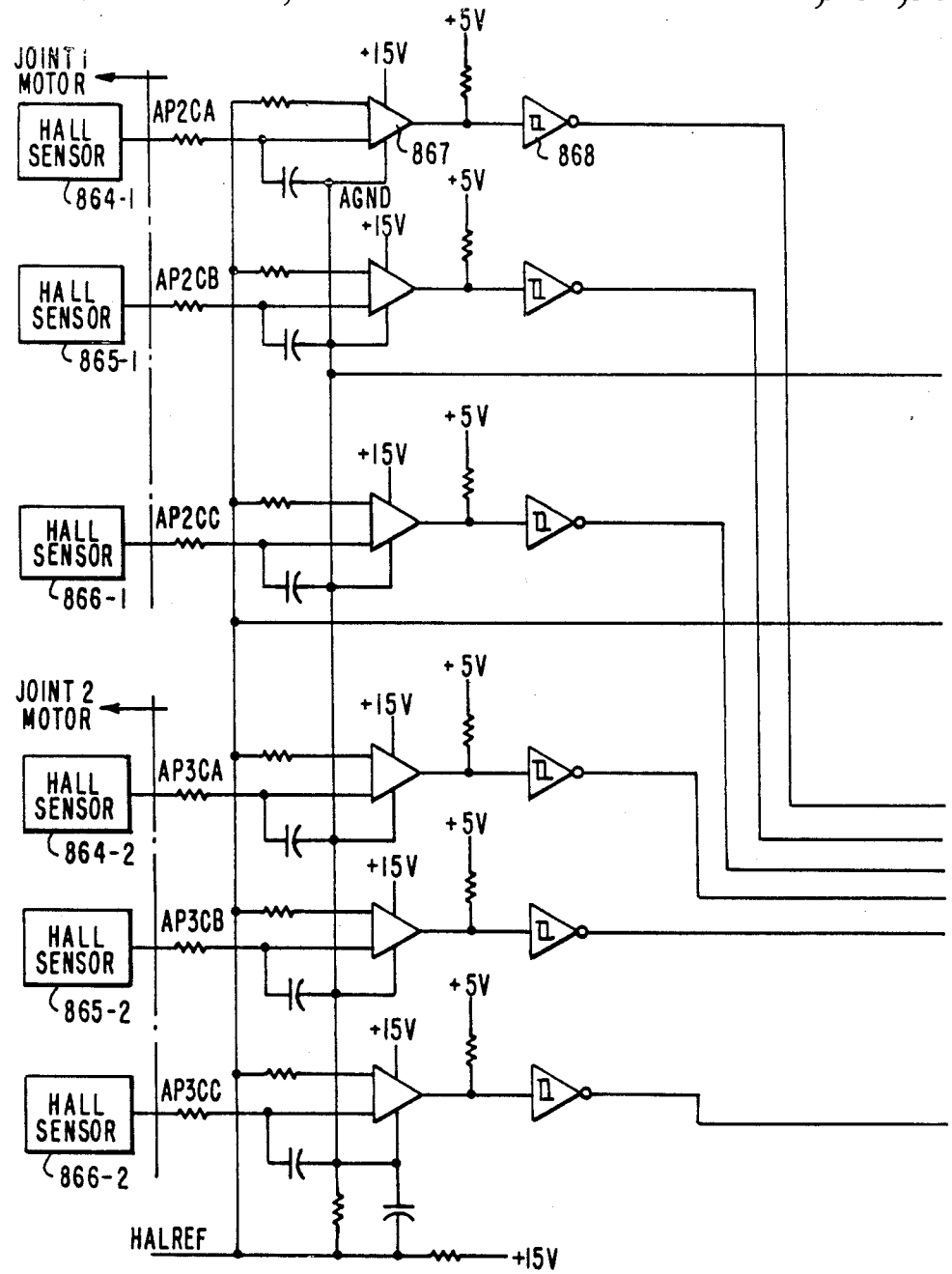
Figures 2, 7L:
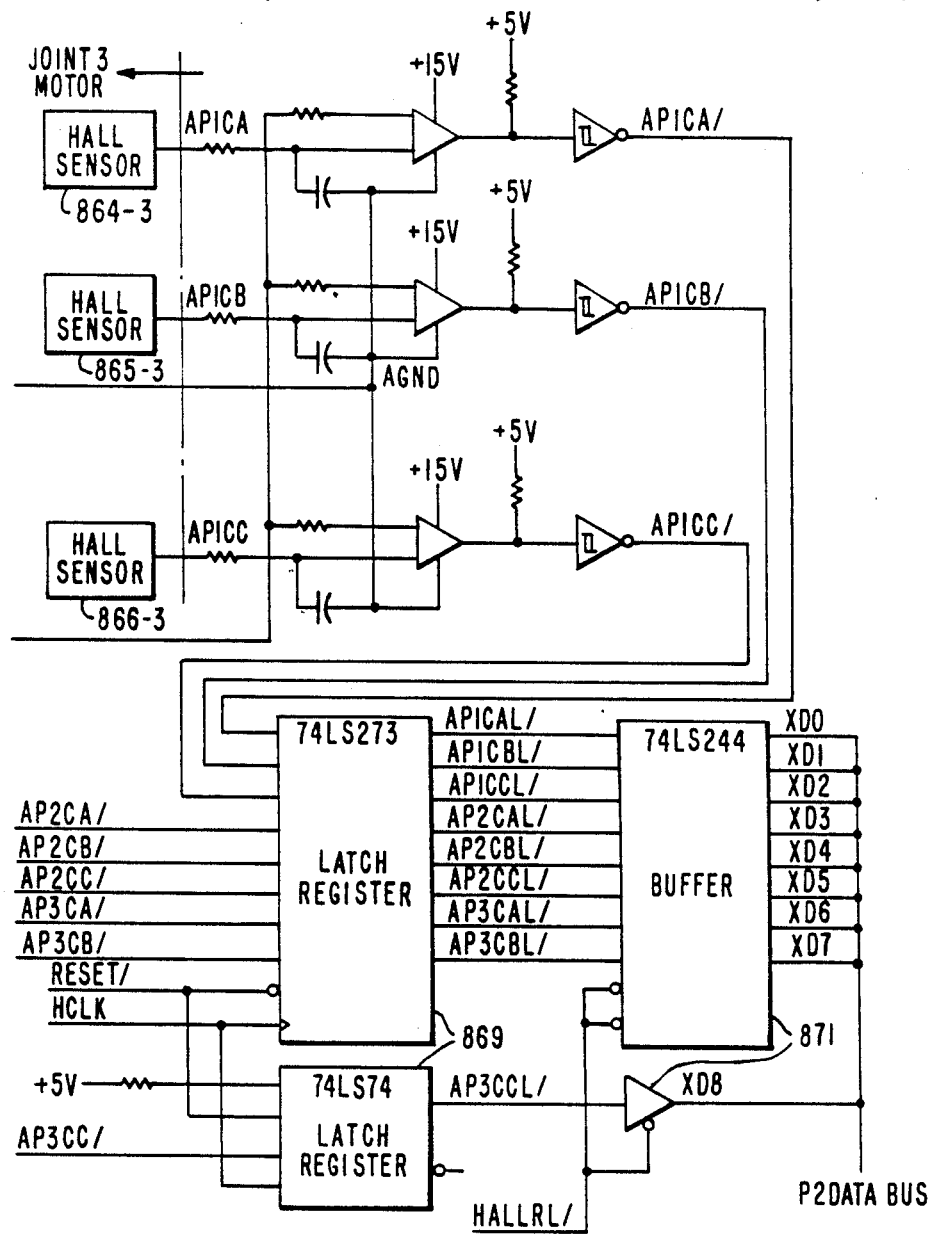
Figures 1, 7M:
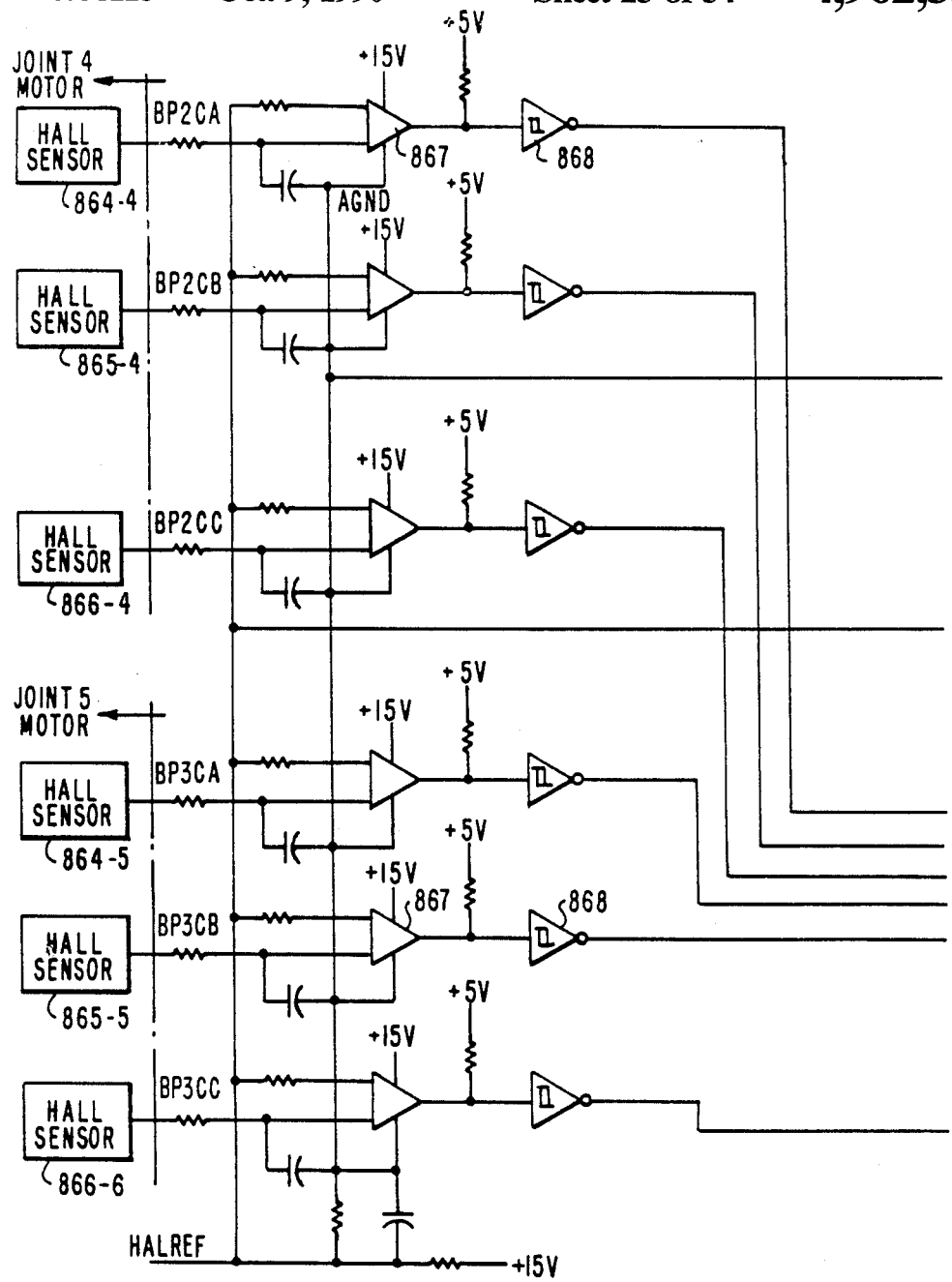
Figures 2, 7M:
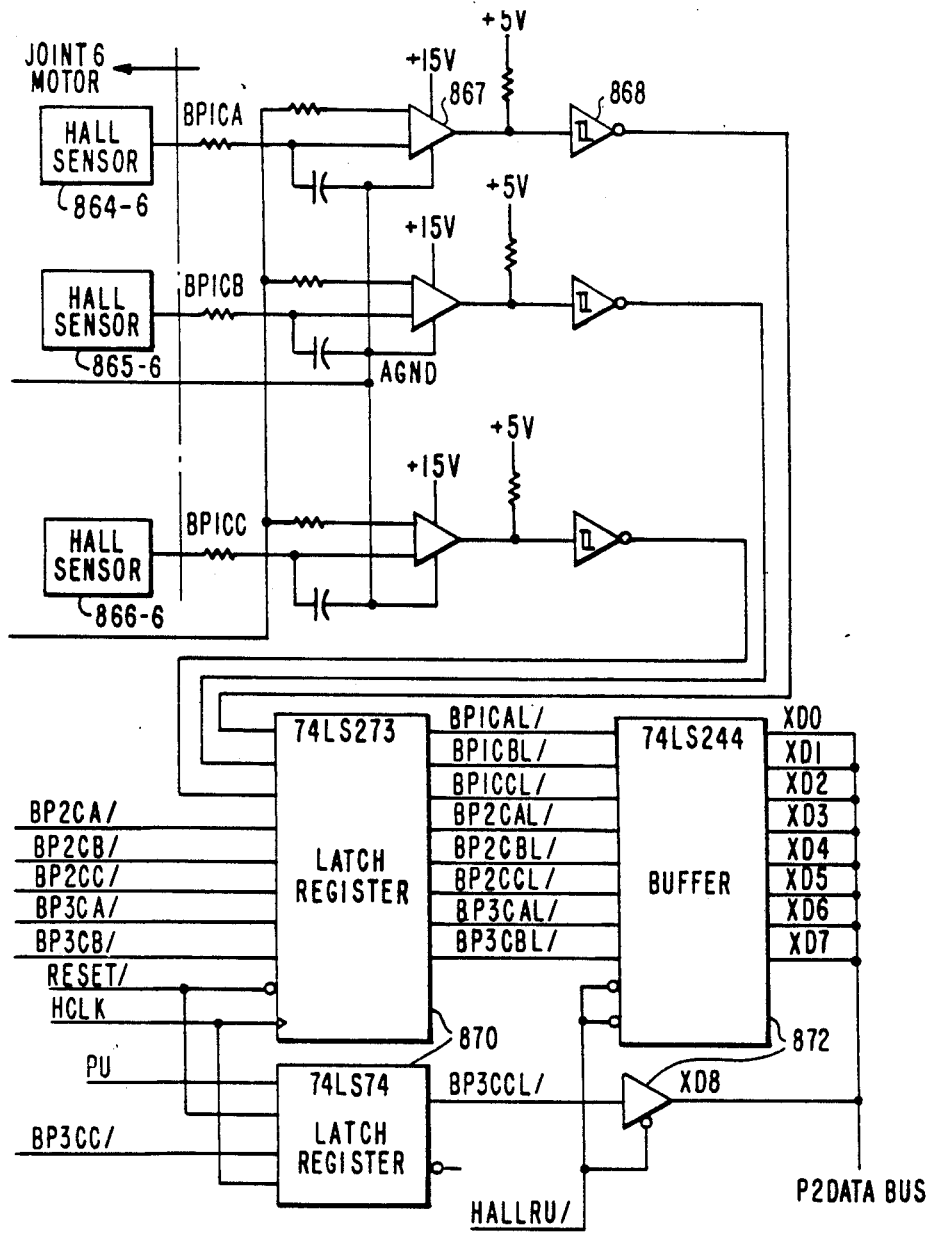
Figures 1, 7N:
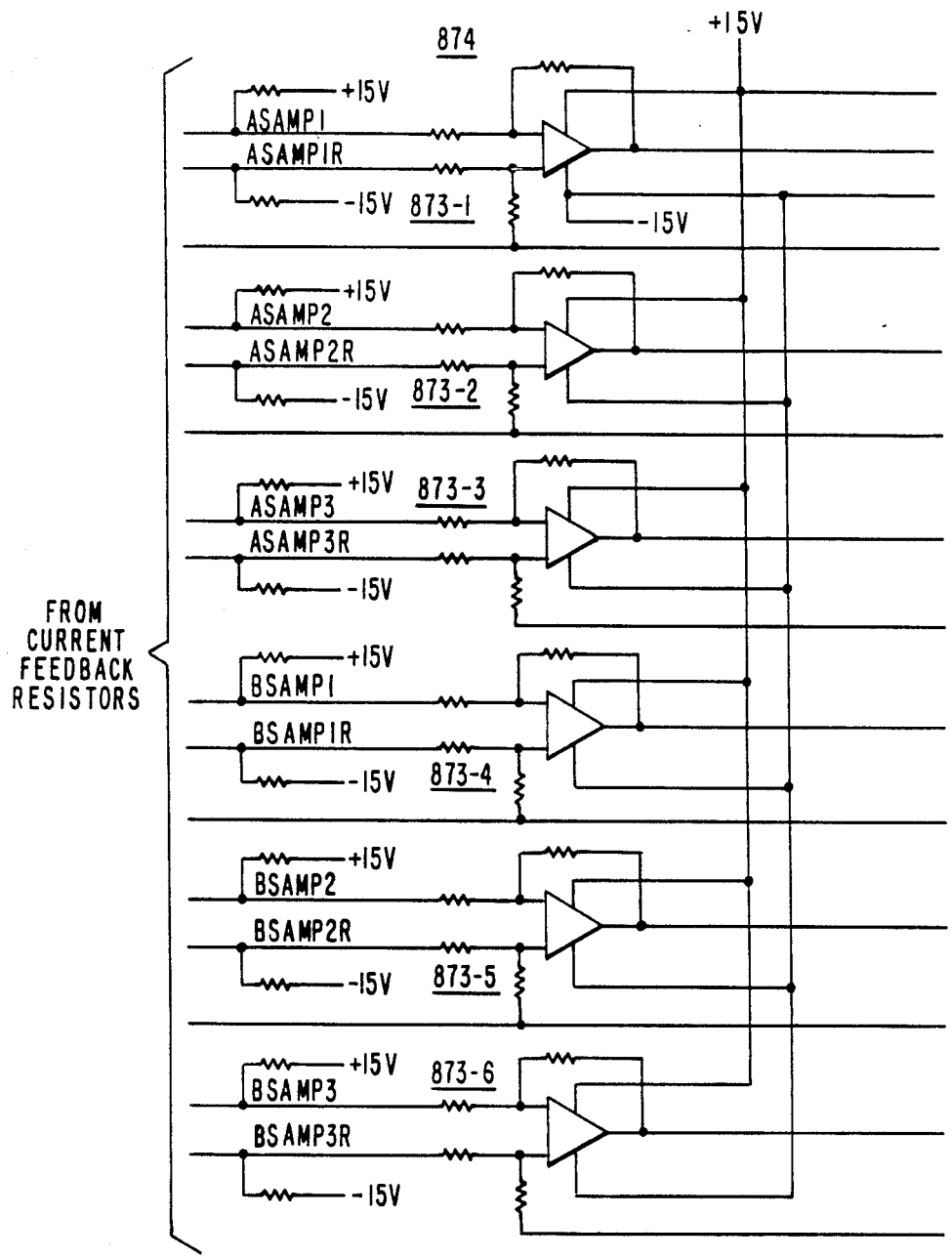
Figures 2, 7N:
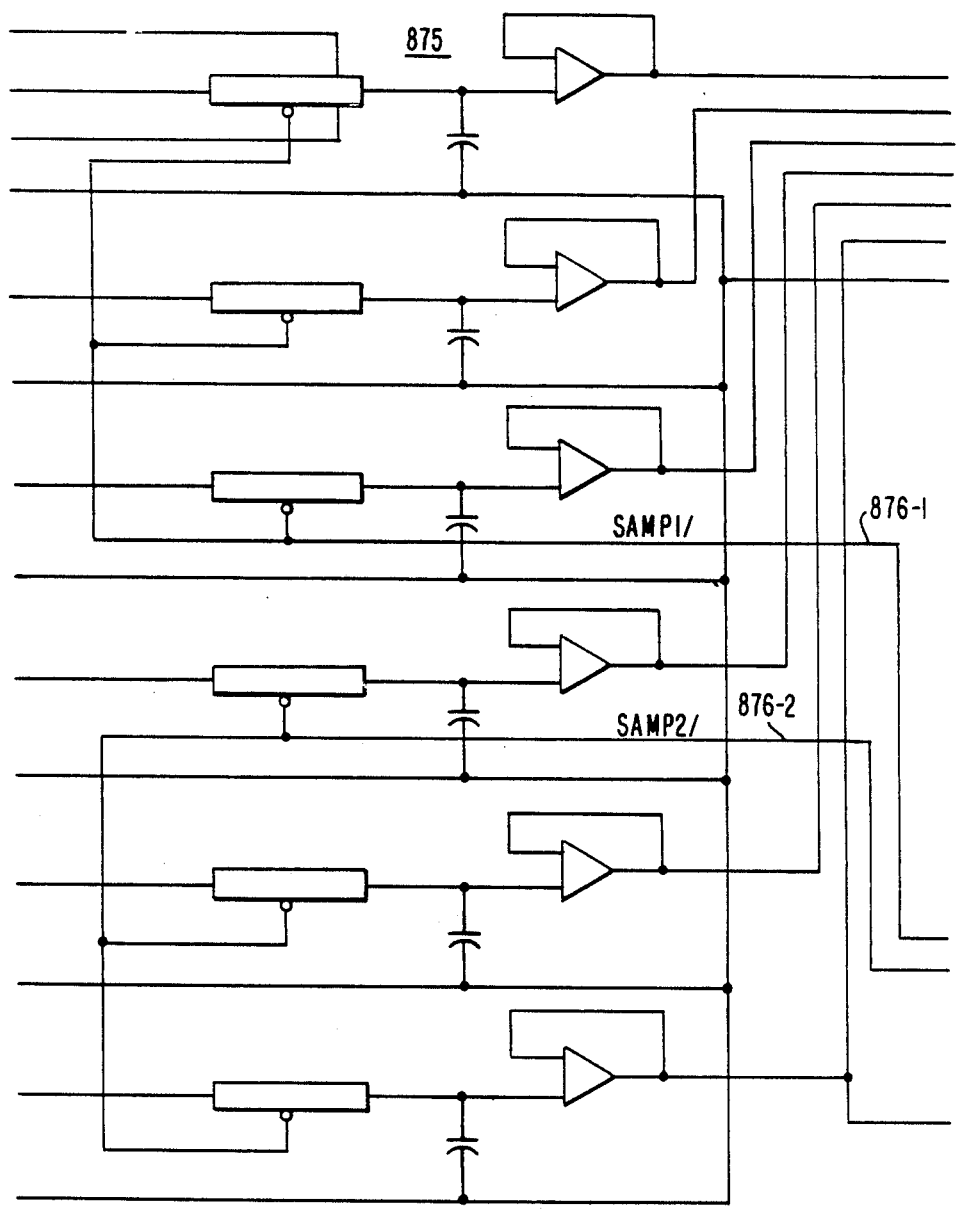
Figures 3, 7N:
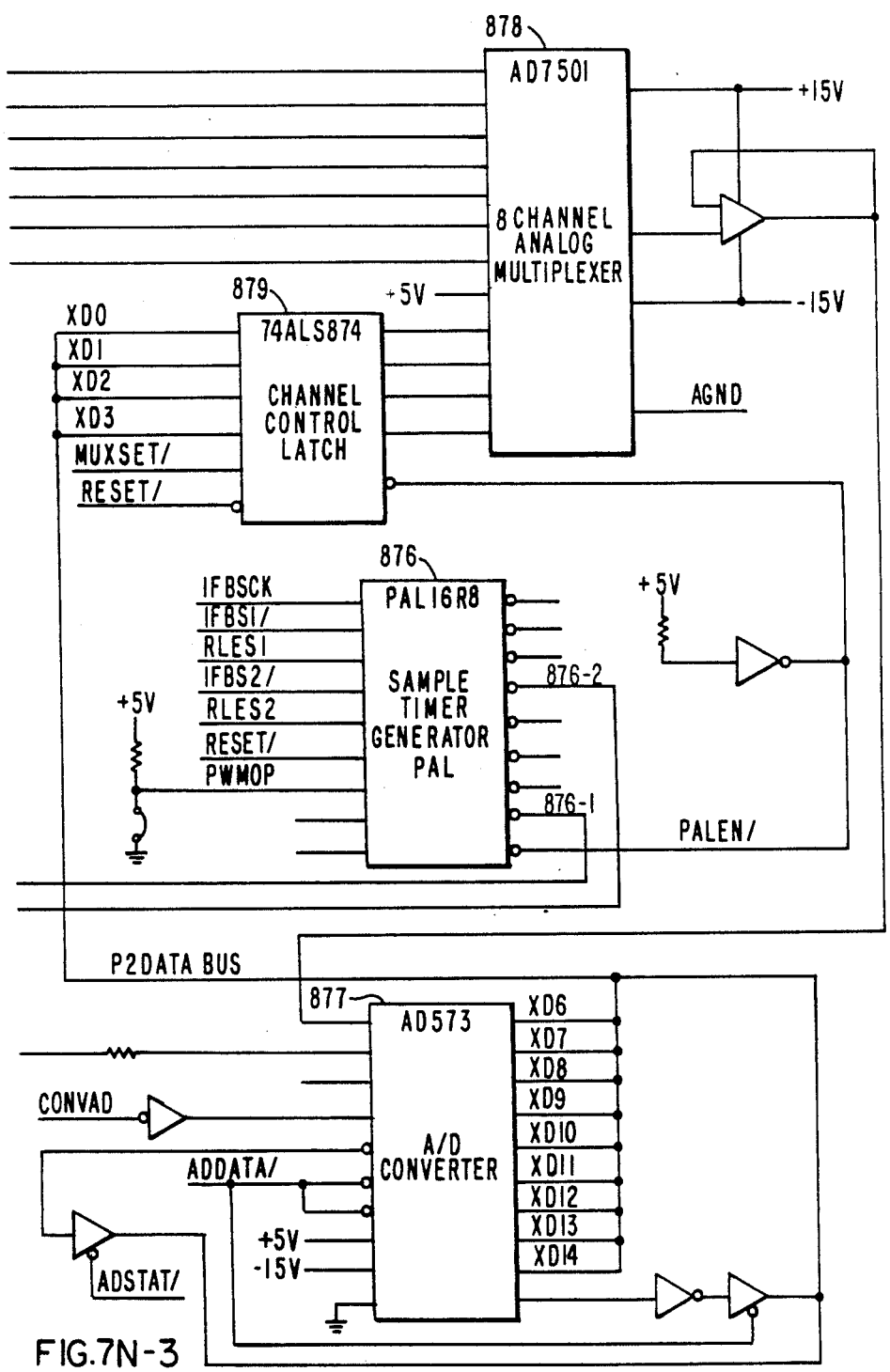
Figures 1, 7P:
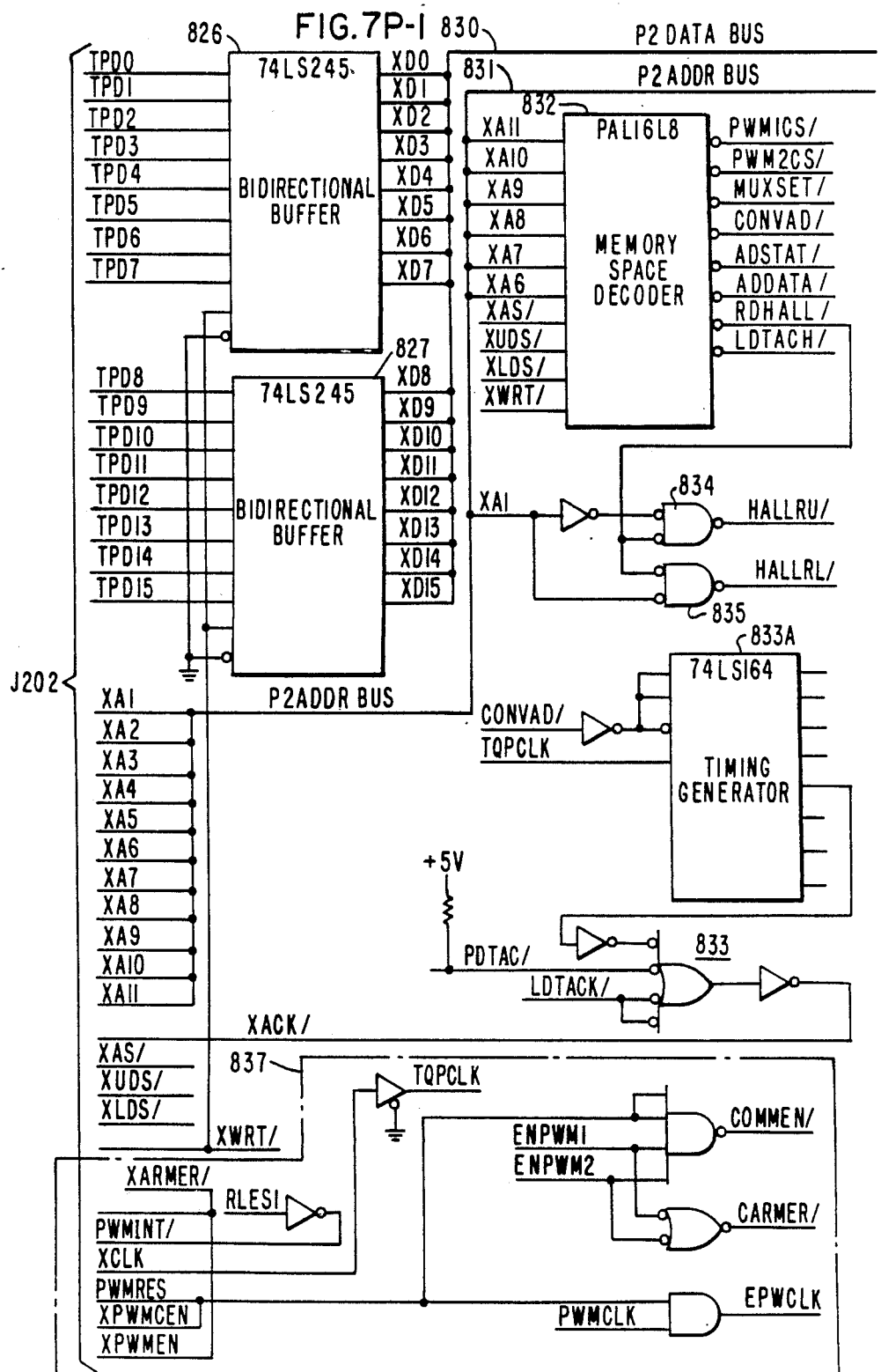
Figures 2, 7P:
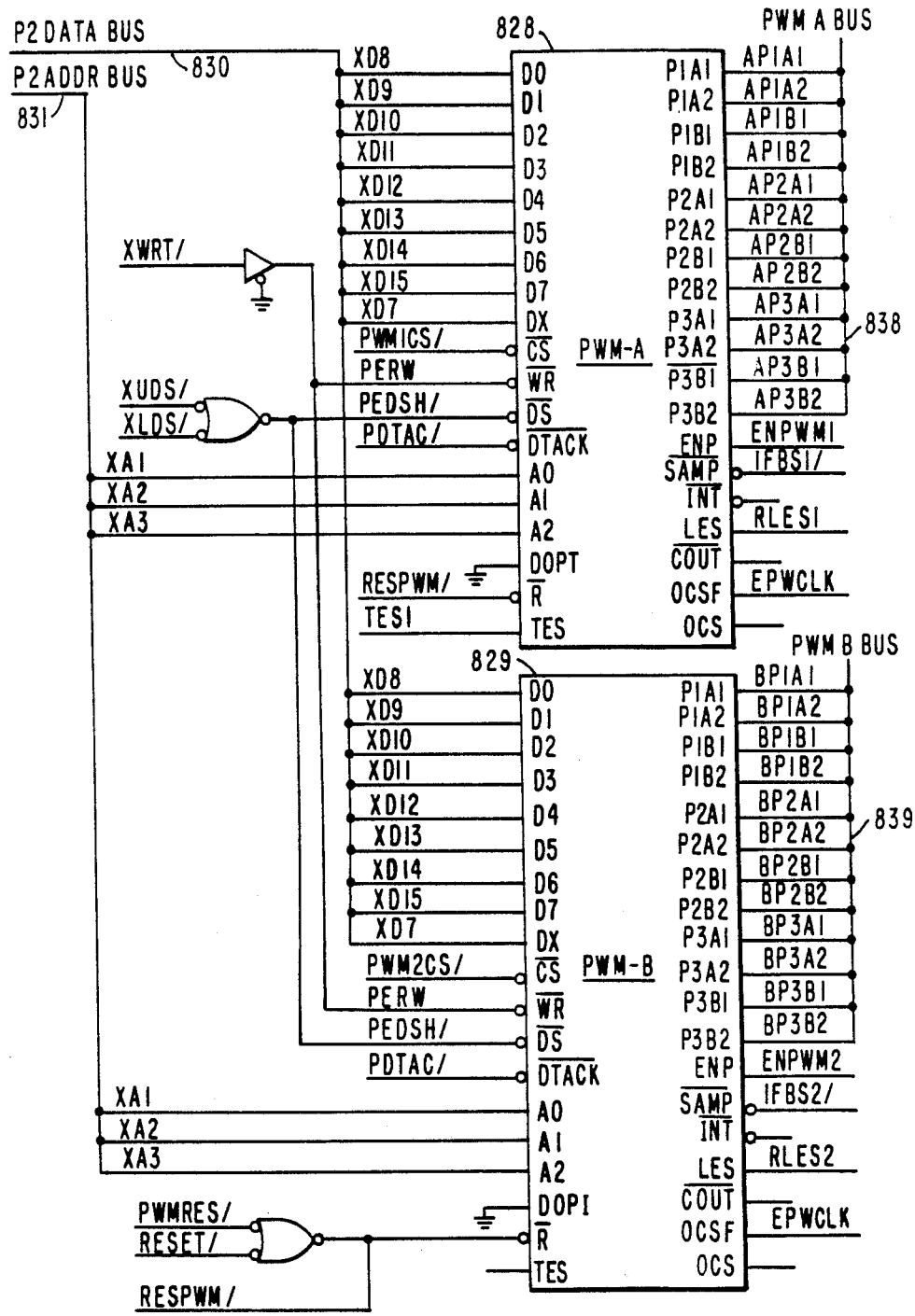
Figures 1, 7Q:
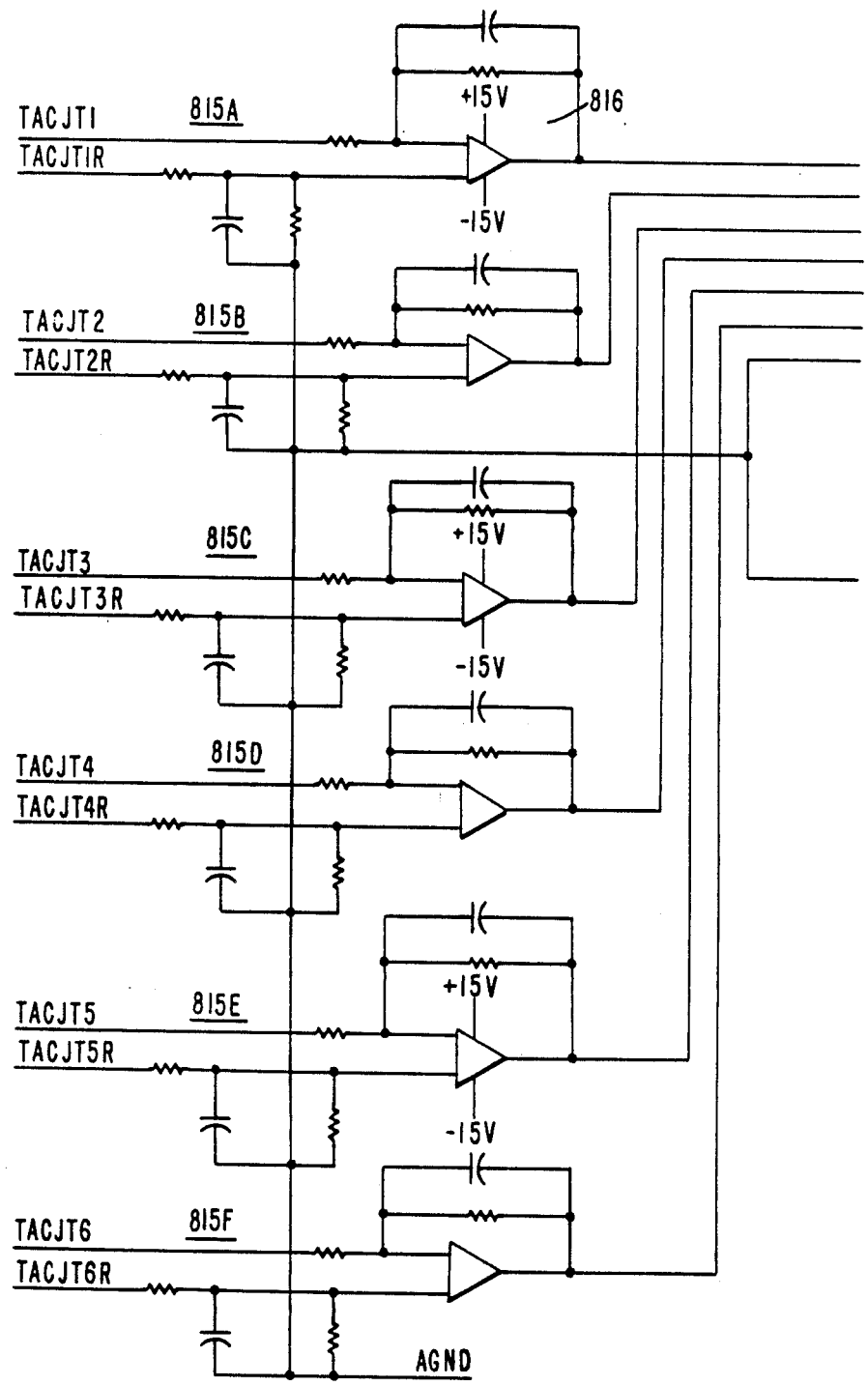
Figures 2, 7Q:
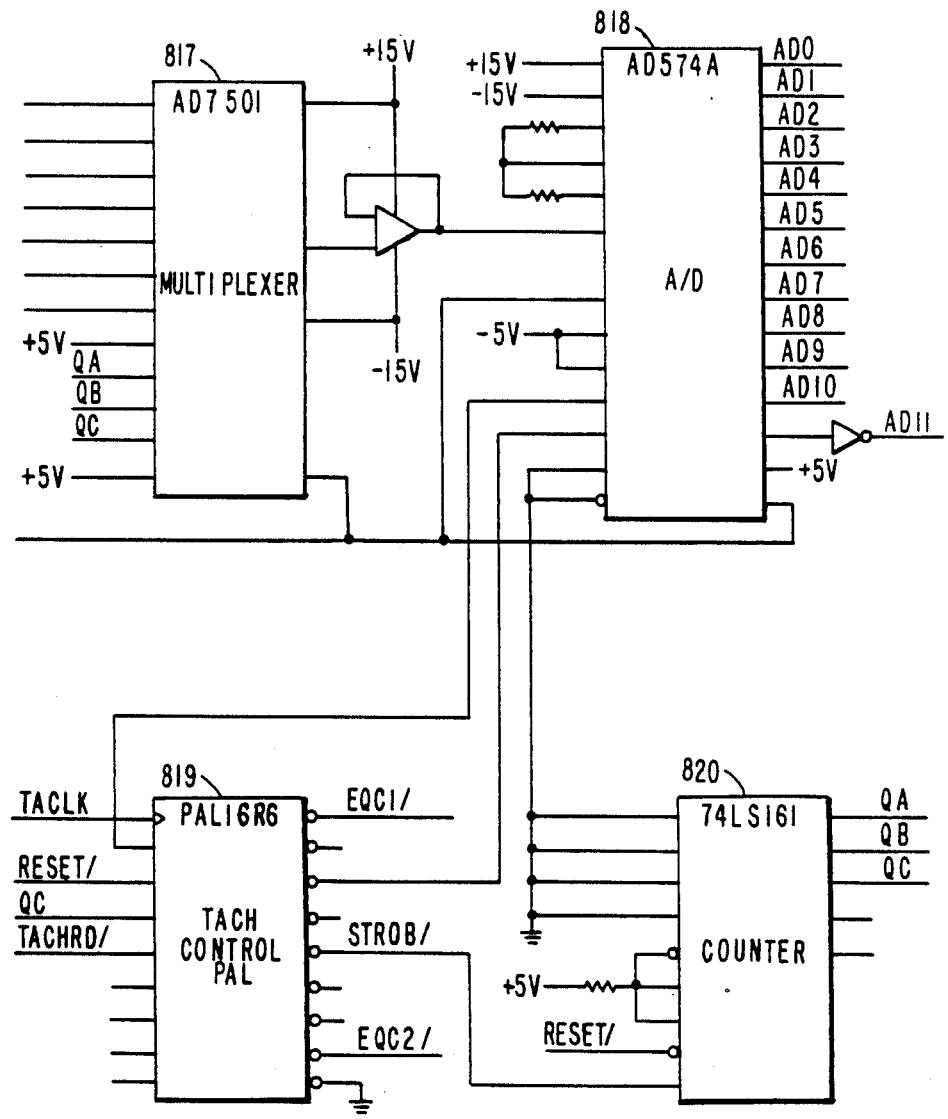
Figure 7R:
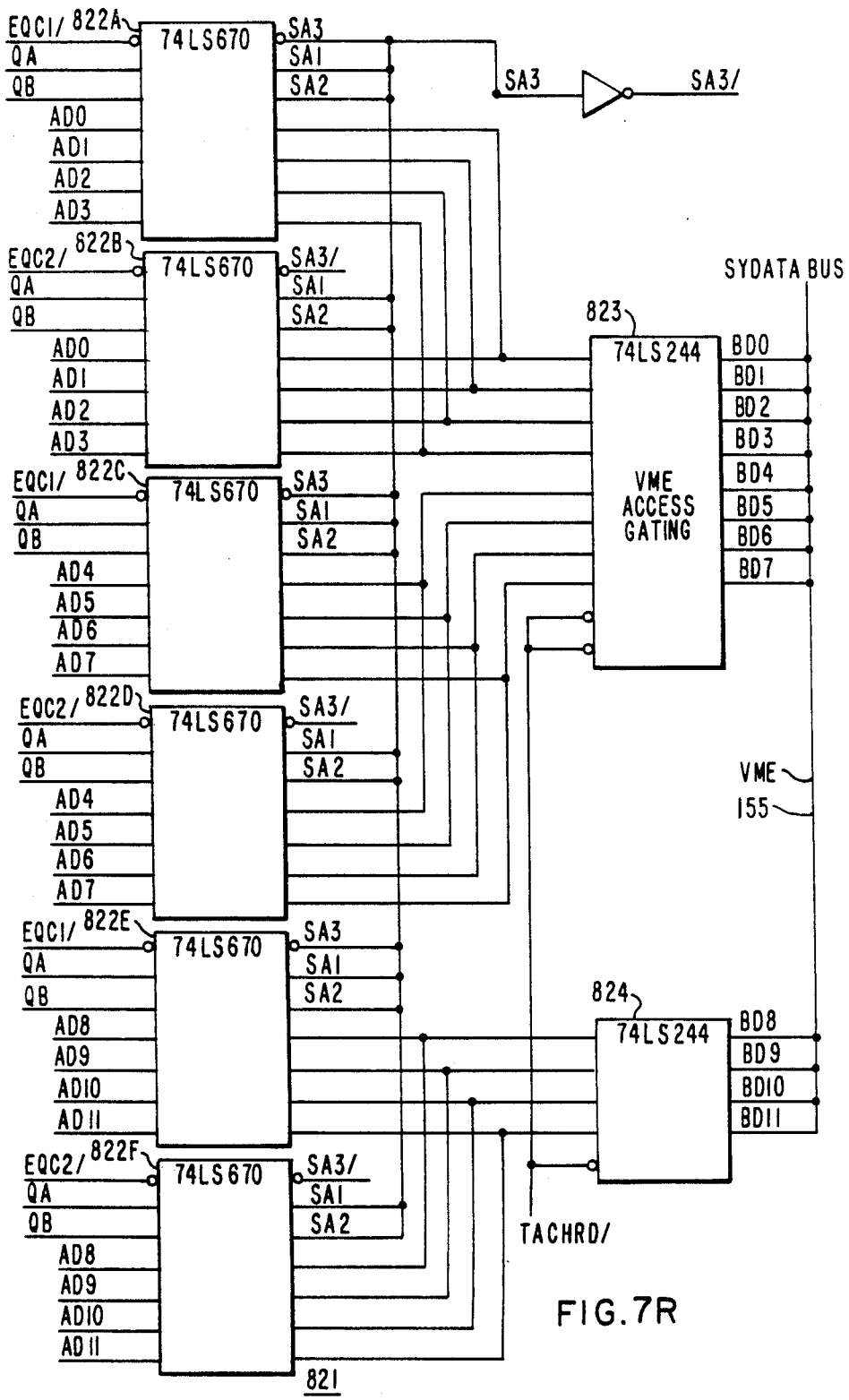
Figures 1, 7S:
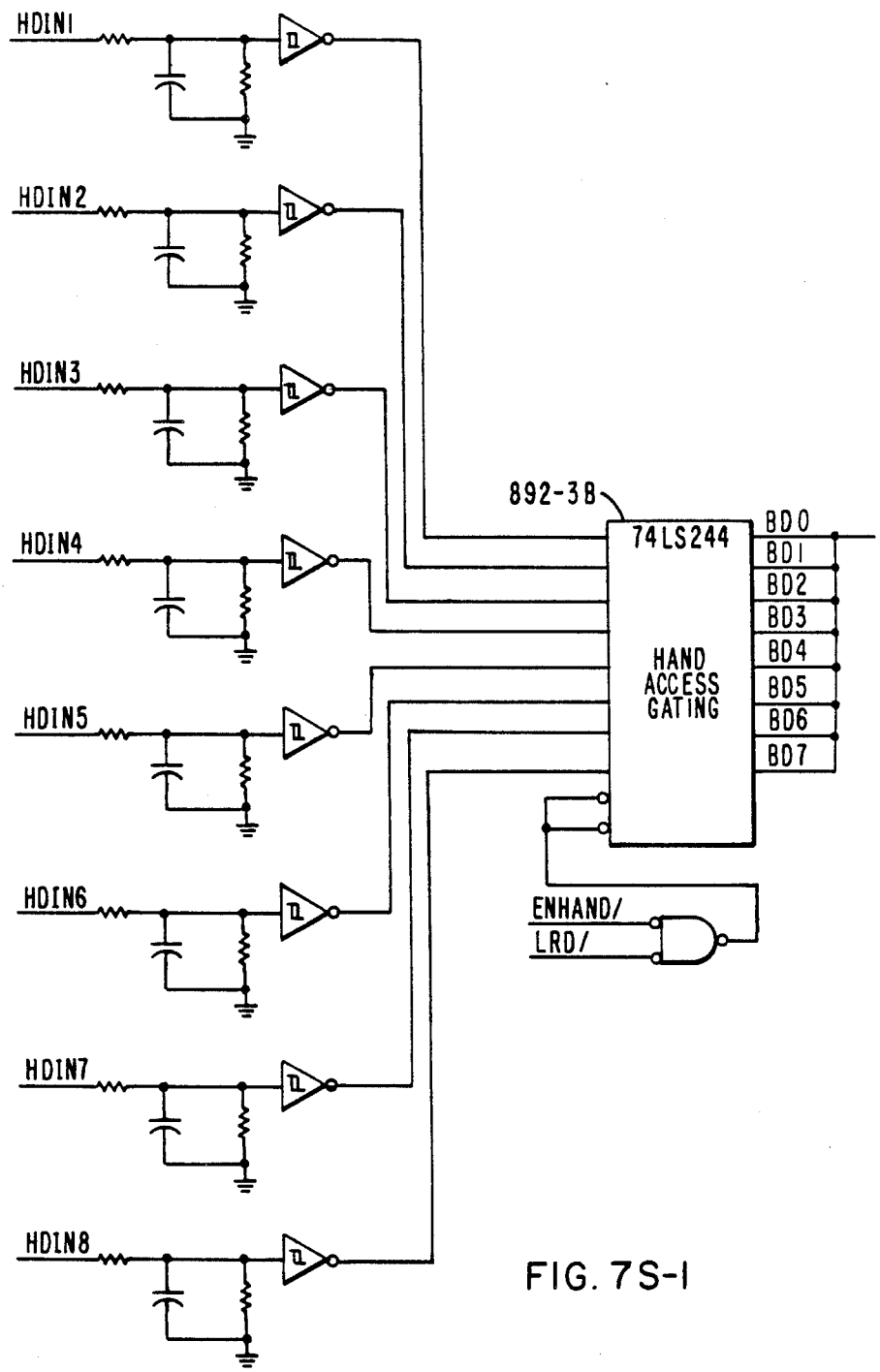
Figures 2, 7S:
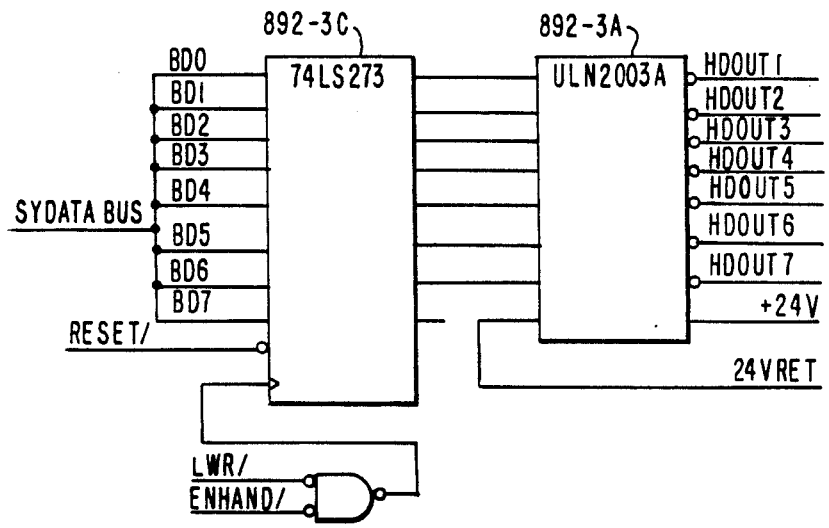
Figure 7T:
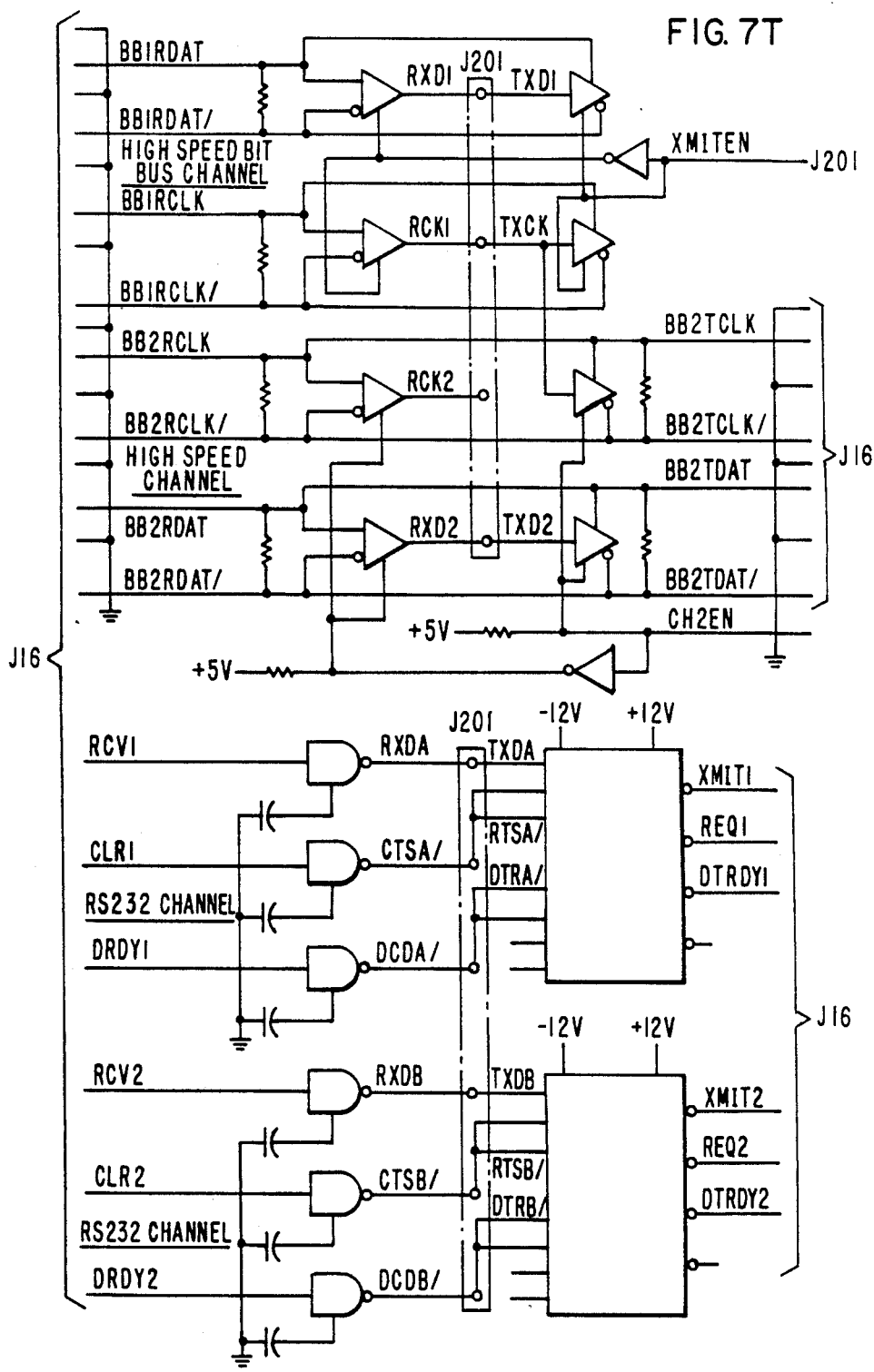

Circuitry on the AIF board 800 including that which adapts it to the 860 robot is shown in FIGS. 7A to 7T. Circuitry on the AIF board 800A that adapts the board to the PUMA robots is shown in FIGS. 8A to 8K.

ARM INTERFACE CIRCUITRY

The arm interface circuitry disposed on the AIF board 800 of FIG. 4 and functionally interrelated in FIGS. 5A or 5B operates primarily to:

1. Process control command signals to develop drive signals for power amplifiers which operate the axis motor as indicated by box 800A or 800A-1, respectively;

2. Process current, position, velocity and communication feedback signals as indicated by box 800B or 800B-1, respectively, for use in the higher level control loops and the drive circuitry;

3. Perform various support functions as indicated by box 800C or 800C-1, respectively, including control of VME bus operations, network communications interfacing, supply voltage monitoring, control panel interfacing, robot hand interfacing, and error and safety monitoring and control.

The digital robot control system is universally applicable to various kinds and sizes of robot arms because:

1. The overall control circuitry is generally structured to provide the basic control functions needed for universal application to robot arms;
2. The arm dependent board circuitry is disposed on the arm interface board - thereby enabling all higher level circuit boards to be packaged in a robot control system independently of the characteristics of the particular robot arm to be controlled;
3. The arm interface circuitry on the board 800 is organized so that a limited number of different arm interface boards can accommodate the requirements of a wide variety of robot arms including hydraulic robot arms, electric robot arms (brush type or brushless motors), large high power robot arms, small low power robot arms, robot arms produced by different manufacturers, etc.
4. Communications capability is included to enable application to robot arms in work cells, robot networks, and automated factories.

Thus, the robot control circuitry is structured to provide low cost control system manufacture and improved robot arm control and performance while simultaneously enabling ready modification of the robot control system for universal application to varied types of robot arms. In addition, as a result of its modularity, the control system can be readily packaged to provide different levels of control capacity and performance according to user needs.

ARM DRIVE CONTROL

As previously described, the higher level control looping generates current command signals for the robot arm axes so that the arm workpoint (effector) is moved to commanded positions under controlled velocity, acceleration and torque in accordance with a user's robot program. Pulse width modulation circuitry 801 and drive circuitry 802 are provided on the arm interface board 800 to develop axis motor drive signals, in this instance for application to power amplifiers which provide the drive currents to brushless D.C. electric motors respectively associated with the six axes of arm motion.

As shown in FIG. 7P-1, axis voltage command signals from the torque processor board 600 in FIG. 4 are received on the arm interface board 800 by a pair of bidirectional buffers 826 and 827. Circuitry on the AIF board 800 processes the voltage command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

Pulse width modulation is employed in developing the power amplifier control signals. With the employment of pulse width modulated digital control signals, the solid state switches which control the motor currents within the power amplifiers can be operated much more efficiently to control motor current levels through pulsating on/off control as opposed to continuous amplitude control.

The pulse width modulation circuitry is preferably embodied in pair of LSI pulse width modulation (PWM) chips 828 and 829 shown in FIG. 7P-2. Generally, the PWM chips 828 and 829 are specially designed from a standard Large Scale Integrated (LSI) gate array chip in which a multitude of isolated transistors are formed by a silicon mask deposit within a semiconductor wafer. In this case, for example circuitry is specifically implemented in a CMOS 3 micron, single metal, 1500 gate, gate array chip, but even 1 micron implementation is practicable.

The desired circuit design is produced on the PWM chip by disposing a customizing metal mask on the chip to interconnect the transistor gates in a predetermined pattern which produces the desired circuitry. Reference is made to W.E. 53,374 for some detail on the circuit produced by the preferred metal masking.

Generally, the PWM chip operates as a microprocessor peripheral device (i.e., under the control of a microprocessor higher in the control loop configuration) to provide digital pulse width modulated signal generation for control of three axes having DC brush type motor drives. Among the embodiments, the PWM chip can be used with additional processing circuitry to provide PWM signal generation for three axes having DC brushless type motor drives.

Other general operating features include a diagnostic mode of operation which allows PWM ramp generation to be verified under microprocessor control without generation of output control signals. With respect to safety, a watchdog function disables PWM generation unless axis voltage commands are updated by the torque board microprocessor within three PWM cycles, software controls are used to enable and disable PWM generation, and programmed voltage limits independently prevent axis voltage commands from exceeding safe values.

A ramp generated internally by the PWM chip for the purpose of controlling output pulse width has a ramp frequency which can be controlled by an internal oscillator or by an external clock. Further, the PWM generates an interrupt signal synchronized to current feedback sampling and a current feedback sampling pulse synchronized to the PWM ramp.

With continued reference to FIG. 7P-2, voltage command data is transferred to registers within the PWM chips 828 and 829 over a data bus 830. Command data for axes 1, 2 and 3 is sent to the PWM chip 828, command data for axes 4, 5 and 6 is sent to the PWM chip 829.

Address and control signals from the torque control supervisor on the torque processor board are coupled to an AIF address bus 831. A memory space decoder 832 shown in FIG. 7P-1 responds to input signals and generates PWM select signal PWM1CS or PWM2CS which is applied to the PWM chip 828 or 829. It also generates MUXSET and CONVAD for analog to digital conversion control in the current feedback path, ADSTAT and ADDATA and RDHALL for data read control and LDTACH for data signal reception acknowledgements XACK to the torque manager through gate control circuitry 833 shown in FIG. 7P-1. A timing generator 833A delays for a predetermined time period the generation of the acknowledge signal. Within PWM chip 828 or 829, address signals XA1, XA2 and XA3 route each voltage command data signal from the data bus 830 to an internal axis command data register corresponding to the axis to which the command signals applies.

In the brushless DC motor embodiment of the invention, Hall effect sensors shown in FIGS. 7L-1, 7L-2, 7M-1, 7M-2 are disposed about the drive motor stator periphery to generate magnetic rotor position signals for use in commutation switching control. A total of nine sensors are employed for each of the six axis motors. RDHALL output from decoder 832 in FIG. 7P-1 actuates either gate 834 or gate 835 to generate signal HALLRU for axes 1, 2 and 3 or read signal HALLRL for axes 4, 5 and 6.

Safety/error control circuitry 837 responds to torque board reset signals PWMRES to provide PWM reset independently of other control reset signals so as to assure that the PWM output is not started until everything else in the system is initialized. In addition, PWM RES for reset allows direct PWM shutdown for drive or other error without requiring that other parts of the control system be shut down. COMMEN is generated to enable/disable motor commutation, EPWCLK is applied to the PWM chips 828 and 829 to generate modulation ramp. XARMER represents an error condition in which the two PWM chips are determined to be out of synchronization.

Three sets of output drive control signals from the PWM chip 828 are applied to a bus 838 called PWM A BUS for the three corresponding motor axes. Similarly, the output control signals from the PWM chip 829 are applied to a bus 839 called a PWM B BUS for the other three corresponding motor axes.

The output signal TES1 from the PWM chip 838 is a clock signal which is divided elsewhere on the AIF board to become the synchronizing signal VTICK for the higher level control loops.

POWER AMPLIFIER DRIVE CIRCUITRY FOR BRUSHLESS DC MOTORS

Separate drive circuit channels 860J1-860J6 (FIGS. 7J and K) are provided on the AIF board 800 to process and couple the PWM digital outputs to the power amplifiers for the respective brushless DC robot joint motors. Since one drive circuit channels are alike, only one channel 860J1 will be described.

At the input of the drive circuit for this channel, four PWM digital drive pulses AP1A1-A2 and AP1B1-A2 are applied to a PAL device 861-1. As previously described, the A and B pulses are time shifted, the A2 and B2 pulses are relatively wide enable pulses and the A1 and B1 pulses have varying time width to function as control pulses (within the B2 and A2 time spans, respectively).

In addition, three similarly prefixed feedback commutation signals AP1(CAL-CBL-CCL) from the joint 1 brushless DC motor are applied to the PAL device 861-1. As shown in FIG. 7L-1, three Hall effect sensors 864-1, 8651, 866-1 are disposed about the periphery of the joint 1 motor to respond to magnetic flux changes and indicate the position of the rotor and which way the rotor is moving. Like sensors are employed for each joint motor as shown. Each sensor signal is routed to a comparator 867 which operates a gate 868 when the sensor signal reaches a reference level.

The nine gate output signals from the nine comparator circuit channels which process the Hall effect sensor signals from joint motors 1, 2 and 3 are applied to a two component latch register 869 in FIG. 7L-2 which in turn generates commutation signals for the commutation PALS 861-1, 861-2, 861-3. A latch register 870 in FIG. 7M-2 similarly generates commutation signals that are applied to the PALS 861-4, 861-5, 861-6 for joint motors 4, 5 and 6. Respective buffers 871 and 872 access the commutation signals to the P2 data bus for the torque processor board 600 thereby providing a basis for modification of PWM output signals as a function of motor rotor position. These signals can also be used as the basis for providing software communication in an alternative arrangement for control of the three motor windings.

Thus, the PAL device 861-1 logically operates analog driver circuits 862, 863 and 864 in FIGS. 7J-7J-2 to generate commutation timed signal set AP1U1-U2, AP1V1-V2 and AP1W1-W2 for application to the power amplifier switches (shown conceptually in FIG. 14B of incorporated-by-reference W.E. 53,373) which in turn direct motor drive current pulses through the joint 1 motor windings in accordance with the commutation control and in accordance with the pulse width modulation control. The currents through the windings of the other joint motors are similarly controlled by the other PAL devices 861-2 through 861-6.

The motor winding and power switch circuitry for each joint motor is shown in FIGS. 7J and K. The switches are operated in bi-directional pairs in order to direct current through two of the three windings at any one point in time, and the winding connection switching is rotated about the windings under PAL control. The effective magnitude of the motor current depends on the switch ON time which in turn is controlled by the PWM output.

FEEDBACK CIRCUITRY

POSITION FEEDBACK

A position encoder channel is provided for each axis. In this case, the encoders are absolute position devices intended for use with Unimate (Kawasaki) 860 robot arms which are relatively large, high powered machines. An encoder position count is generated for each unit of movement, and the output from each encoder is applied as a serial data signal to the arm interface board 800 for routing over an encoder data bus 802 in FIG. 7A and 7D as feedback for the control looping on the servo control board 400.

In FIGS. 7A, 7B, 7C, there are shown six input circuits 803A-F for receiving the respective serial encoder data signals ENC1 to ENC6 for the respective arm axes. In this instance, the serial encoder signals are structured in the gray code with sixteen bits.

Each serial encoder signal is coupled through a respective channel gate circuit 804 to a 16-bit shift register 805 which converts the serial signal to a parallel data signal and applies it to the encoder data bus 802. All parallel encoder position signals are applied from the encoder bus 802 to gating circuitry 806 in FIg. 7D which operates to convert the position feedback signals from gray code to binary code.

The parallel binary coded position feedback signals are then applied to encoder gating chips 807 and 808 in FIG. 7D which interface the position feedback signals to the VME data bus 155 for delivery to the servo calculator on the higher level SCM board 400. An encoder enable signal ENCEN from the SCM servo manager 400 operates the encoder access gating chips 807 and 808 in FIG. 7D to gate the position feedback signals to the SYDATA Bus which is in the VME bus 155 in FIG. 4.

Synchronization of the position feedback data flow is provided by circuitry 809 shown in FIG. 7E. Thus, multivibrator chip 810 is cycled by the VTICK related signal ITICK signal to operate drive transistor 811 and produce the signal PWR/RST every millisecond to direct the encoders to transmit current position data in a serial output to the arm interface encoder circuitry. Chips 812, 813 and 814 in FIG. 7E operate with associated circuitry to generate a signal SHCLK which synchronizes the serial-to-parallel conversion by the shift typified by 805 in FIG. 7A with the transmit operation of the encoders. With the generation of updated position feedback data on the VME bus every millisecond, under VTICK control, such data is synchronously available for control command calculations every millisecond in the position, velocity and acceleration control on the SCM board 400.

VELOCITY FEEDBACK

Analog velocity feedback signals typical for joint 1 are TACJT1, TACJT1R and these are generated by the tachometers (not shown in FIG. 7Q-1) over six analog channels 815A-F, one for each joint or arm axis. In each channel the tachometer signal T1 and a reference tachometer signal T1T are applied to a difference amplifier 816 which generates an output signal representative of the joint velocity. The velocity output signals are applied to the input of a multiplexer 817 in FIG. 7Q-2 which in turn is coupled to an analog/digital converter 818.

A tachometer control PAL device 819 operates with counters 820 to control the multiplexer 817 and apply in sequence the multiplexer channels to the analog/digital converter 818. Further, the tachometer control PAL 819 controls the timing of the analog-to-digital conversion of successive velocity feedback signals from the six multiplexer channels. After each conversion, the resultant digital velocity feedback signal is stored in register circuitry 821 shown in FIG. 7R.

Six register chips 822A-F in FIG. 7R are included in the register circuitry 821. Each register chip is 4 bits wide by 4 bits deep. Since six joints require a six-bit wards for signal storage, register pairs are employed to provide the required storage depth. Three separate register pairs shown in FIG. 7R are employed to provide a twelve-bit ward width needed for the output signals from the analog/digital converter 818.

Velocity feedback signals are applied to the VME bus 155 through VME access gating chips 823, and 824 by a read request signal TACHRD under control of the servo control manager 400.

MOTOR DRIVE CURRENT FEEDBACK—TORQUE CONTROL

Feedback circuitry used to process the motor drive current feedback signals from the respective power amplifier feedback resistors (such as the one 63 shown in FIG. 14B of W.E. 53,373) for the six joints is shown in FIG. 7N-1. The current feedback circuitry includes six respective feedback channels 873-1 through 873-6. Each feedback channel includes a differential operational amplifier 874 having its output coupled to a sample and hold circuit 875. A PAL device 876 in FIG. 7N-3 generates sample time signals 876-1 and 876-2 under PWM synchronizing control IFBSCK. The sample/hold feedback signals from all of the joints are coupled to an analog-to-digital converter 877 through a multiplexer 878 under the control of a channel control latch 879. A digital representation of motor current feedback is coupled to the P2 data for use by the digital torque loop control on the processor board 600.

GENERIC VME BUS CONTROL CIRCUITRY

Various generic control functions are provided for the VME bus by circuitry located on the AIF board 800. As shown in FIG. 7F, a PAL device 880 is programmed to operate as a bus arbiter, i.e., to arbitrate requests for bus access from units coupled to the VME.

A 4 KHz signal TES1 from the PWM chip 828 in FIG. 7P-2 is applied to a pair of flip-flops 881-1 and 881-2 in FIG. 7G for division down to a 1 KHz signal, i.e., the system synchronizing signal TICK.

A 16 MHz oscillator 882 generates the system clock signal SYSCLK. It also has an output applied to a pair of flip flops 883-1 and 883-2 in FIG. 7F for division down to a 4 MHz signal PWMCLK which is applied to the PWM chips. A counter 884 processes PWMCLK to generate still lower frequency output signal IFBSCK, TACLK and HCLK.

Reset circuitry 885 is provided on the AIF board 800 for the whole system. Thus, a reset button switch 885-1 on the control panel (not specifically shown) is coupled through RC circuitry to a timer 885-2 which debounces or filters reset switch operation. Gate devices 885-3, 885-4 and 885-5 respectively generate signals SYSRESET, RESET and AMPRST for resetting various system and AIF functions.

Monitoring circuity in FIG. 7G includes an AC/DC converter 886 which operates a NOT gate 887 to generate a signal ACFAIL when there is a failure of the system 115 VAC applied to the input of the converter 886.

An error condition driver 888 generates a system signal SYSFAIL upon delection of the error signal FAULT. A plurality of resistors 889-1 through 889-9 operate as transmission line terminators shown in FIG. 7H for the various bus conductor line circuits.

VME DECODING CIRCUITRY

Decoding circuitry is provided on the AIF board 800 to provide access from the VME bus to various AIF circuits in accordance with address signals on the VME bus. Thus, address signals are applied from the VME bus to a system address bus decoder in FIG. 7I 891-1 for function decoding by devices 891-2, 891-3 and 891-4.

Read/write control is provided by devices 891-5 through 891-8. Data is sent over a bus 891-9 called SYDATA-BUS which also is the VME data bus. Once data is transferred, it is acknowledged by a logic signal DTAC from logic circuit 891-10.

OTHER AIF CIRCUITRY

Additional ciccuitry on the AIF board 800 includes:
Control panel interface 892-1 (not shown) detects panel switch operations and operates indicator lights on the panel.

Voltage monitor circuits (not shown) the various circuit supply voltages are monitored by comparison to reference voltages; signals are generated to indicate out-of-range values.

Hand interface 892-3 ( FIG. 7S-1) provide seven user defined on/off output signals BD0 to BD7 are generated by block 892-3A to control the end effector; eight user defined arm tip inputs HDIN1 to HDIN8 are processed through access gate 892-3B.

Communications interface in FIG. 7T -connects to the SCM board over communications connectors J16 and J201 and provides driver, receiver,, and level converter circuitry for the two high speed (1 megabaud)

synchronous channels and the two slower standard RS232 synchronous communication channels (about 9600 band) as indicated.

Figures 1, 70:
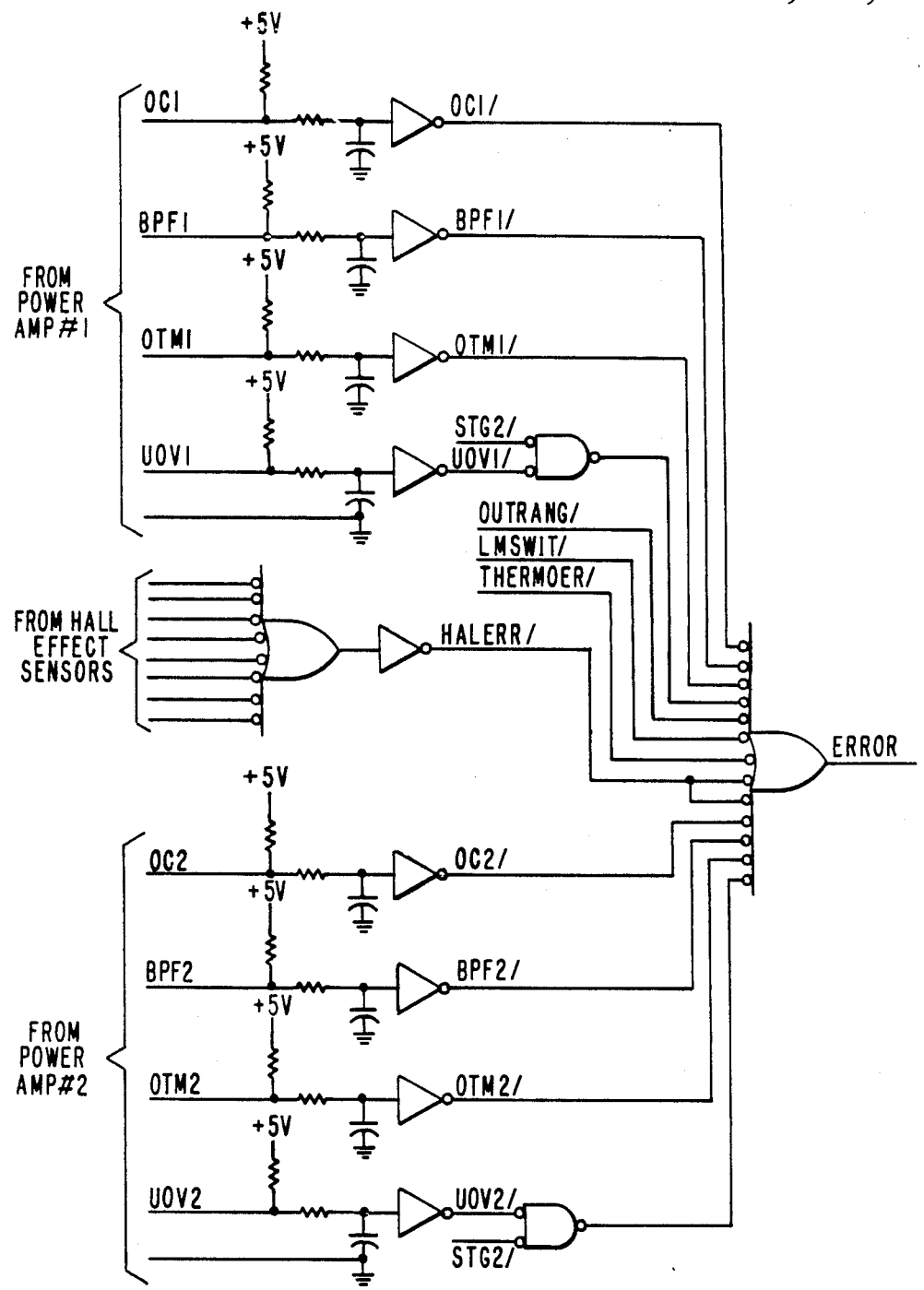
Figures 2, 70:
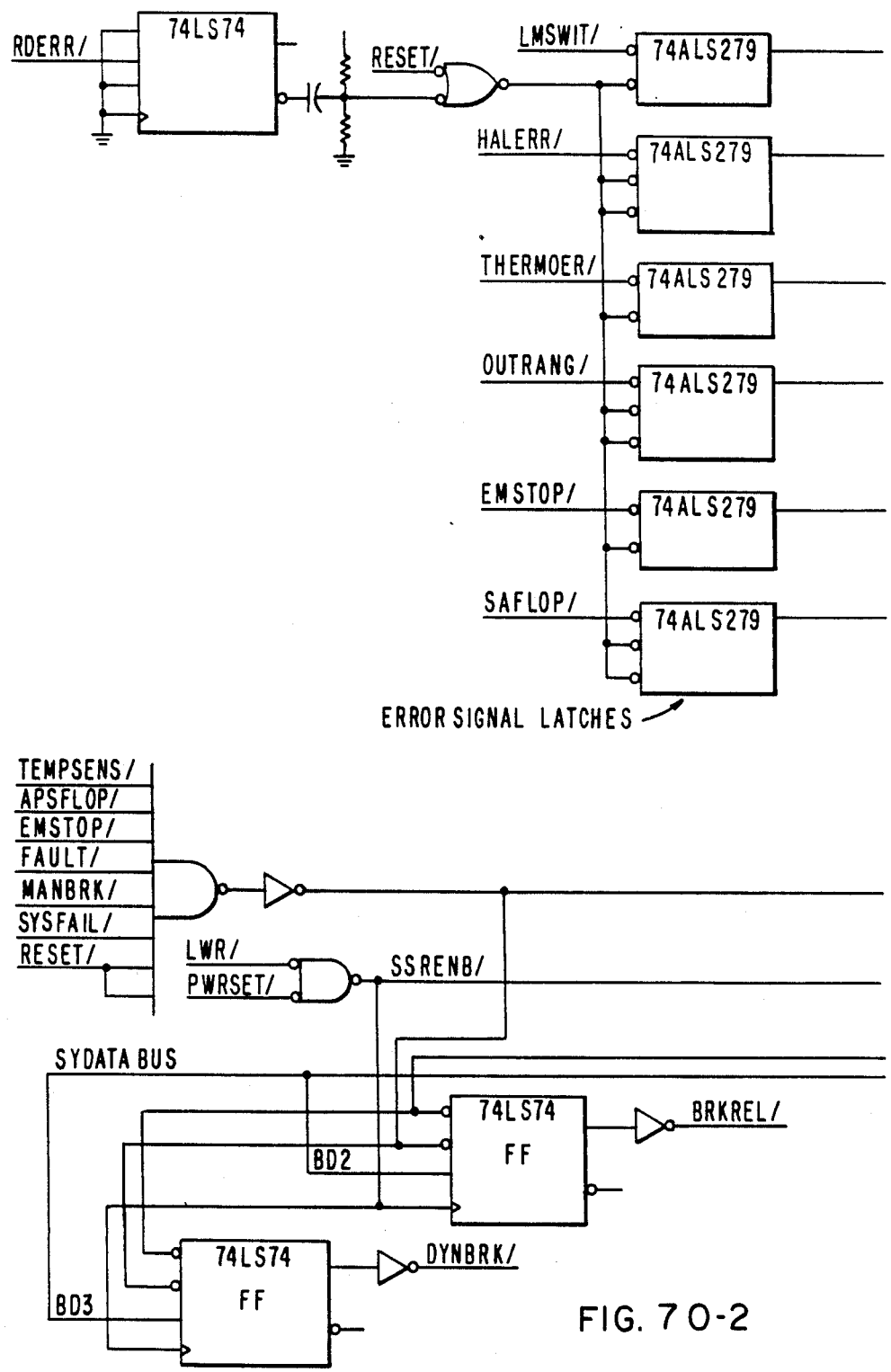
Figures 3, 70:
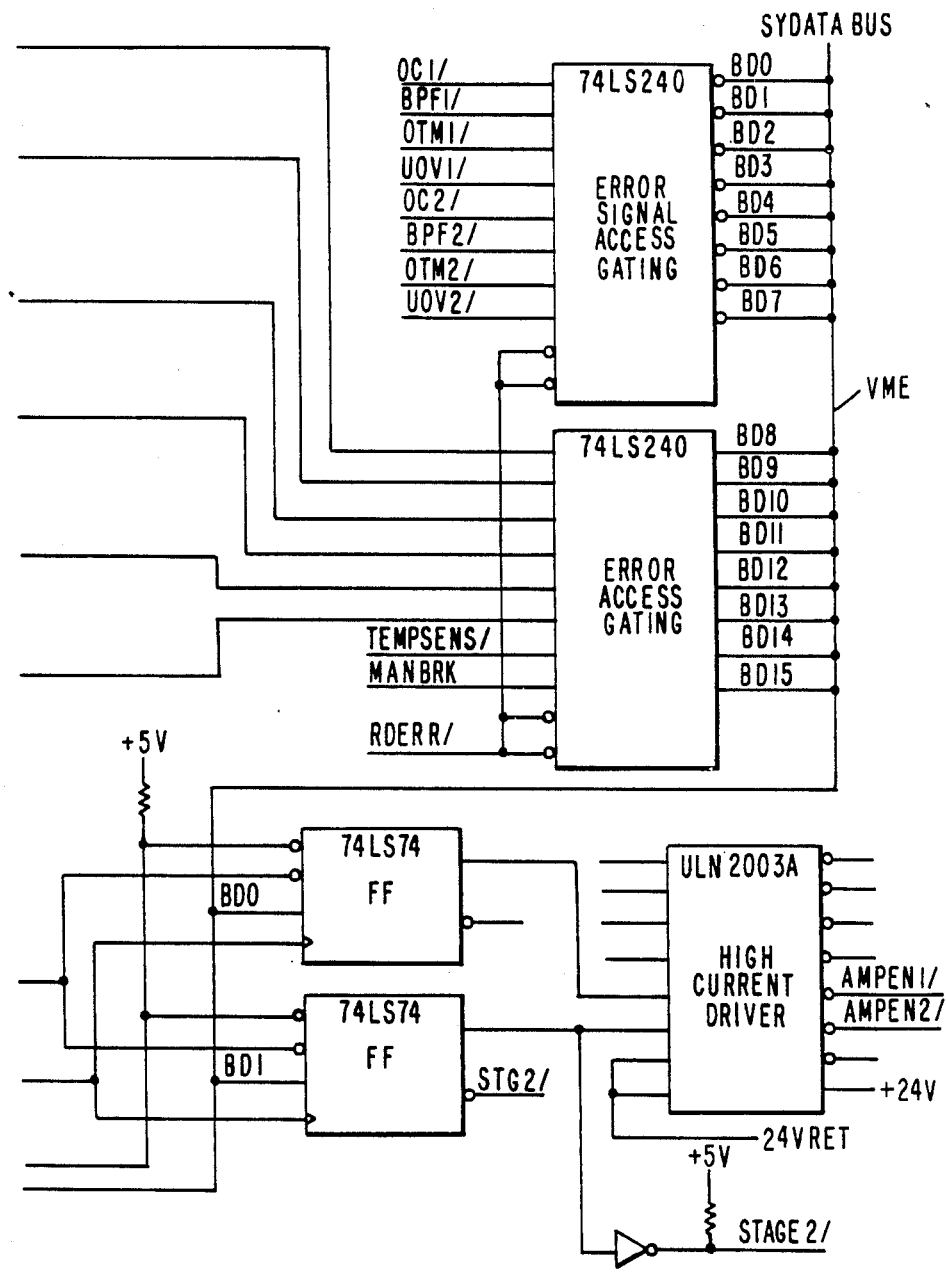

Error and safety control (not shown) provides error signal processing circuitry to turn off the power amplifiers and stop the arm directly (i.e., as opposed to via microprocessor control) under predetermined conditions; circuitry is also provided to operate LED status indicators (not shown) on the AIF board 800 for the following error conditions in FIGS. 70-1 and 70-2:

SYSFAIL - System Failure
LMSWIT - Joint Limit Switch Off
SAFLOP - Safety Loop Broken
TEMPSENS - Over Temperature
THERMOER - Motor Overload
OUTRANG - Voltage Out of Range
FAULT - Hardware Failure
EMSTOP - Emergency Stop Occurrence
MANBRK - Manual Brake Released

POWER AMPLIFIER DRIVE CIRCUITRY FOR BRUSH TYPE DC MOTORS

In FIGS. 8A-8K, there is shown circuitry employed on an AIF board designed for use with a PUMA 760 robot. The illustrated circuitry includes only that circuitry which differs from circuitry on the AIF board for the 860 robot (FIGS. 7A-7T). The balance of the circuitry on the PUMA 760 AIF board is essentially like that on AIF board.

Since the PUMA 760 employs incremental position detection, encoder signal processing circuitry is employed on the PUMA 760 AIF board as shown in FIGS. 8A through 8G-2 and 8J-1, J-2 and 8K.

Three encoder signals are returned from each of the six arm joints: ENCA, ENCB and INDX. FIGS. 8A through 8F-1 show like encoder signal processing circuits for the six joints. Each encoder signal is first (1) filtered to exclude noise and (2) checked for a broken wire condition.

Figure 8A:
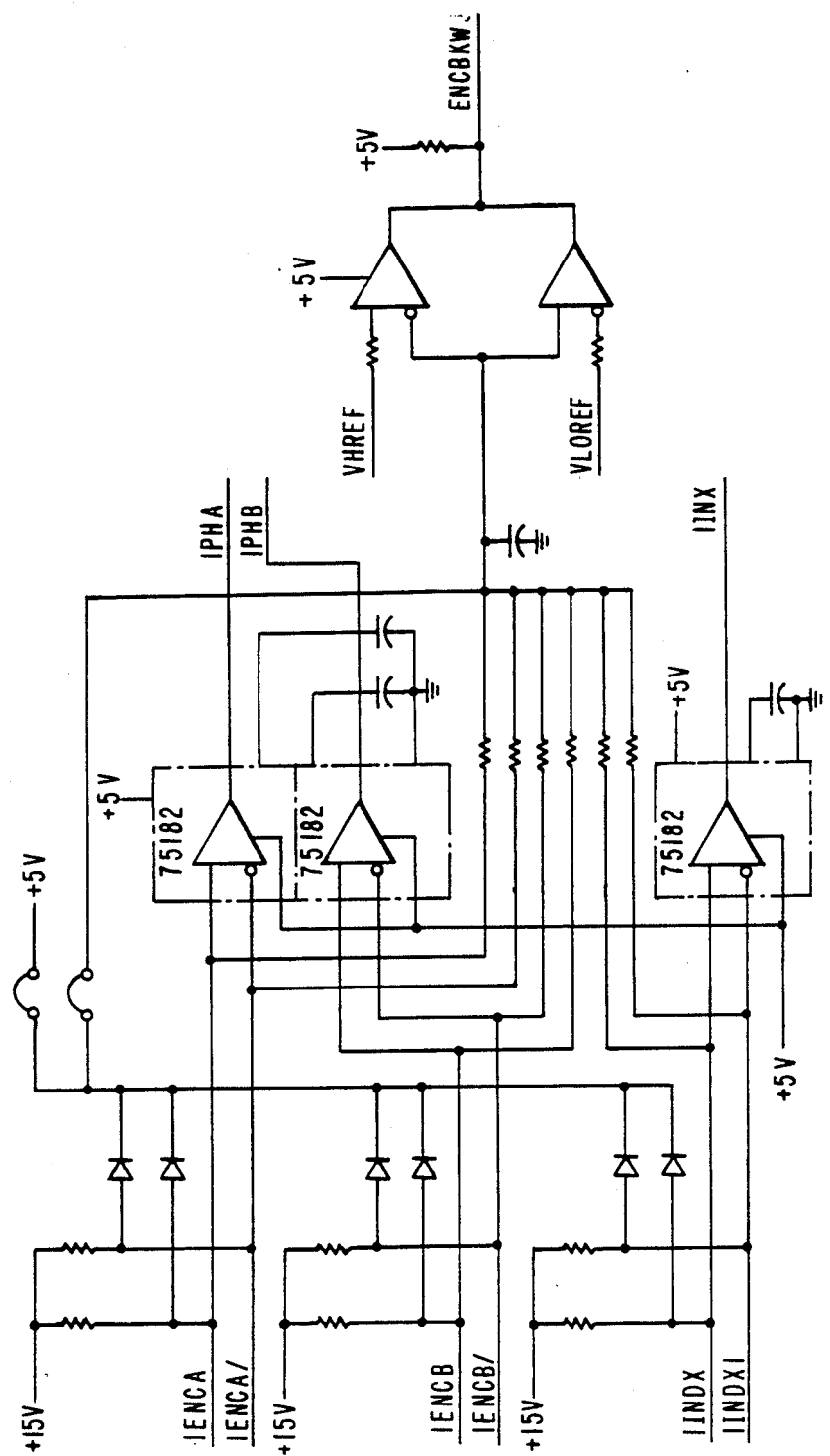
Figure 8B:
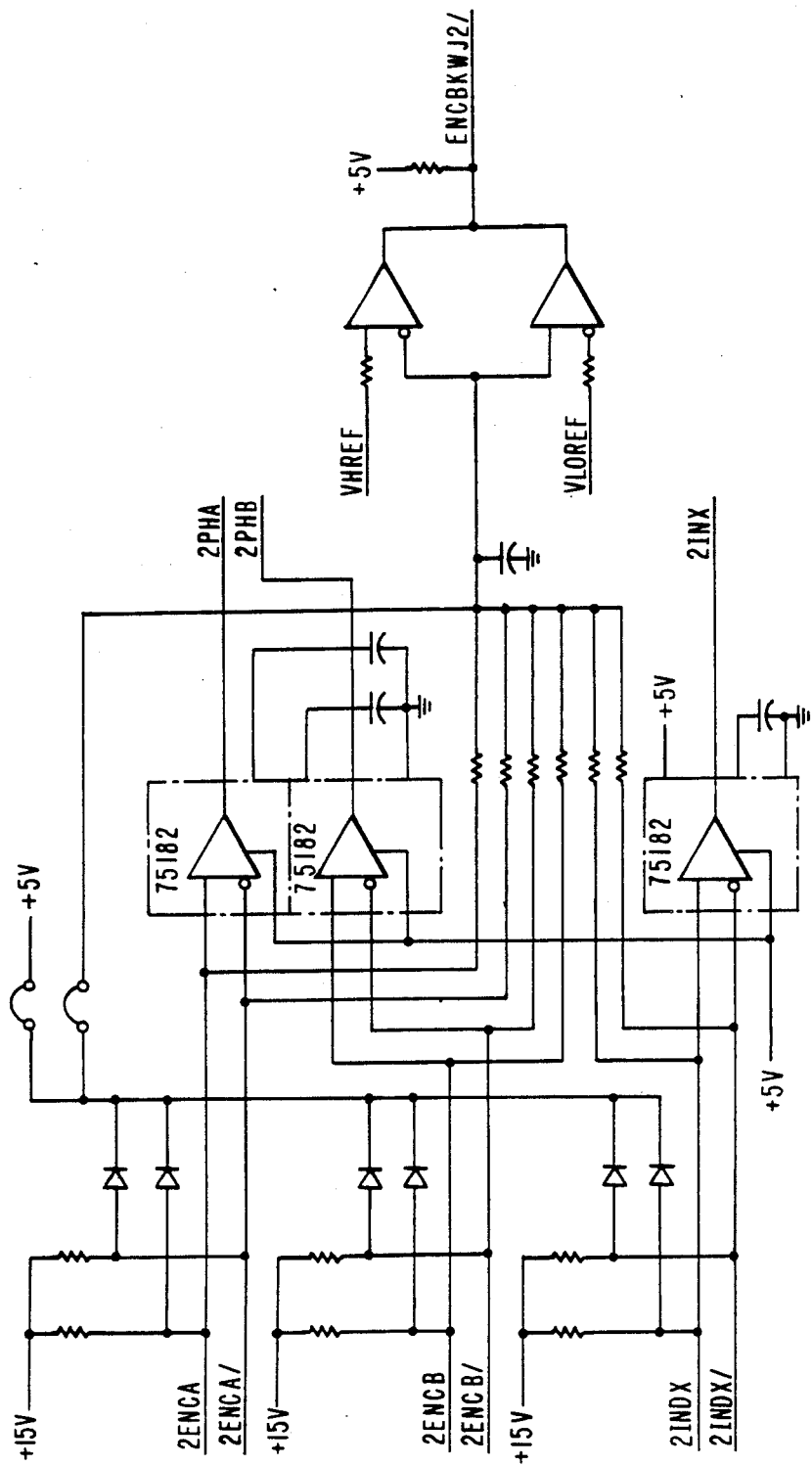
Figure 8C:
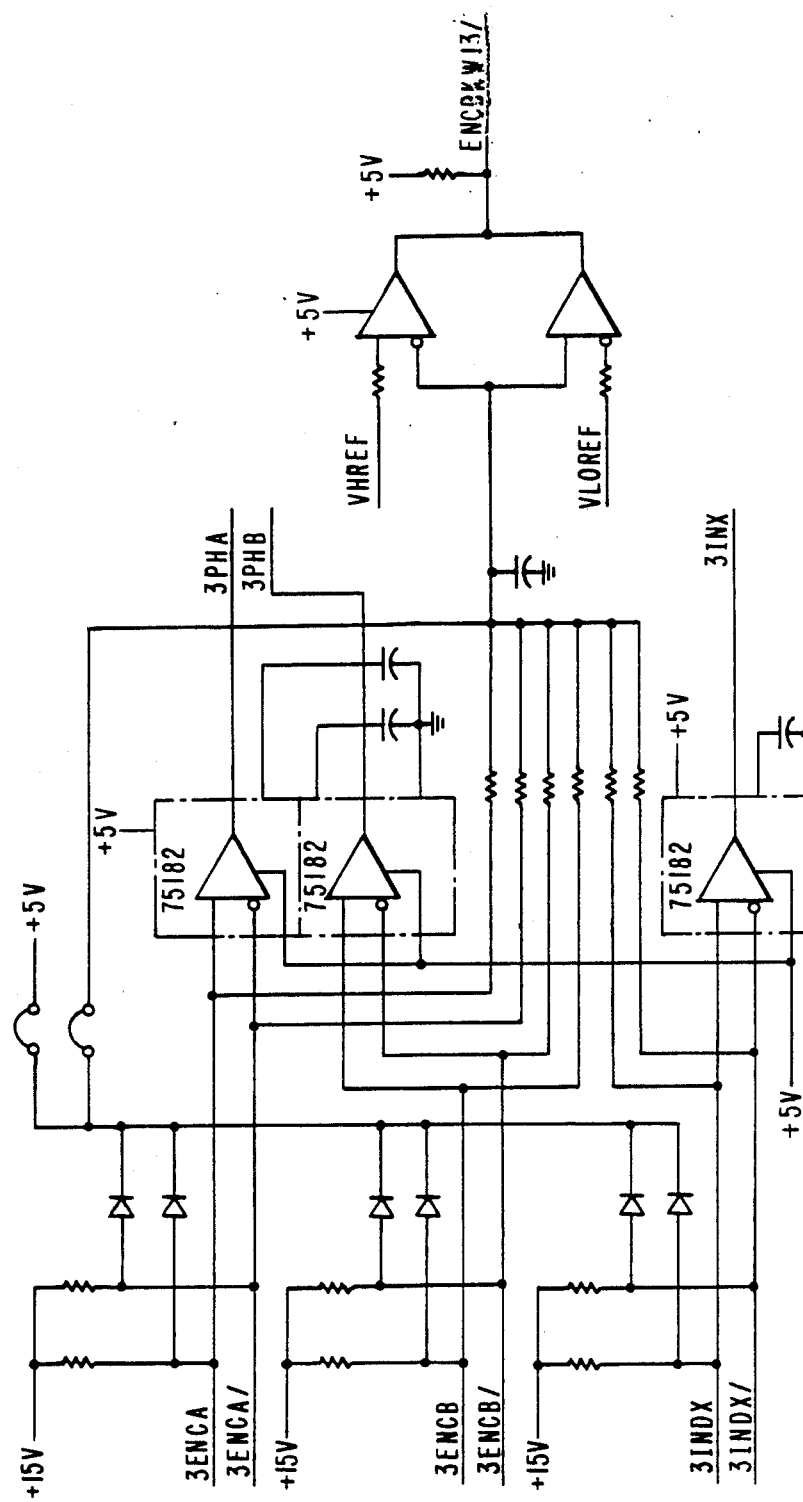
Figure 8D:
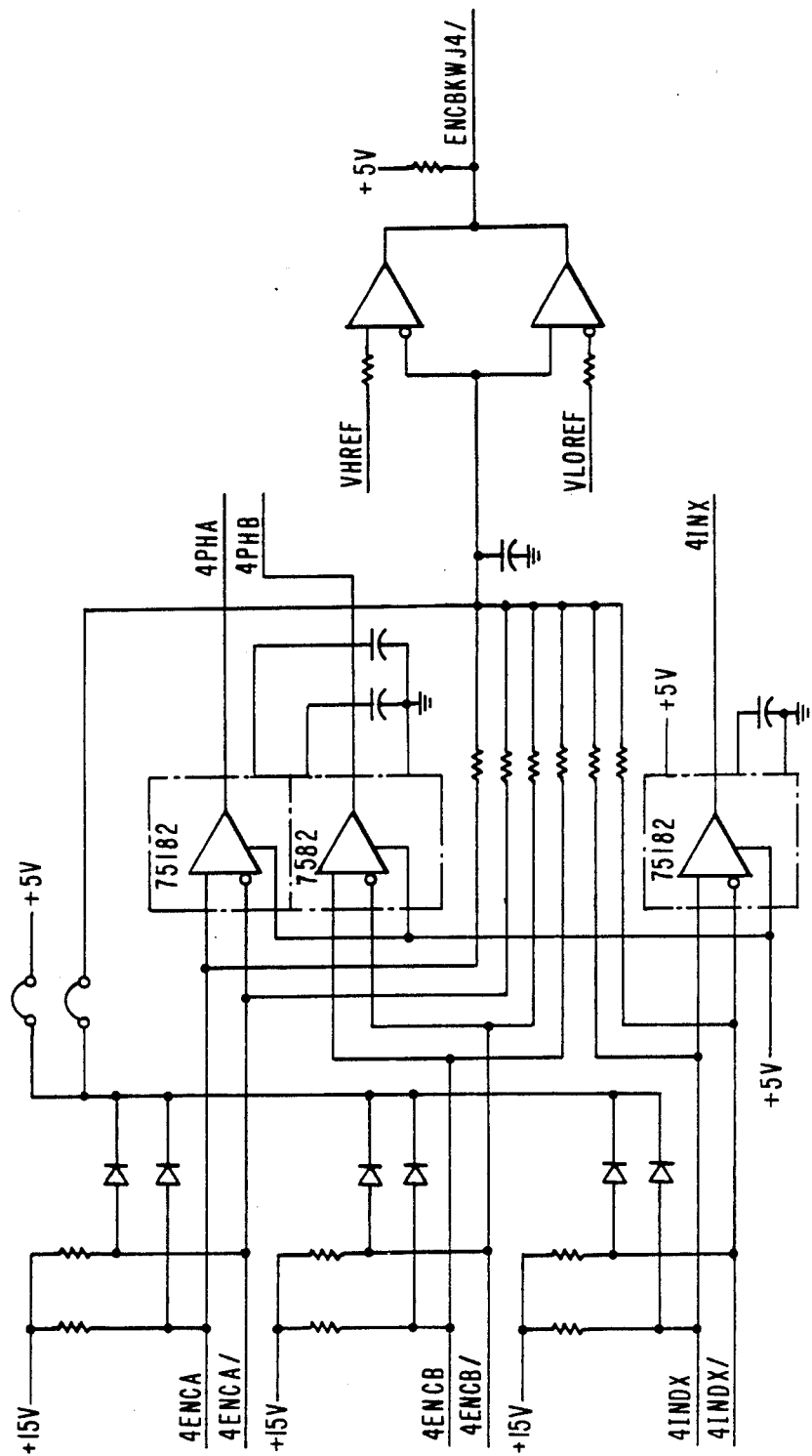

As shown for joint 1 in FIG. 8A, device 75182 substantially cancels any noise in each encoder feedback signal. The filtered encoder signals are applied to gate array devices GA3000 in FIGS. 8G-1 and 8G-2. These devices in effect read and temporarily store the encoder feedback signals for the system. From the gate arrays, the encoder signals go to transceivers S245 for transmission over the VME bus to the SCM board where the arm position feedback is read and used in control computations. Each time the INDX signal occurs, a device 75182, such as in FIG. 8A, generates an interrupt signal over the VME bus for the SCM to make an encoder read.

Figure 8E:
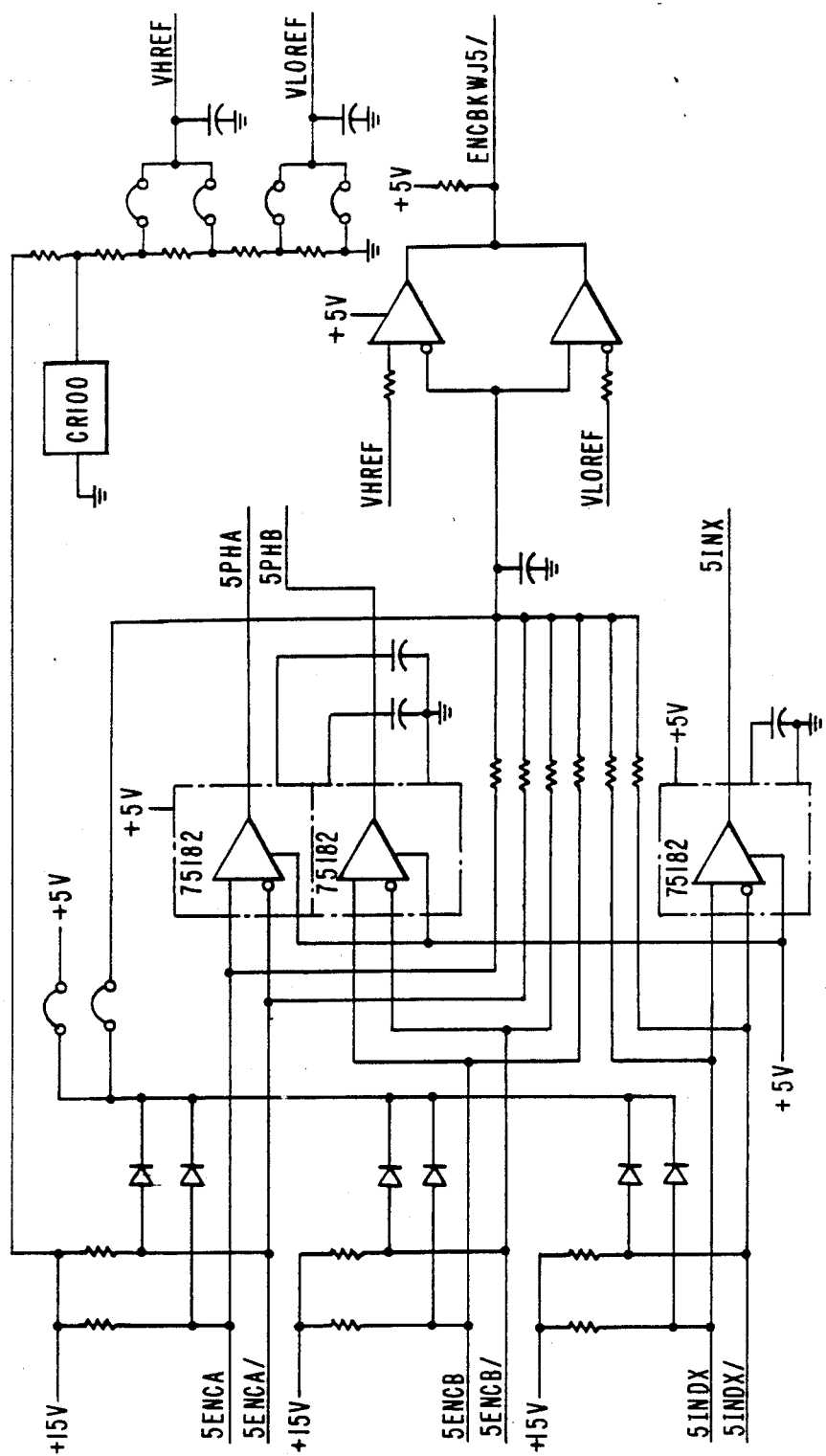
Figures 1, 8F:
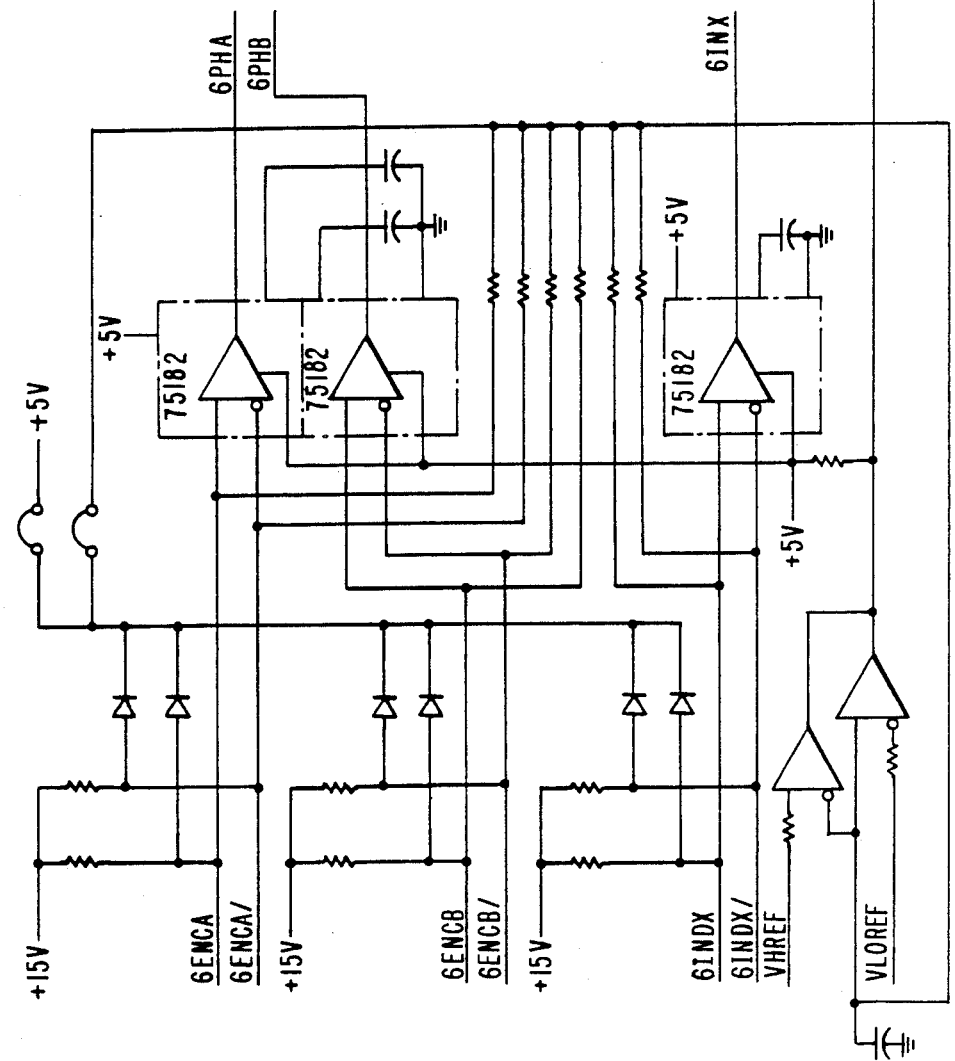
Figures 2, 8F:
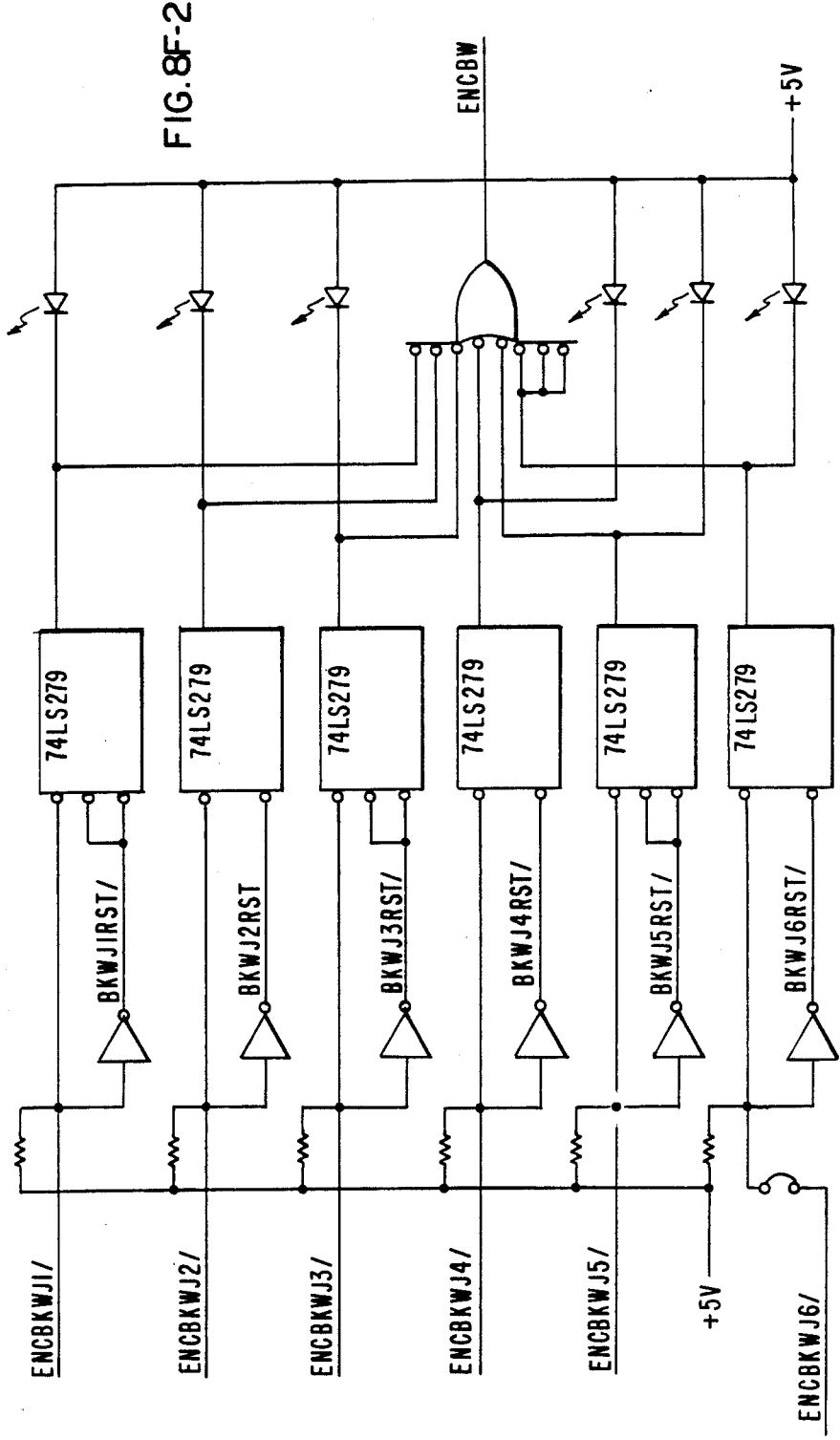
Figures 1, 8G:
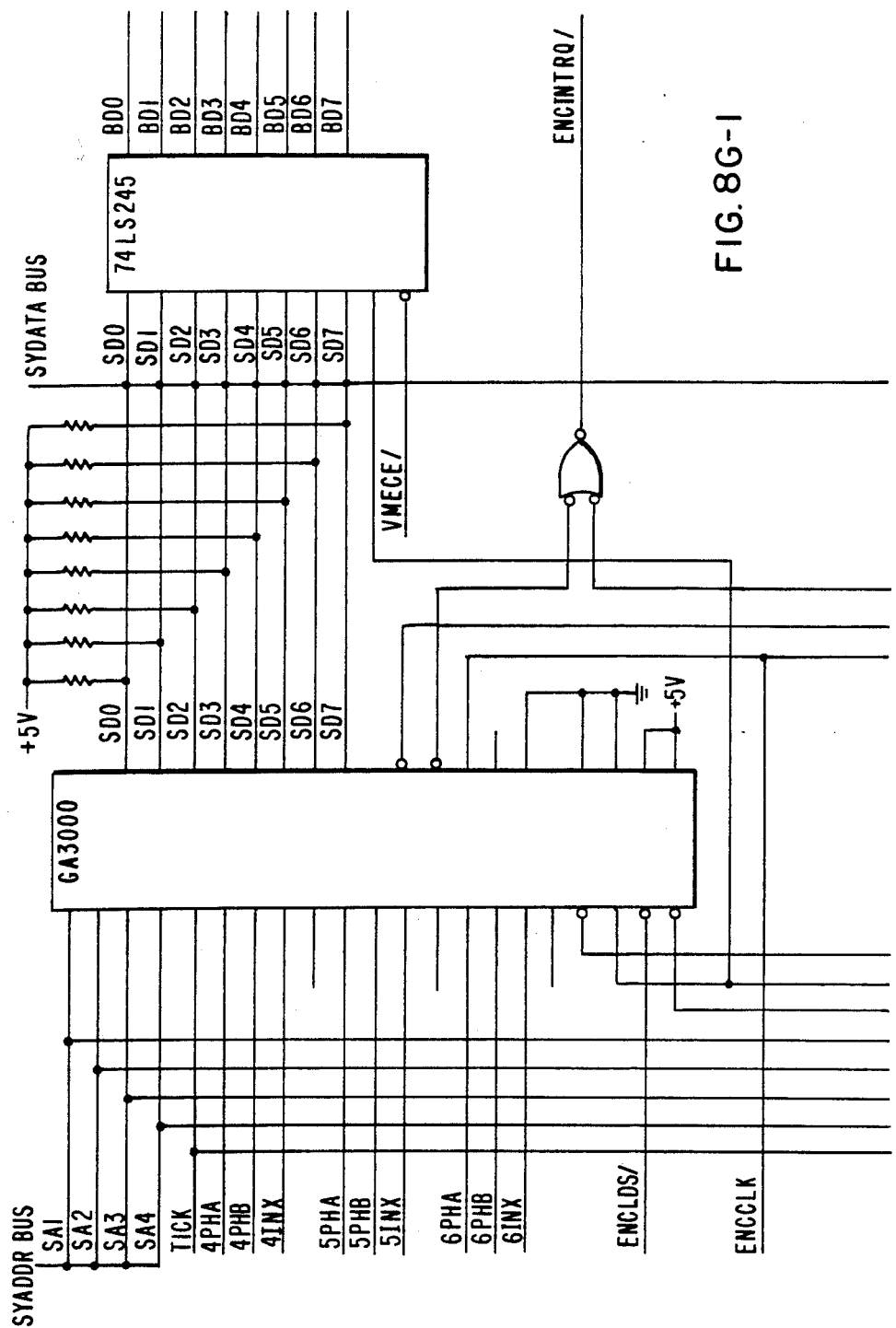
Figures 2, 8G:
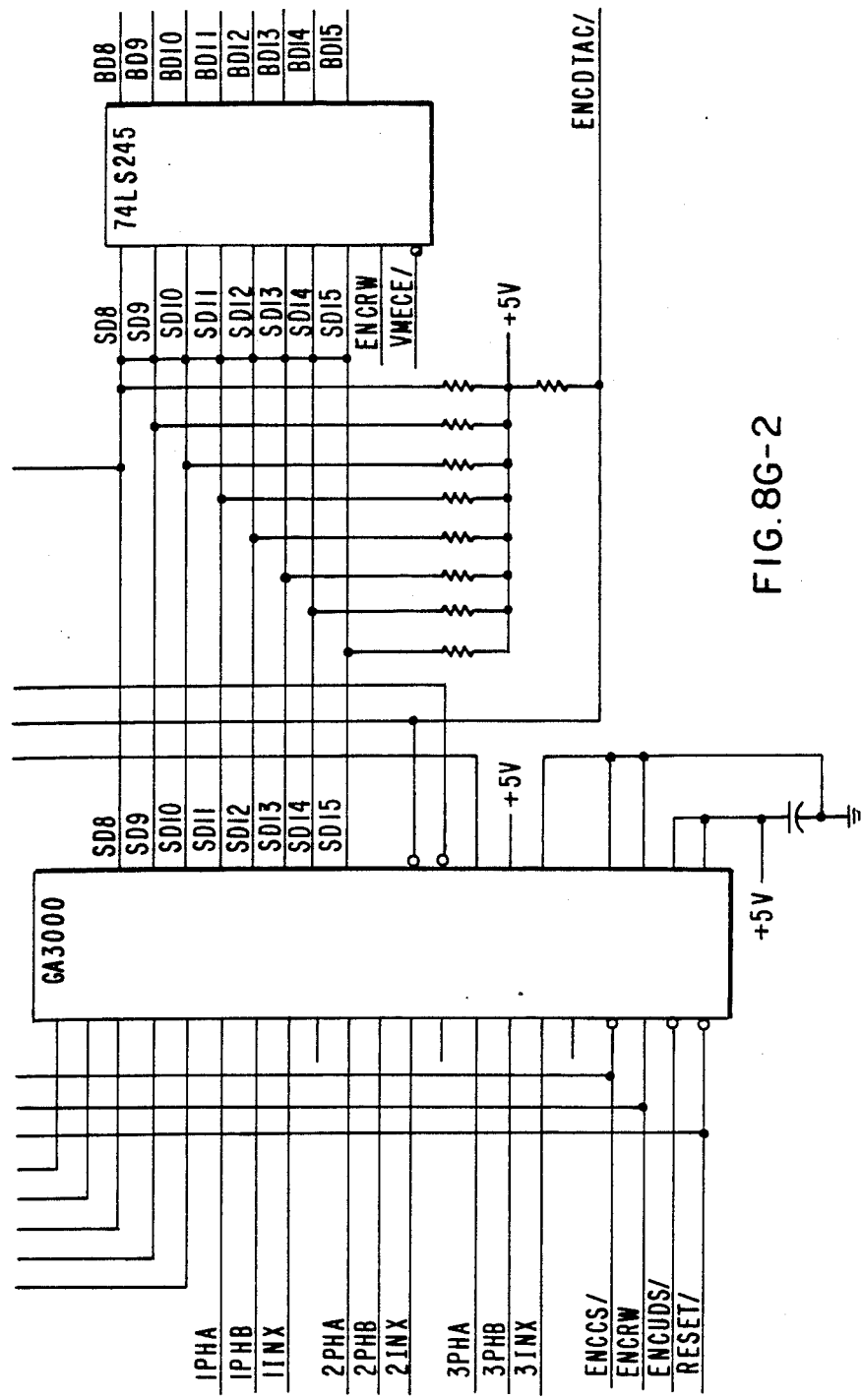

The following is a list of most of the gate array signals and their functions:

SA1 to SA4 - Decode One of 16 Registers Within The GA3000
ENCLDS - Low Data Select - To Read Lower Byte
ENCLK - 2 Megahertz Clock
VMECE - VME Bus Enable
RESET - System Clear of All Internal Registers
ENCRW Enable Read (HI) or Write (LO)
ENCCS - Chip Select
ENCUDS - To Read Upper Byte
ENCDTAC - Select Acknowledge Directly From Chip to VME Bus Broken wire signals ENCBRKW are generated by high and low signal comparators for each joint (FIGS. 8A-8F-1). High (6 volts for PUMA 760) and low (ground for PUMA 760) reference signals are generated as shown in FIG. 8E. The broken wire signals are applied to respective latches S279 that operate indicator lights as shown in FIGS. 8F-2. An AND gate generates a signal ENCBW for display any one joint shows a broken encoder wire. In addition, a broken wire signal is applied to the system error circuitry (not shown) to provide an error reading to the system software and to disable the SCM board and thereby incapacitate the robot control as a whole.

Figure 8H:
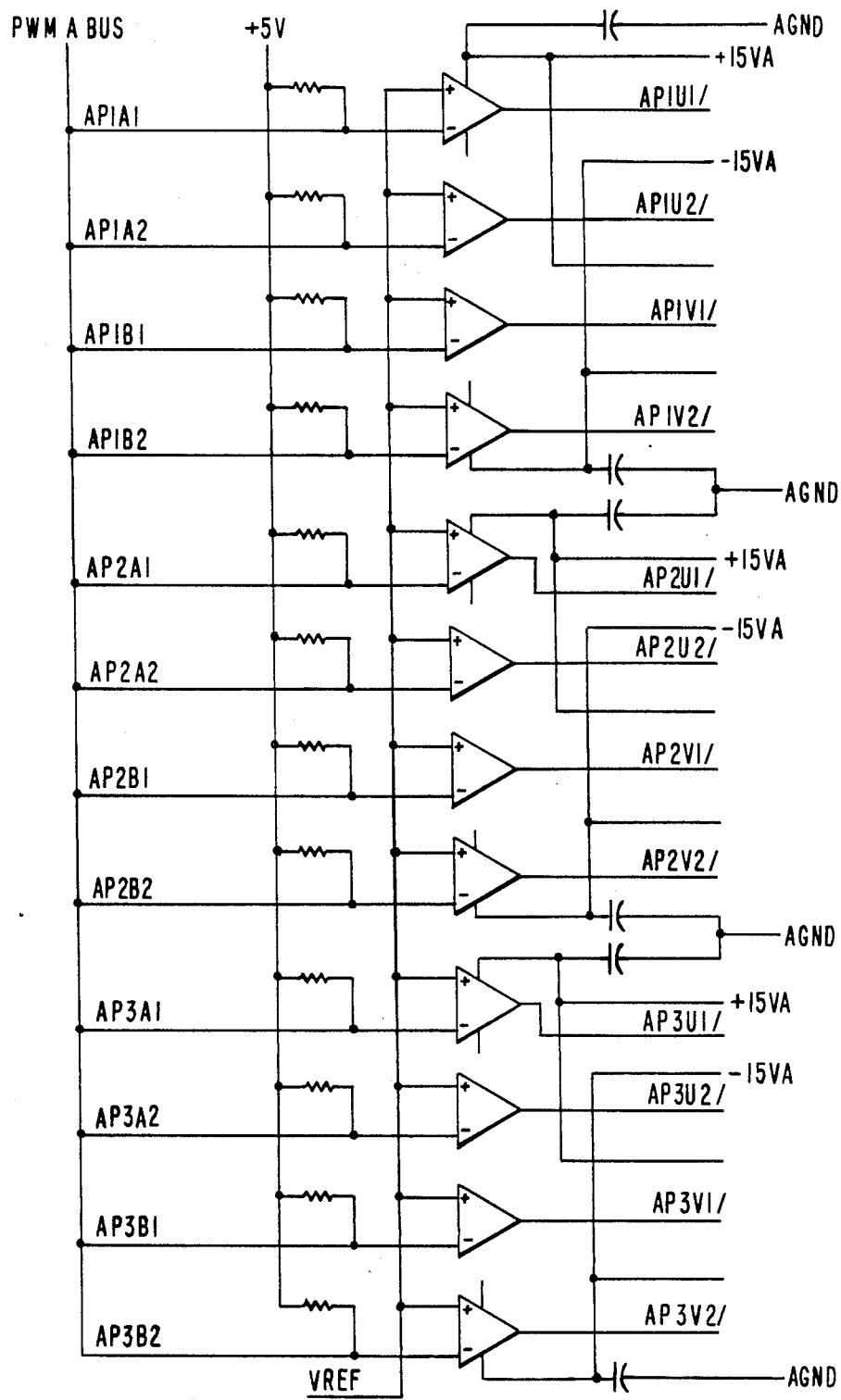
Figure 81:
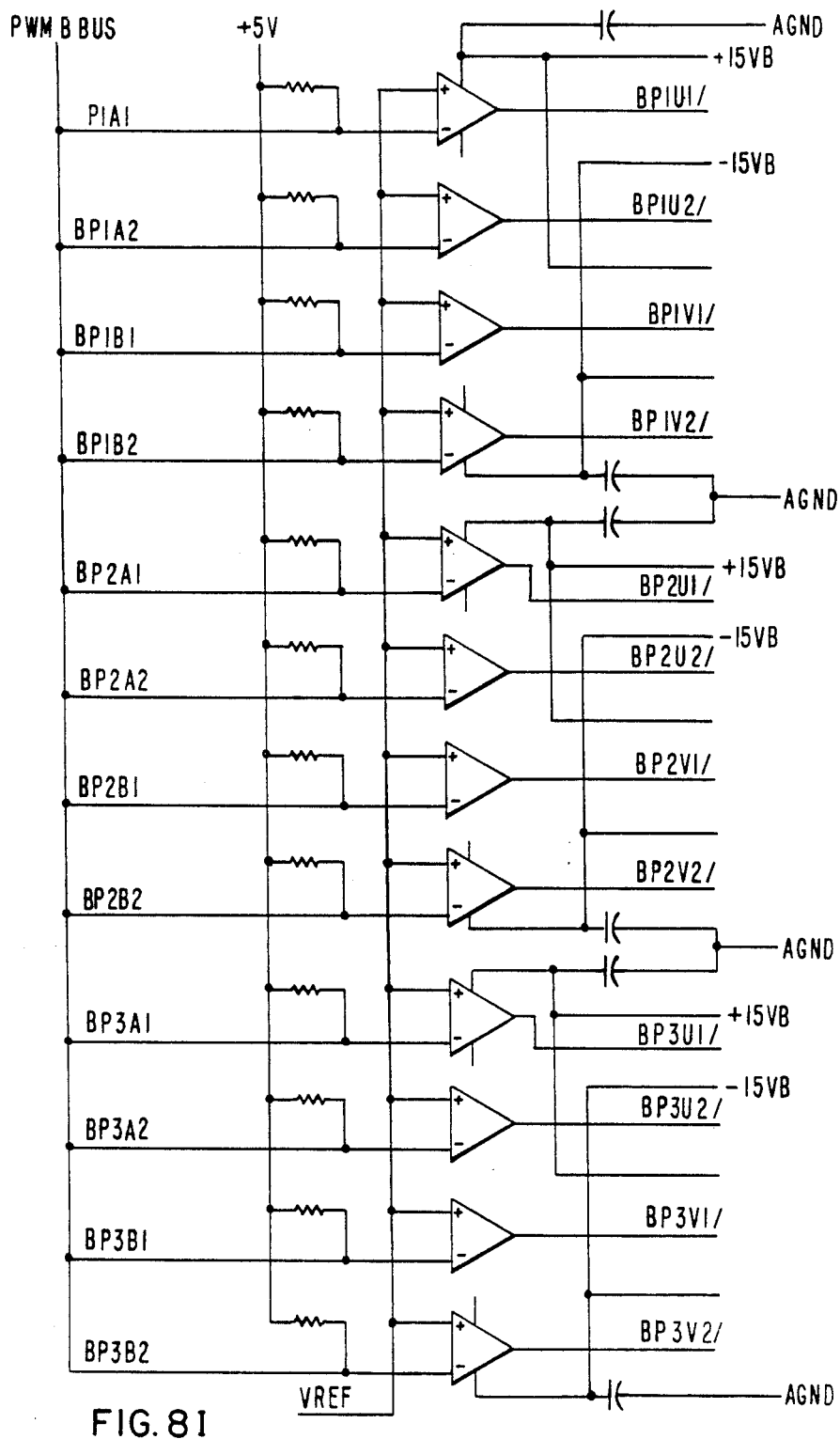

The PUMA 760 PWM circuitry in FIGS. 8H and 8I differs from the 860 PWM circuitry in that it employs reverse polarity on the 339 comparators.

In FIGS. 8H, 8J-2 and 8K there is shown circuitry associated with PUMA 760 position potentiometers employed to indicate arm joint positions during power-up and thereby allow the user to initialize the arm position. The 860 robot makes no use of such potentiometers.

Figures 1, 8J:
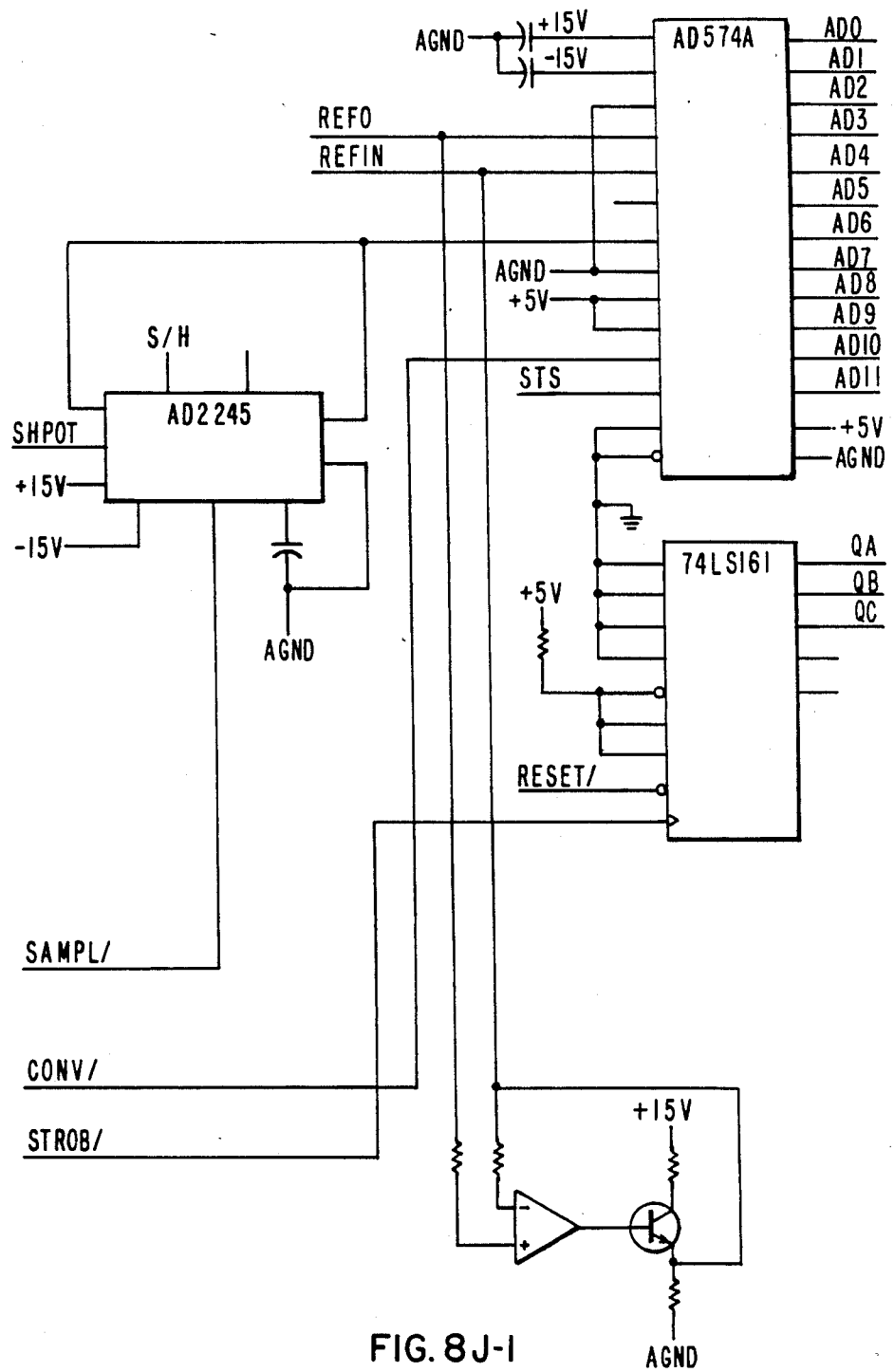
Figures 2, 8J:
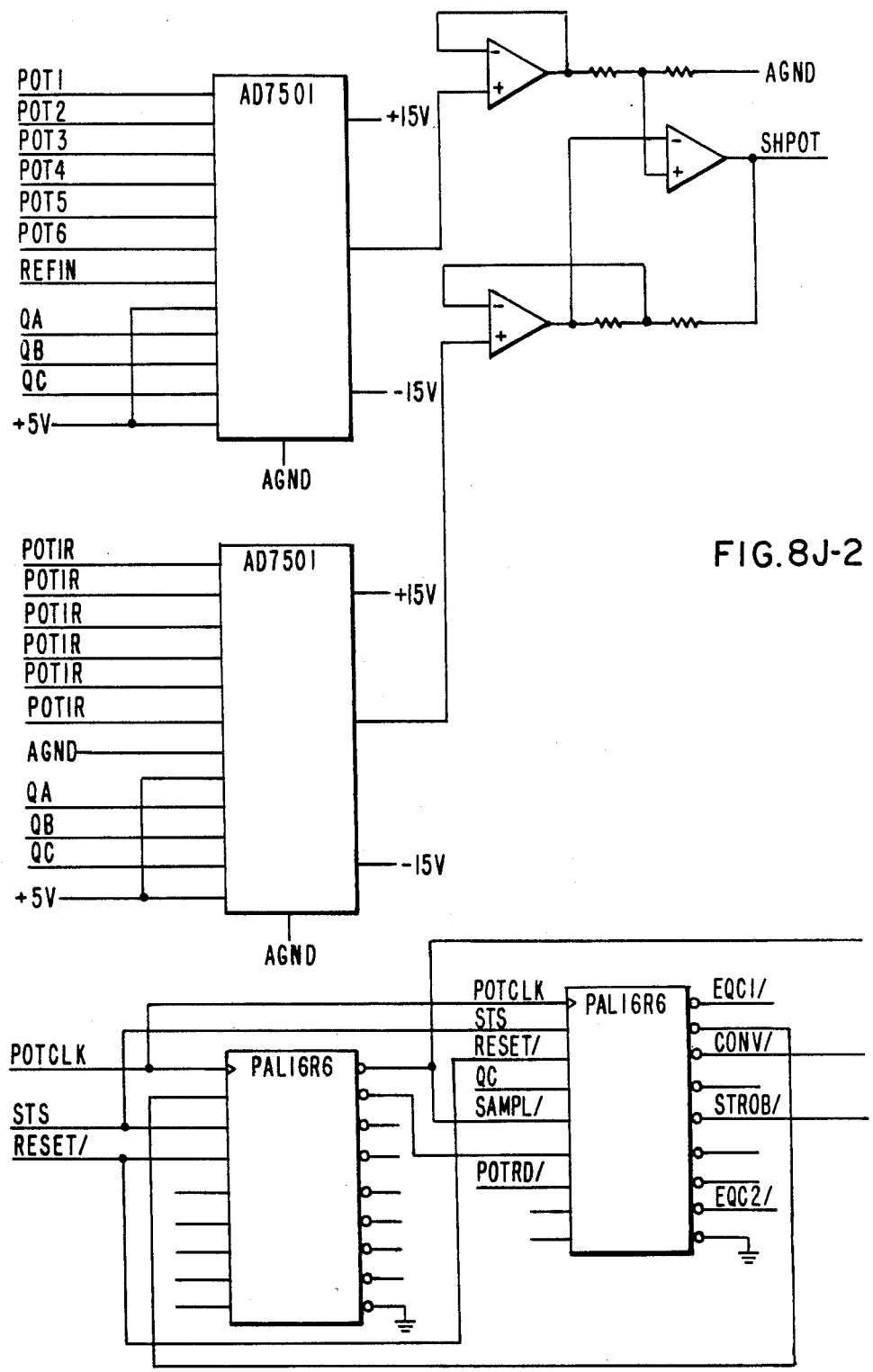
Figure 8K:
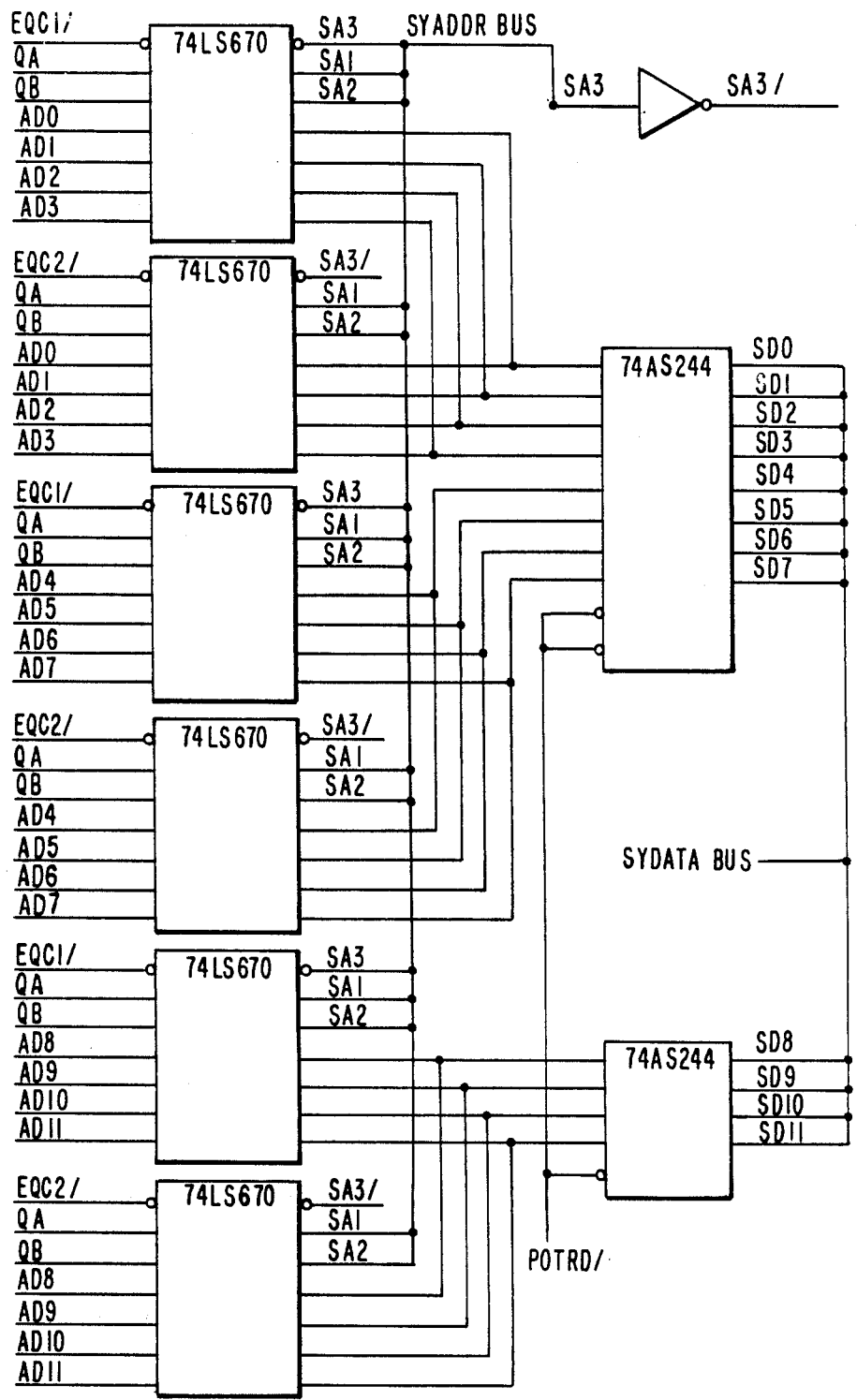

The six pots are connected to analog multiplexers AD7501 in FIG. 8J-2 and thereafter to a sample and hold circuit AD2245 a 12-bit analog-to-digital converter AD574A both in FIG. 8J-1. The digital output signals are coupled from the converter to a register system. Potentiometer signals POT1 through POT6 are read one at a time and applied from the resistor system through a bus driver 74A S244 to the VME bus for system reading and display. PAL device 16R6 (FIG. 8J-2) controls the starting time of each A-to-D conversion cycle.

ROBOT CONTROL PACKAGING—BASIC AND EXPANDED CONTROLS

Figure 6A:
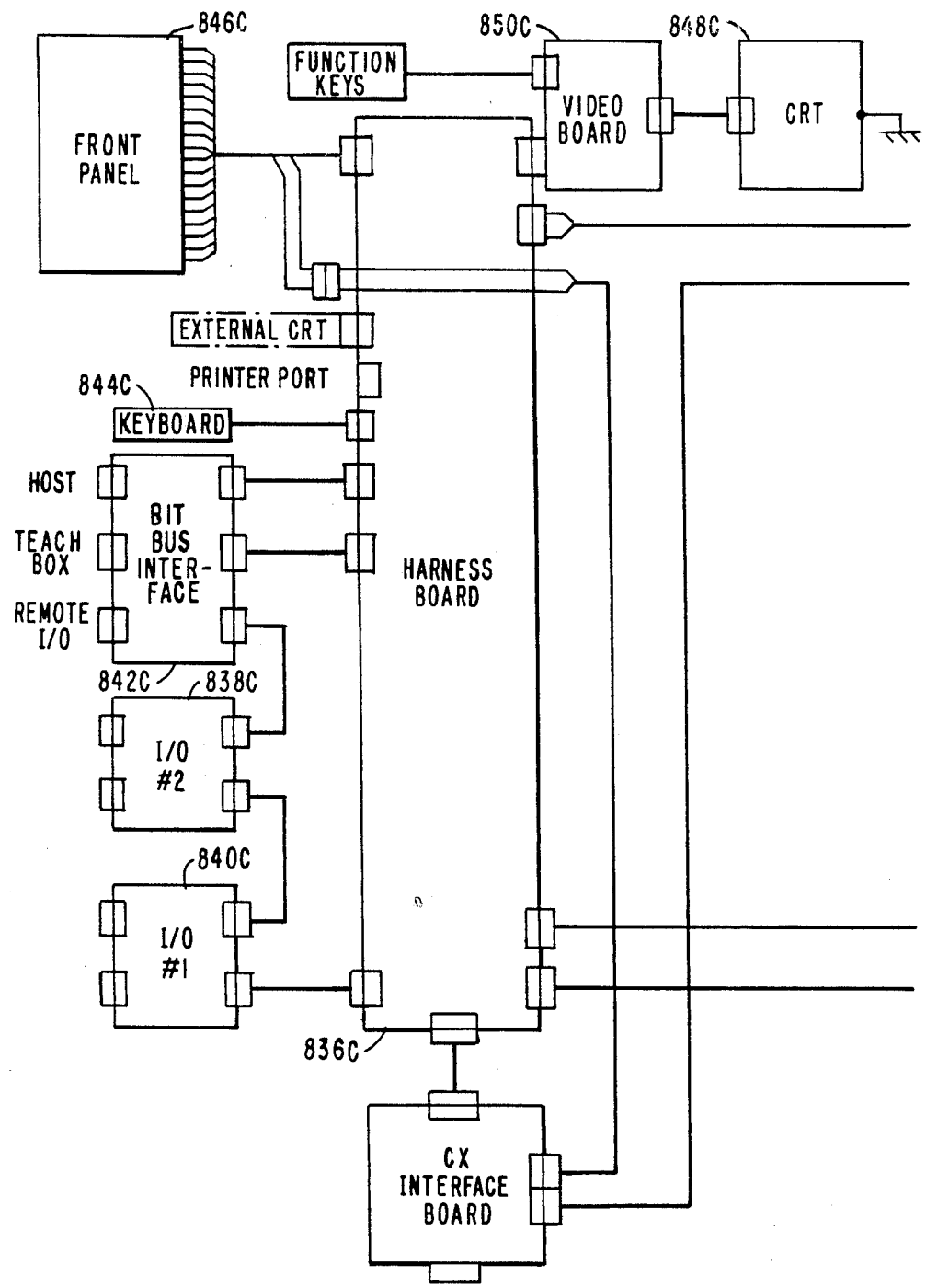
FIGS. 6A–6C together show a top schematic view of the AIF board/device interconnectors provided on it as well as SCM, TP, SC, Memory, and various interface boards and CRT, panel and other I/O devices that are interconnected to the AIF board.
Figure 6B:
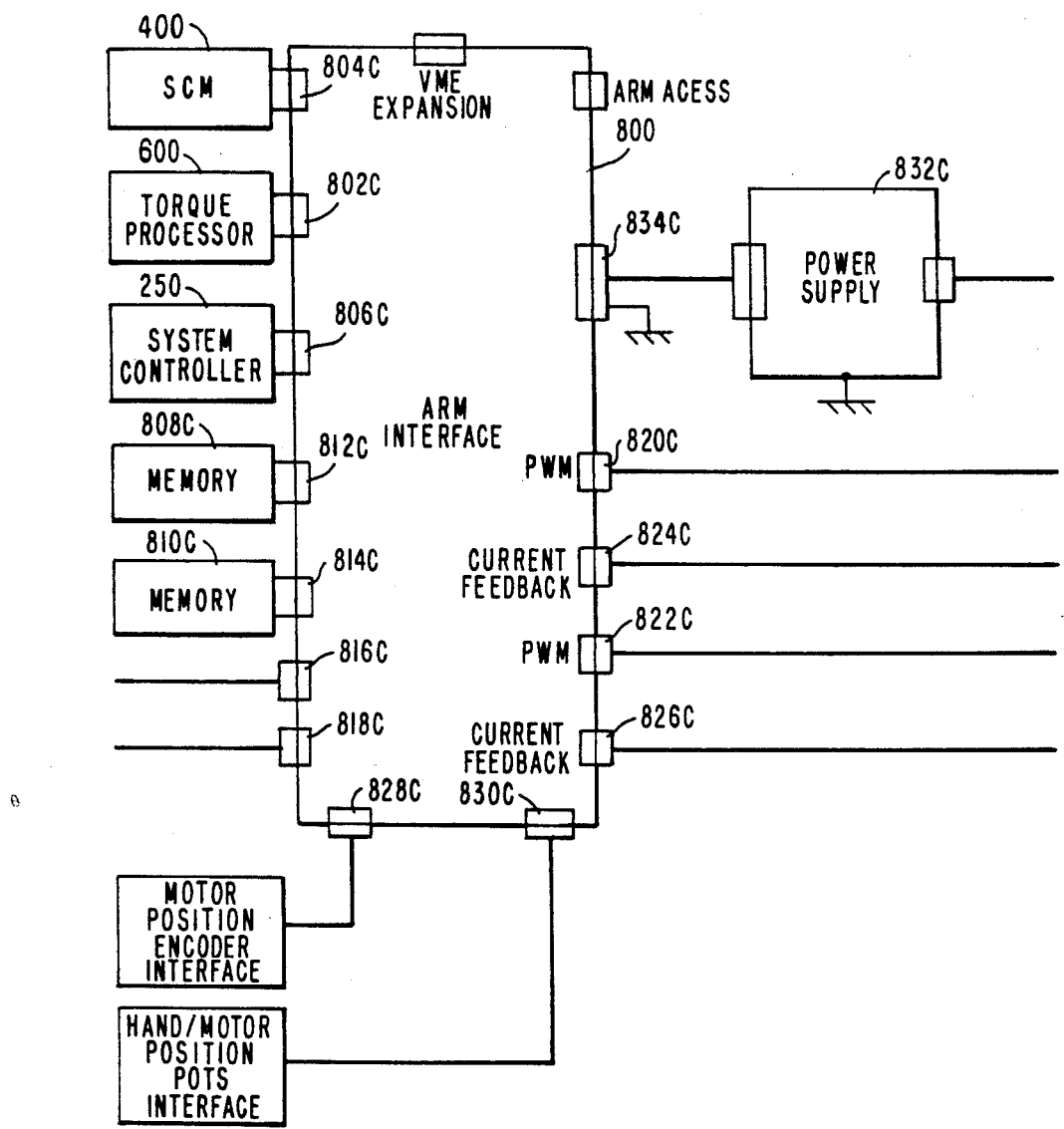

The TP board 600 shown in FIG. 4 and 6B generally houses torque (current) servo control circuitry. In turn, the SCM board 400 contains position and velocity servo control circuitry, a capability for arm solutions generation, and a communications and system resources capability which enable a basic robot control to be configured from AIF, TP and SCM boards. The system control (SC) board 250 in FIG. 6B provides a separate arm solutions capability which enables expanded control with higher level performance, i.e. faster trajectory time.

To package a basic robot control, a TP board 600 and an SCM board 400 are assembled with an AIF board such as the board 800 as shown in FIG. 6B. The AIF board 800 is provided with a slot connector 802C for the TP board 600 whereby a conventional multipin interconnector provides respective connections for the VME bus and the VMX bus between the AIF board 800 and the TP board 600. Another slot connector 804C similarly makes necessary connections for the SCM board 400 with the AIF board 800.

Generally, the VME bus is a system bus that carries 24 bus address lines and 16 data lines and further carries position and velocity feedback signals and TP board commands. The VME bus thus connects commonly between the AIF, TP and SCM boards. The VMX bus connects only between the AIF board 800 and the TP board 600 and carries current feedback and commutation status signals.

In packaging the expanded robot control referred to previously, the SC board 250 is also assembled with the basic control by insertion in AIF slot connector 806C as shown in FIG. 6B. An interconnector then connects the VME bus between the SC and AIF boards thereby making the VME bus common to all boards.

Further control expansion can be achieved by adding additional memory boards 808C, 810C to slots 812C and 814C respectively or by adding additional electronic boards having added computer capacity for higher level control and/or expanded control functioning.

Connectors 816C and 818C are provided for a harness board 836C (FIG. 6A) which provides for connections I/0 interfaces 838C and 840C, a bit bus interface 842C (for teach box, remote I/0, etc.), a keyboard 844C, a panel 846C and a CRT 848C through a video board 850C.

Figure 6C:
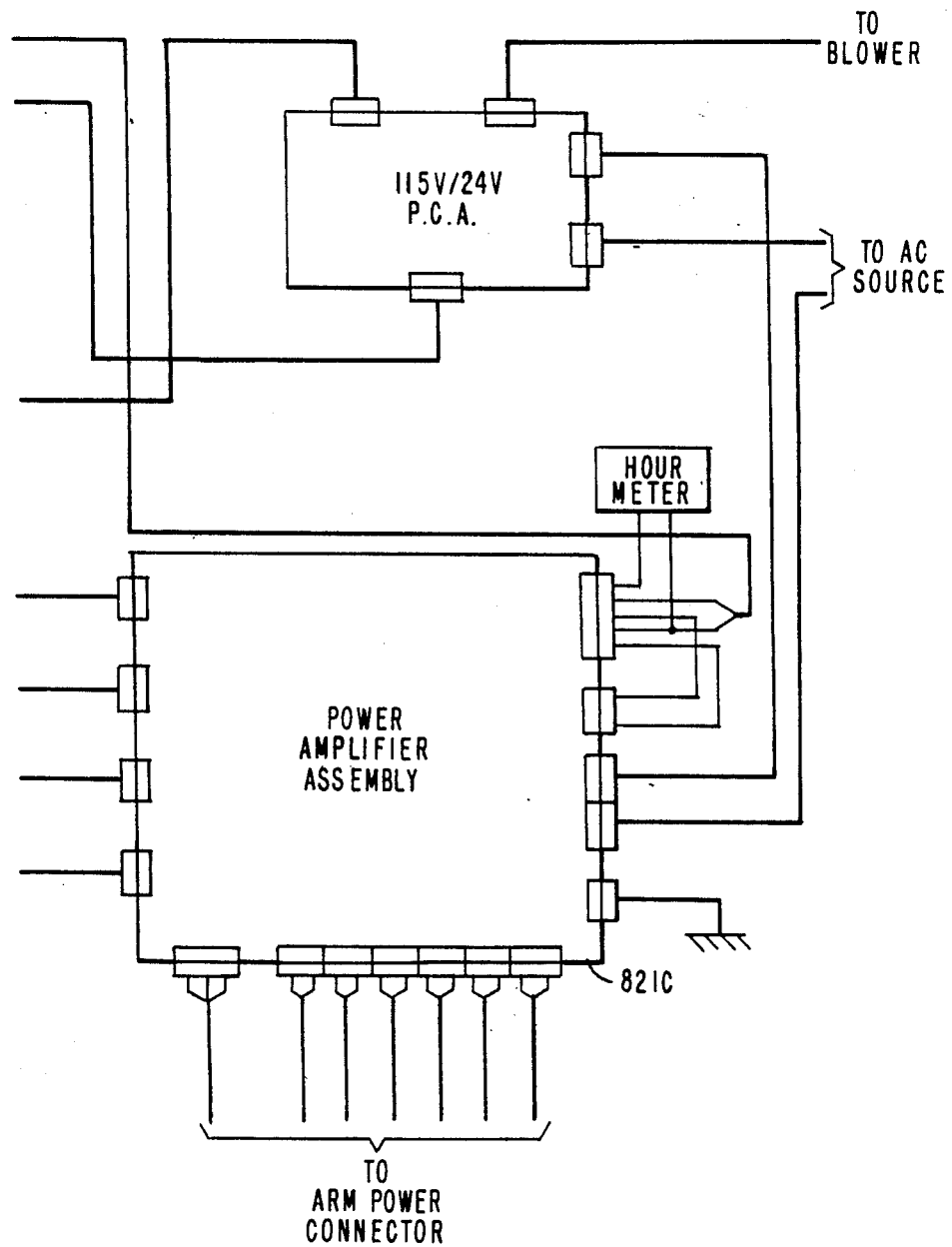

Connectors 820C-830C are also provided on the AIF board 800 or 800A for PWM and feedback connections to the robot power amplifiers 821C in FIG. 6C and for connection to external systems or devices exemplary ones including input/output devices, a supervisory computer, robot or machine controls, and one or more programmable controllers. Among the connections, a power supply 832C supplies board power through interconnector 834C.

Finally, the particular AIF board selected determines the type robot that the assembled basic or expanded control can operate.

What is claimed is:

1. A robot control being adaptable for variably packaged use with a relatively wide variety of robot arms, said control comprising:
    a first electronic arm interface board including substantially all arm interface control circuitry, dependent on a first robot arm type to be controlled, said arm interface control circuitry including motor drive circuitry and position and velocity feedback processing circuitry for a particular robot arm;
    at least a second electronic arm interface board including substantially all alternative arm interface control circuitry, dependent on a second robot arm type to be controlled, said alternative arm interface control circuitry including motor drive circuitry and position and velocity feedback circuitry for an alternative robot arm;
    electronic control board means having control and resource circuitry capable of providing at least a complete basic robot control and being structured to operate substantially independently of the particular robot arm type to be controlled out of any of the different controllable robot arm types; and
    interconnector means for coupling said electronic control board means with one of said arm interface boards to form an assembled control for the robot arm type associated with said one arm interface board.

2. A robot control as set forth in claim 1 wherein said electronic control board means includes a torque processor board including digital torque servo control circuitry, and said electronic control board means further includes a servo control board including position and velocity servo control circuitry and arm solution and system resource circuitry, said first or second electronic arm interface board together with said torque processor board and said servo control board forming said basic robot control.

3. A robot control as set forth in claim 2 wherein said electronic control board means further includes a system control board including arm solution circuitry, said electronic arm interface board selected and said torque processor board with digital torque servo control circuitry and said servo control board and said system control board forming a robot control having expanded control capability with faster trajectory time.

4. A robot control as set forth in claim 1 wherein each of said electronics arm interface boards include interconnection means for coupling said motor drive circuitry to power amplifiers associated with motors for the robot joints.

5. A robot control as set forth in claim 1 wherein each of said electronic arm interface boards includes interconnection means for externally coupling to supervisory computer means and other robot and machine controls and programmable controllers and input/output devices.

6. An adaptive robot control for interfacing with a plurality of robot arms, said control comprising:
    an arm interface being of the type dependent for motor drive parameters and feedback control characteristics, said interface being selected from either one of a first or a second electronic arm interface board including, respectively thereon, substantially all required arm interface circuitry, dependent on either one of a first or a second robot arm type to be controlled, said required arm interface circuitry including respective motor drive circuitry and position and velocity feedback processing circuitry for the plurality of robot arms;
    electronic control board means having control and resource circuitry capable of providing at least a complete basic robot control and being structured to operate substantially independently of any particular robot arm type to be controlled for any of different controllable robot arm types; and
    interconnector means for coupling said electronic control board means with one of said arm interface boards to form an assembled control for the robot arm type associated with said one arm interface board.

7. A method for implementing robot control being adaptable for interfacing with a plurality of robot arms, said method comprising the steps of:
    selecting an arm interface of the type dependent on motor drive parameters and feedback control characteristics, said selection being to either of a first or a second electronic arm interface board, basing thereon substantially all necessary arm interface control circuit functions dependent on either one of a first or a second robot arm type to be controlled, said arm type defining respective motor drive functions and position and velocity feedback processing functions unique to the particular arm type used;
    assembling said selected interface board in circuit with a universal electronic control board means having control and resource circuitry, thereby providing at least a complete basic robot control while operating substantially independently of the particular robot arm type controlled for any of different controllable robot arm types; and
    interconnecting sad assembly with interconnector means for coupling said electronic control board means with one of said arm interface board to form an assembled control for the robot arm type associated with said one arm interface board.

8. A method as set forth in claim 7 wherein said step of assembling while operating substantially independently of the particular robot arm type with the universal electronic control board means is facilitated by digitally processing motor current feedback and operating with digital torque servo control having position and velocity servo control and arm solution and system circuitry, said arm interface and torque processor and servo resources for operatively providing robot control functions.

* * * * *